US006849581B1

United States Patent
Thompson et al.

(10) Patent No.: US 6,849,581 B1
(45) Date of Patent: Feb. 1, 2005

(54) GELLED HYDROCARBON COMPOSITIONS AND METHODS FOR USE THEREOF

(75) Inventors: Joseph E. Thompson, Houston, TX (US); Joel L. Boles, Spring, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 09/534,655

(22) Filed: Mar. 24, 2000

Related U.S. Application Data

(60) Provisional application No. 60/148,274, filed on Aug. 11, 1999, provisional application No. 60/129,770, filed on Apr. 15, 1999, and provisional application No. 60/127,298, filed on Mar. 30, 1999.

(51) Int. Cl.$^7$ .............................. C09K 7/06; C11D 1/00
(52) U.S. Cl. .................... 507/118; 507/125; 507/103; 507/138; 507/221; 507/231; 507/265; 507/267; 507/263; 507/922; 585/3; 508/536; 508/537; 508/539
(58) Field of Search ................. 507/118, 125, 507/103, 138, 221, 231, 263, 265, 267, 922; 585/3; 508/536, 537, 539

(56) References Cited

U.S. PATENT DOCUMENTS

| | | | | |
|---|---|---|---|---|
| 2,332,247 A | * | 10/1943 | Morway | 508/536 |
| 2,390,609 A | | 12/1945 | Minich | 252/316 |
| 2,451,039 A | * | 10/1948 | Morway | 508/536 |
| 2,620,345 A | | 12/1952 | Dean | 260/414 |
| 2,646,401 A | * | 7/1953 | O'Halloran | 508/536 |
| 2,708,659 A | * | 5/1955 | Forster | 508/536 |
| 2,733,208 A | * | 1/1956 | Forster | 508/536 |
| 2,733,209 A | * | 1/1956 | Forster | 508/536 |
| 2,793,996 A | | 5/1957 | Lummus | 252/8.5 |
| 2,929,781 A | * | 3/1960 | Beerbower et al. | 508/536 |
| 2,959,548 A | * | 11/1960 | O'Halloran | 508/536 |
| 2,965,566 A | | 12/1960 | Hoeppel | 252/8.5 |
| 3,207,693 A | * | 9/1965 | Morway | 507/265 |
| 3,243,270 A | | 3/1966 | Flanagan | 44/7 |
| 3,302,717 A | | 2/1967 | West et al. | 166/33 |
| 3,380,529 A | | 4/1968 | Hendrickson | 166/33 |
| 3,505,374 A | | 4/1970 | Monroe | 260/439 |
| 3,511,820 A | | 5/1970 | Verdol et al. | 260/7.5 |
| 3,528,939 A | | 9/1970 | Pratt et al. | 260/29.6 |
| 3,625,286 A | | 12/1971 | Parker | 166/291 |
| 3,650,970 A | * | 3/1972 | Pratt et al. | 252/181 |
| 3,654,990 A | | 4/1972 | Harnsberger et al. | 166/281 |
| 3,654,991 A | | 4/1972 | Harnsberger et al. | 166/281 |
| 3,654,992 A | | 4/1972 | Harnsberger et al. | 166/281 |
| 3,657,123 A | | 4/1972 | Stram | 252/34.7 |
| 3,719,711 A | | 3/1973 | Temple | 260/567.6 P |
| 3,725,547 A | | 4/1973 | Kodistra | 424/245 |
| 3,741,943 A | | 6/1973 | Sekmakas | 260/78.5 |
| 3,755,189 A | | 8/1973 | Gilchrist et al. | 252/316 |

(List continued on next page.)

FOREIGN PATENT DOCUMENTS

| | | |
|---|---|---|
| CA | 974539 | 9/1975 |
| CA | 2090177 | 9/1993 |
| DE | 1 800 712 | 5/1969 |

(List continued on next page.)

OTHER PUBLICATIONS

Ralson, "Fatty Acids and their Derivatives," John Wiley & Sons, Inc., New York, NY, pp. 887–903, 1948.

(List continued on next page.)

Primary Examiner—Philip C. Tucker
(74) Attorney, Agent, or Firm—O'Keefe, Egan & Peterman, LLP

(57) ABSTRACT

Gelled organic compositions and methods for using same. The gelled compositions may be liquid organic fluids, such as gelled liquid hydrocarbons, formed from a mixture of an organic-base fluid, a carboxylic acid, and one or more metal source compounds, such as a metal salt of carboxylic acid. The gelled compositions may be used in variety of applications including, but not limited to, oil field, pipeline and processing facility applications.

43 Claims, 1 Drawing Sheet

U.S. PATENT DOCUMENTS

| | | |
|---|---|---|
| 3,757,864 A | 9/1973 | Crawford et al. ............ 166/308 |
| 3,764,571 A | 10/1973 | Jennings et al. .............. 260/23 |
| 3,799,267 A * | 3/1974 | Ely et al. .................... 507/265 |
| 3,819,386 A | 6/1974 | Higgins et al. ............... 106/27 |
| 3,821,109 A | 6/1974 | Gilchrist et al. .............. 210/36 |
| 3,839,300 A | 10/1974 | Ensor et al. ............... 260/78.4 |
| 3,846,310 A | 11/1974 | Blackwell et al. ......... 252/8.55 |
| 3,852,441 A | 12/1974 | Kooistra, Jr. ................ 424/245 |
| 3,883,404 A | 5/1975 | Bocca et al. ................... 208/44 |
| 3,887,508 A | 6/1975 | Dieckmann .................. 260/23 |
| 3,900,070 A | 8/1975 | Chatterji et al. ............ 166/308 |
| 3,904,541 A | 9/1975 | Charlton ................... 252/63.2 |
| 3,905,909 A | 9/1975 | Bauer ......................... 252/156 |
| 3,960,514 A | 6/1976 | Teng et al. .................... 44/7 B |
| 3,969,087 A | 7/1976 | Saito et al. .................. 44/7 C |
| 3,969,233 A | 7/1976 | Lucas ......................... 252/22 |
| 4,003,393 A | 1/1977 | Jaggard et al. ............... 137/15 |
| 4,008,264 A | 2/1977 | Lubbers ..................... 260/470 |
| 4,049,858 A | 9/1977 | Murphy ..................... 428/136 |
| 4,053,428 A | 10/1977 | Pindar et al. ................. 252/52 |
| 4,084,089 A | 4/1978 | Zingaro et al. ............. 250/272 |
| 4,096,071 A | 6/1978 | Murphy ..................... 252/8.6 |
| 4,142,978 A | 3/1979 | Murphy ..................... 252/8.7 |
| 4,147,643 A | 4/1979 | Pindar et al. ................. 252/52 |
| 4,147,677 A | 4/1979 | Lundberg et al. |
| 4,152,289 A | 5/1979 | Griffin, Jr. ................. 252/316 |
| 4,153,649 A | 5/1979 | Griffin, Jr. ................. 260/950 |
| 4,156,678 A | 5/1979 | Krueger ................... 260/42.37 |
| 4,157,432 A | 6/1979 | Lundberg et al. |
| 4,171,268 A | 10/1979 | Collins ..................... 252/32.7 |
| 4,174,283 A | 11/1979 | Griffin, Jr. ................ 252/8.55 |
| 4,176,073 A | 11/1979 | Ryer et al. |
| 4,186,802 A | 2/1980 | Perlman ..................... 166/280 |
| 4,200,540 A | 4/1980 | Burnham ................... 252/8.55 |
| 4,238,529 A | 12/1980 | Sicignano et al. .......... 427/160 |
| 4,242,377 A | 12/1980 | Roberts et al. ............. 477/242 |
| 4,252,465 A | 2/1981 | Broussard et al. .......... 405/158 |
| 4,259,428 A | 3/1981 | Tsuneda ..................... 430/115 |
| 4,273,891 A | 6/1981 | Pindar et al. ................ 525/145 |
| 4,284,414 A | 8/1981 | Bryant .......................... 44/62 |
| 4,299,710 A | 11/1981 | Dupre et al. |
| 4,301,868 A | 11/1981 | Scherubel et al. .......... 166/308 |
| 4,312,765 A | 1/1982 | Block ......................... 252/8.5 |
| 4,316,807 A | 2/1982 | McDaniel et al. ........... 252/8.5 |
| 4,316,810 A | 2/1982 | Burnham .................. 252/8.55 |
| 4,316,852 A | 2/1982 | Blachford .................. 260/414 |
| 4,404,112 A | 9/1983 | Scherubel et al. ......... 252/8.55 |
| 4,416,703 A | 11/1983 | Scott ............................ 134/8 |
| 4,440,674 A | 4/1984 | Dieckmann et al. ........ 524/177 |
| 4,442,011 A | 4/1984 | Thaler et al. |
| 4,446,039 A | 5/1984 | Pindar et al. ................. 252/52 |
| 4,450,261 A | 5/1984 | Chiao et al. ................ 526/214 |
| 4,517,115 A | 5/1985 | Dieckmann et al. ........ 252/400 |
| 4,525,522 A | 6/1985 | Turner et al. |
| 4,543,131 A | 9/1985 | Purinton, Jr. .................. 134/8 |
| 4,557,842 A | 12/1985 | Pratt ......................... 252/37.7 |
| 4,566,977 A | 1/1986 | Hatfield ..................... 252/8.5 |
| 4,571,422 A | 2/1986 | Symes et al. ................ 536/114 |
| 4,572,295 A | 2/1986 | Walley ....................... 166/295 |
| 4,576,819 A | 3/1986 | Miyata et al. ............... 424/156 |
| 4,579,671 A | 4/1986 | Lundberg et al. ............ 242/8.5 |
| 4,612,332 A | 9/1986 | Bock et al. ................... 521/65 |
| 4,615,393 A | 10/1986 | Sedillo et al. ............... 166/308 |
| 4,622,155 A | 11/1986 | Harris et al. .............. 252/8.551 |
| 4,635,727 A | 1/1987 | Anderson et al. ........... 166/308 |
| 4,646,837 A | 3/1987 | Kruka ....................... 166/304 |
| 4,647,603 A | 3/1987 | Lundberg et al. ........... 523/339 |
| 4,658,036 A | 4/1987 | Schilling ................... 548/513 |
| 4,661,554 A | 4/1987 | Coran et al. |
| 4,665,982 A | 5/1987 | Brown ....................... 166/250 |
| 4,668,439 A | 5/1987 | Billenstein et al. ....... 260/410.9 |
| 4,670,501 A | 6/1987 | Dymond et al. ............. 524/458 |
| 4,670,515 A | 6/1987 | Olivier |
| 4,673,716 A | 6/1987 | Siano et al. ................. 525/367 |
| 4,694,046 A | 9/1987 | Bock et al. ............... 525/329.4 |
| 4,694,058 A | 9/1987 | Siano et al. .............. 526/307.2 |
| 4,709,759 A | 12/1987 | Bock et al. .................. 166/275 |
| 4,720,576 A | 1/1988 | Wada et al. ................. 562/481 |
| 4,734,205 A | 3/1988 | Jacques et al. .............. 210/708 |
| 4,751,011 A | 6/1988 | Lundberg et al. ............. 252/35 |
| 4,780,221 A | 10/1988 | Holtmyer et al. ......... 252/8.551 |
| 4,780,517 A | 10/1988 | Ching ........................ 526/240 |
| 4,781,845 A | 11/1988 | Syrinek et al. ........... 252/8.551 |
| 4,787,994 A | 11/1988 | Thorne et al. .............. 252/32.5 |
| 4,857,254 A | 8/1989 | Wong |
| 4,877,894 A | 10/1989 | Huddleston ................. 558/113 |
| 4,892,916 A | 1/1990 | Hawe et al. ................. 526/304 |
| 4,909,923 A | 3/1990 | Okazaki et al. ............... 208/44 |
| 4,950,541 A | 8/1990 | Tabor et al. |
| 4,960,821 A | 10/1990 | Peiffer ........................ 524/534 |
| 4,962,271 A | 10/1990 | Black et al. ................. 585/819 |
| 4,981,608 A | 1/1991 | Gunther ................... 252/315.2 |
| 5,015,793 A | 5/1991 | Sato et al. ................... 585/6.3 |
| 5,021,170 A | 6/1991 | Shumate et al. .......... 252/8.515 |
| 5,036,136 A | 7/1991 | Peiffer ........................ 524/812 |
| 5,045,220 A | 9/1991 | Harris et al. .............. 252/8.554 |
| 5,047,479 A | 9/1991 | Ohmae et al. |
| 5,057,233 A | 10/1991 | Huddleston ............... 252/8.551 |
| 5,066,542 A | 11/1991 | Tabor et al. |
| 5,076,852 A | 12/1991 | Bloys et al. ................. 106/725 |
| 5,082,059 A | 1/1992 | Engelhardt et al. ......... 166/308 |
| 5,132,271 A | 7/1992 | Seitz ......................... 503/213 |
| 5,145,590 A | 9/1992 | Dawson ................... 252/8.551 |
| 5,157,083 A | 10/1992 | Aonuma et al. |
| 5,161,615 A | 11/1992 | Hutchins et al. ............. 166/295 |
| 5,190,675 A | 3/1993 | Gross ....................... 252/8.551 |
| 5,197,324 A | 3/1993 | Keys ......................... 73/40.5 |
| 5,256,320 A | 10/1993 | Todd et al. .............. 252/32.007 |
| 5,271,464 A | 12/1993 | McCabe ..................... 166/295 |
| 5,276,231 A | 1/1994 | Kocal et al. ................. 585/323 |
| 5,278,203 A | 1/1994 | Harms ........................ 523/200 |
| 5,283,235 A * | 2/1994 | Bush et al. .................. 507/118 |
| 5,296,164 A | 3/1994 | Thach et al. ................. 252/307 |
| 5,300,715 A | 4/1994 | Vora .......................... 585/254 |
| 5,310,774 A | 5/1994 | Farrar ......................... 524/535 |
| 5,330,588 A | 7/1994 | Gulley ........................ 148/271 |
| 5,330,662 A | 7/1994 | Jahnke et al. ............. 252/8.551 |
| 5,346,943 A | 9/1994 | Khungar et al. ............. 524/398 |
| 5,346,963 A | 9/1994 | Hughes et al. |
| 5,362,409 A | 11/1994 | Wiggins et al. ............. 252/32.7 |
| 5,381,864 A | 1/1995 | Nguyen et al. .............. 166/280 |
| 5,382,411 A | 1/1995 | Allen ......................... 422/131 |
| 5,384,421 A | 1/1995 | Day et al. ..................... 554/92 |
| 5,386,874 A | 2/1995 | Laramay et al. ............. 166/300 |
| 5,403,501 A | 4/1995 | Schwind .................... 252/32.7 |
| 5,411,091 A | 5/1995 | Jennings, Jr. ................ 166/280 |
| 5,416,158 A | 5/1995 | Santhanam et al. .......... 524/760 |
| 5,417,287 A | 5/1995 | Smith et al. ................. 166/308 |
| 5,419,183 A | 5/1995 | Keys ........................... 73/49.5 |
| 5,420,315 A | 5/1995 | Uhrig et al. ................... 554/96 |
| 5,426,137 A | 6/1995 | Allen ......................... 523/318 |
| 5,449,470 A | 9/1995 | Cahoon et al. ................ 252/18 |
| 5,465,792 A | 11/1995 | Dawson et al. .............. 166/295 |
| 5,486,300 A | 1/1996 | Salomon et al. ............... 252/18 |
| 5,487,838 A | 1/1996 | Luciani et al. .............. 252/49.9 |
| 5,492,178 A | 2/1996 | Nguyen et al. .............. 166/276 |
| 5,497,830 A | 3/1996 | Boles et al. ................. 166/300 |
| 5,514,645 A | 5/1996 | McCabe et al. ............. 507/238 |
| 5,519,063 A | 5/1996 | Mondet et al. ........... 514/772.4 |
| 5,529,722 A | 6/1996 | Aouad et al. ................ 252/550 |
| 5,534,609 A | 7/1996 | Lewis et al. .................. 528/15 |

| | | |
|---|---|---|
| 5,552,377 A | 9/1996 | Kindred ...................... 507/209 |
| 5,556,832 A | 9/1996 | Van Slyke |
| 5,575,335 A | 11/1996 | King .......................... 166/280 |
| 5,604,186 A | 2/1997 | Hunt et al. ................. 507/204 |
| 5,609,207 A | 3/1997 | Dewprashad et al. ....... 166/276 |
| 5,614,010 A | 3/1997 | Smith et al. ................ 106/285 |
| 5,620,946 A | 4/1997 | Jahnke et al. ............... 507/131 |
| 5,637,557 A | 6/1997 | Jahnke et al. ............... 507/246 |
| 5,641,890 A | 6/1997 | Wesley et al. ................ 44/266 |
| 5,674,936 A | 10/1997 | Lucas .......................... 524/731 |
| 5,679,280 A | 10/1997 | Sasaki et al. ................. 252/77 |
| 5,696,058 A | 12/1997 | Van Slyke |
| 5,700,767 A | 12/1997 | Adams ....................... 508/539 |
| 5,710,111 A | 1/1998 | Van Slyke |
| 5,735,349 A | 4/1998 | Dawson et al. ............. 166/295 |
| 5,773,706 A | 6/1998 | Wesley et al. ................ 44/266 |
| 5,783,525 A | 7/1998 | Blanco et al. ............... 527/252 |
| 5,826,669 A | 10/1998 | Zaleski et al. ................ 175/72 |
| 5,843,873 A | 12/1998 | Butke et al. ................ 508/185 |
| 5,858,929 A | 1/1999 | Sumiejski et al. .......... 508/162 |
| 6,033,647 A | 3/2000 | Touzan et al. ................ 424/45 |
| 6,059,034 A | 5/2000 | Rickards et al. ............ 166/280 |
| 6,169,134 B1 | 1/2001 | Jones et al. |
| 6,248,699 B1 * | 6/2001 | Subramanian et al. ...... 507/265 |

FOREIGN PATENT DOCUMENTS

| | | |
|---|---|---|
| EP | 0 004 353 A2 | 10/1979 |
| EP | 0 092 242 | 10/1983 |
| EP | 0 202 940 A2 | 11/1986 |
| EP | 0 207 787 A2 | 1/1987 |
| EP | 0 225 661 A2 | 6/1987 |
| EP | 0 280 341 | 8/1988 |
| EP | 0 295 877 A3 | 12/1988 |
| EP | 0 326 155 A2 | 8/1989 |
| EP | 0 338 738 A1 | 10/1989 |
| EP | 0 390 280 A1 | 10/1990 |
| EP | 0 449 257 A2 | 10/1991 |
| EP | 0 271 362 B1 | 1/1992 |
| EP | 0 551 021 A1 | 7/1992 |
| EP | 0 580 246 A1 | 1/1994 |
| EP | 0 582 928 A2 | 2/1994 |
| EP | 0 604 988 A2 | 7/1994 |
| EP | 0 682 940 A1 | 11/1995 |
| EP | 0 691 454 A1 | 1/1996 |
| EP | 0 739 619 A1 | 10/1996 |
| EP | 0 785 225 A2 | 7/1997 |
| EP | 0 835 647 A1 | 4/1998 |
| EP | 0 848 029 A2 | 6/1998 |
| GB | 994377 | 6/1965 |
| GB | 1172950 | 12/1969 |
| JP | 56-22739 A | 3/1981 |
| JP | 58-154758 A | 9/1983 |
| JP | 59-84993 A | 5/1984 |
| JP | 3-97781 A | 9/1989 |
| JP | 6-228163 A | 8/1994 |
| JP | 8-48965 A | 2/1996 |
| JP | 8-183249 A | 7/1996 |
| RU | 1482171 | 11/1995 |
| WO | WO 01/09482 A1 | 2/2001 |

OTHER PUBLICATIONS

Encyclopedia of Chemical Technology, Edited by Raymond E. Kirk and Donald F. Othmer, *The Interscience Encyclopedia, Inc.*, Interscience Publishers, New York, NY, vol. 6, pp. 147–299, 1951.

Elliott, "The Alkaline Earth and Heavy Metal Soaps," McGraw–Hill Encyclopedia of Science and Technology, Reinhold Publishing Co., New York, NY, 12:393, 1960.

Chevassus, "The Stabilization of Polyvinyl Chloride," St. Martin's Press, Inc., New York, NY, 137:108–117, 1968.

Pattison, "Fatty Acids and Their Industrial Applications," Marcel Dekker, Inc., New York, NY, 209–220, 1968.

Encyclopedia of Chemical Technology, Edited by Raymond E. Kirk and Donald F. Othmer, Third Edition, John Wiley & Sons, vol. 4, pp. 812–871, 1978.

Encyclopedia of Chemical Technology, Edited by Raymond E. Kirk and Donald F. Othmer, Third Edition, John Wiley & Sons, vol. 5, pp. 62–69, 1979.

Encyclopedia of Chemical Technology, Edited by Raymond E. Kirk and Donald F. Othmer, Third Edition, John Wiley & Sons, vol. 9, pp. 795–831, 1980.

American Chemical Society Symposium Series 229, "The Effects of Hostile Environments on Coatings and Plastics," pp. 49–64, 1983.

Scharf, et al., "The Enhancement of Grease Structure Through the Use of Functionalized Polymer Systems," National Lubricating Grease Institute, 9511, published prior to Mar. 30, 1999.

Kernizan, et al. "FP Additized Greases—Part 1: Bearing and Analytical Performance," National Lubricating Grease Institute, 9911, published prior to Mar. 30, 1999.

Herman F. George, et al., "Low Temperature Rheology of Greases: Functionalized Polymer Systems," National Lubricating Grease Institute, 9808, published prior to Mar. 30, 1999.

K.J. Hole, et al., "The Enhancement of Grease Structure Through the Use of Functionalized Polymer Systems," The Lubrizol Corporation, published prior to Mar. 30, 1999.

API Recommended Practices for Standard Procedures for Evaluation of Hydraulic Fracturing Fluids, American Petroleum Institute, Second Edition, Jan. 1983.

Hawley's Condensed Chemical Dictionary, Revised by N. Irving Sax and Richard J. Lewis, Sr., Eleventh Edition, p. 46, 1987.

Ely, "Fracturing Fluids and Additives," Recent Advances in Hydraulic Fracturing, Chapter 7, pp. 131–146, 1989.

"Surfactants for Oilfield," Witco Oleo/Surfactants Group, published prior to Mar. 30, 1999.

"Stepan Surfactants," Stepan Company, published prior to Mar. 30, 1999.

"SMA Multifunctional Resins General Bulletin," Elf Atochem North America, Inc., published prior to Mar. 30, 1999.

"The Use of SMA Resins as Multivalent Ion Complexation Agents," Elf Atochem North America, Inc., Version 3.0, Jun. 1998.

"Technical Information, SMA Fatty–Alcohol Esters", Elf Atochem North America, Inc., published prior to Mar. 30, 1999.

"Technical Information, Developmental Products, Sulfonated SMA Resins, S–SMA X1000 and S–SMA X3000", Elf Atochem North America, Inc., published prior to Mar. 30, 1999.

"Material Safety Data Sheet, Carbopol 430 Resin," BF Goodrich Chemical Division, Aug., 1980.

"Carbopol 400 Resins as Chelating Agents," BF Goodrich Chemical Division, GC–71, published prior to Mar. 30, 1999.

"Chelating Metallic Ions—Carbopol 400 Resins," BF Goodrich Chemical Division, GC–70, 1980.

"Properties of Carbopol Resins," Resins BF Goodrich Chemical Division, GC–51, published prior to Mar. 30, 1999.

Product Information, Arizona Chemical, published prior to Mar. 30, 1999.

Product Information, Chattem Chemicals, Inc., published prior to Mar. 30, 1999.

Product Information, KIC Chemicals, Inc., Mar.–Jul., 1998.

"Technical Data Manual—Maxi Frac," Dresser Titan, T–104B, Aug. 1980.

"Maxi–O 60—Frac Fluid Classification"—Data Sheet, SSB No. 250.0 WGY, Mar. 7, 1977.

"Maxi–O 60—Gelling Agent Classification"—Data Sheet, Mar. 7, 1977.

"Aluminum Octoate—Chemical Classification"—Data Sheet, SSB No. 250.0 WGY, Dec. 2, 1976.

"Maxi–O Breaker—Breaker Classification"—Data Sheet, SSB No. 250.0 WGY, Mar. 7, 1977.

"Phthaloyl Chloride—Chemical Classification"—Data Sheet, May 4, 1977.

Hendrickson et al., "Soap–Oil Systems For Formation Fracturing," The Petroleum Engineer, pp. B–58, 60, 64, 66, May 1957.

"Oil Base Ultra Frac Systems," BJ–Huges Inc. Mixing Manual 607, p. 52, Mar. 1972.

"Stimulation Services Bulletin—Maxi–O 60 Gel," prepared by Larry Harrington, Western, No. 250.0 WG, Sep. 1977.

"Carboxylic Acids," Chapter 12, pp. 587–607, published prior to Mar. 30, 1999.

"Tamoxifen", p. 1171, published prior to Mar. 30, 1999.

Burnham and Harris, "Developments in Hydrocarbon Fluids for High–Temperature Fracturing," *J. Petroleum Technology*, pp. 217–220 Feb. 1980.

Gidley, J., Holditch, S., Nierode, D., Veatch, R., Jr., "Recent Advances in Hydraulic Fracturing," *Society of Petroleum Engineers* (1989).

Bilden, Kesavan, Dawson, "A New Polymer Approach Applicable for the Control of Water Production," Petroleum Network Education Conferences, pp. 1–10 (includes 4 pages of Figures), 1996.

Downs, "Formate Brines: Novel Drilling and Completion Fluids for Demanding Environments," SPE 25177, pp. 267–279, 1993.

Garner, et al., "The Effects of Hostile Environments on Coatings and Plastics," ACS Symposium Series (Sep. 12–17, 1982).

Burnham, et al, "Developments in Hydrocarbon Fluids for High Temperature Fracturing," SPE 7564 (1978).

Witco Corporation, "Humko Chemical Product Guide," 68810M GEN:001 (1988).

Akzo Chemicals Inc., "Industrial Surfactants Nitrogen derivatives," General Catalog Bulletin 92–1 (1992).

* cited by examiner

GELLED HYDROCARBON COMPOSITIONS AND METHODS FOR USE THEREOF

The present application claims priority on each of U.S. provisional patent application Ser. No. 60/148,274 filed on Aug. 11, 1999 now abandoned; co-pending U.S. provisional patent application Ser. No. 60/129,770 filed on Apr. 15, 1999, and U.S. provisional patent application Ser. No. 60/127,298 filed on Mar. 30, 1999 now abandoned. The entire text and all contents of each of the above referenced disclosures is specifically incorporated herein by reference without disclaimer.

BACKGROUND OF THE INVENTION

1. Field of the Invention

This invention relates generally to gelled organic compositions and methods for using the same. In particular, this invention relates to gelled liquid organic fluids, such as gelled liquid hydrocarbons formed from a mixture of an organic-based fluid, a carboxylic acid and/or other hydroxyl-containing compound, and a metal source compound.

2. Description of Related Art

Gelled organic fluids, such as gelled hydrocarbon liquids, may be employed for a variety of different purposes including, but not limited to, applications in the petroleum, refining, chemical and pipeline industries. In one common application, liquid hydrocarbon gels are employed as fluids for stimulation treatment of subterranean formations. Such stimulation treatments include, but are not limited to, hydraulic fracturing treatments with or without proppants, such as sand. In any event, it may be desirable to utilize liquid hydrocarbon gels for the stimulation of subterranean formations which are sensitive or adversely affected by introduction of aqueous-based fluids.

In the past, hydrocarbon liquids have been gelled in a number of different ways. For example, phosphate ester-based hydrocarbon gels are commonly employed in the formulation of hydrocarbon-based well treatment fluids. However, concerns have arisen regarding residual phosphates which may remain in refined petroleum products which have been exposed to, or processed using, phosphate-based hydrocarbon gels (such as through the use of phosphate-containing well treatment fluids, anti-foulants, scale inhibitors, etc.).

Non-phosphate-based hydrocarbon liquid gels have been developed. One conventional non-phosphate method of gelling liquid hydrocarbons involves the saponification of tall oil fatty acids ("TOFAs") with caustic. However, methods employing this and similar chemistries typically suffer from limited temperature stability, losing effectiveness at temperatures above about 130° F. to about 140° F.

Another conventional method of gelling liquid hydrocarbons involves mixing aluminum salts of long chain fatty acids with liquid hydrocarbons. However, gelation rates of such mixtures is typically very slow at temperatures below about 80° F., requiring heating to obtain satisfactory gelation times.

SUMMARY OF THE INVENTION

Disclosed are non-phosphate methods and compositions related to gelled organic liquids. These methods and compositions may be used in any application in which, for example, gelled hydrocarbon liquids are employed including, but not limited to, stimulation fluids for subterranean formations, drilling and workover fluids, treatment fluids for oil field production equipment and pipelines, treatment fluids for refinery and chemical processing facilities, etc.

The disclosed compositions may include select mixtures or formulations of linear and/or branched chain fatty acids, fatty acid salts, and other metal salts or metal alkoxides, blended to obtain desired gelled organic fluid properties. Surfactants and other additives may also be employed to further vary fluid properties. Exemplary compositions include, for example, mixtures of fatty acids, metal alkoxides, and fatty acid salts in hydrocarbon-base fluids, such as diesel.

Also disclosed are compositions which are reaction products of fatty acid salts with linear or branched chain fatty acids. Such a reaction product may advantageously be further processed, for example, dried and ground to a desired particle size. In this further processed state, the dried material may be dispersed or blended into an organic fluid, ultimately resulting in viscosity development. Advantageously, such a dried particulate reaction product allows components to be pre-reacted to form a product that may be conveniently stored and then added to an organic-based fluid at a later time to form a gelled organic liquid, without the need for reaction equipment or the performance of reaction procedures at the work site, for example, at a well site or chemical processing facility. Further advantageously, by varying particle size of solid reaction product particulate, amount of shear to which the combined materials exposed, and/or mixing dynamics (e.g., duration and/or amount of shear), viscosity development over time may be controlled to suit individual applications, such as those in which an initial relatively lower viscosity followed by development of later relatively higher viscosity are desired.

Also disclosed are non-phosphate compositions, and methods for using the same, which may include partial monoesters of styrene maleic anhydride copolymers and fatty alcohols ("MSMA's") for greatly enhanced rheology performance (e.g., viscosity, etc.) fluid compatibility and shelf life. As used herein, "MSMA-based compounds" include MSMA's as well as derivatives of MSMA's (such as sodium salts of sulfonated MSMA's). One or more MSMA-based compounds may be combined with one or more metal source compounds and one or more of other compounds described elsewhere herein, for example in mixtures or formulations comprising linear and/or branched chain fatty acids, fatty acid salts, and other metal salts or metal alkoxides. Alternatively, one or more MSMA-based compounds may be combined with one or more metal sources in the absence of other types of hydroxyl-containing compounds, such as fatty acids.

Many of such MSMA-based compounds are available in solid resin form and may be first dissolved in an organic solvent (e.g., xylene, toluene, or any solvent capable of dissolution of the MSMA-based compound) in any suitable amount (e.g., from about 1% to about 50%) MSMA-based compound by weight of organic solvent solution. The MSMA-based compound/solvent solution may then be combined in any suitable manner with other components. For example, a metal source, such as aluminum isopropoxide may be directly combined with the MSMA-based compound/solvent solution and heated (if necessary) to form a gelled fluid. Alternatively the MSMA-based compound/solvent solution may be combined with at least one fatty acid and at least one metal source, and heated (if necessary) to form a gelled fluid. Additional metal source may be "back added" following initial combination of ingredients, if so desired. This is represented in Table 69 in which additional isopropyl alcohol ("IPA") and aluminum isopropoxide were added at the end of the synthesis process.

Also disclosed are methods and compositions related to phosphate ester-containing gelled organic liquids. For example, MSMA-based compounds may be advantageously combined in an organic base fluid with phosphate ester compounds (such as EG-1 from Ethox Chemicals, Inc., Greenville S.C.; RHODAFAC LO-11A from Rhone-Poulenc, Cranbury, N.J.; ASP-160 or ASP-162 from Nalco-Exxon, Sugarland, Tex.; or HGA-70 from Clearwater, Inc., Pittsburgh, Pa.) and gelled with, for example, aluminum or iron metal source compounds such as aluminum isopropoxide, iron sulfate or an iron chelate solution, etc. For example, MSMA-based compound may be dissolved in an organic solvent such as toluene, xylene, etc. Separate liquid process streams containing MSMA/solvent, phosphate ester and metal source compound (e.g., aluminum isopropoxide, iron salt, etc.) may then be combined as part of a continuous mix process to form a gelled fluid. Examples of phosphate ester materials and methods of using the same may be found in U.S. Pat. Nos. 5,514,645; 5,417,287; 4,153,649; 3,505,374; 4,003,393; 4,200,540; 4,316,810; 5,271,464; and 4,622,155 which are incorporated herein by reference.

Advantageously, MSMA-based compounds may be used to obtain gelled organic liquids having increased stability, and in a wide variety of organic fluids, including organic fluids described elsewhere herein and containing components (e.g., asphaltenes) that may hamper stability and/or shelf-life of similar gels that lack MSMA-based compounds. Furthermore, such gelled organic liquids may be formulated with MSMA-based compounds to have relatively high viscosity (e.g., from about 2000 cp to about 1000 cp) at relatively low rates of shear (e.g., from about 40 to about 100 sec–1). Thus shear stress of such fluids may advantageously increase with decreasing shear rates, forming a gelled organic fluids capable of carrying relatively large concentrations of proppants, and offering reduced friction characteristics in flow regimes such as present in tubing. In one exemplary embodiment, at 100 C fluid viscosity may be about 1000 at 100 reciprocal seconds, while being about 2000 at 40 reciprocal seconds. Furthermore, viscosity of the disclosed gelled organic fluids may advantageously increase with increasing temperature, e.g., as a well treatment fluid is displaced downhole.

For example, in one embodiment MSMA-based compounds may be combined with asphaltene-containing crude oils and other components to form gelled organic liquids possessing more consistent and/or increased gel stability relative to comparable non-phosphate or phosphate-containing gelled fluids formulated without MSMA-based compound. Such increased stability may include increased shelf life as well as viscosity (e.g., up to about 1000 or 1200 centipoise) consistently in the presence of asphaltenes. Thus, when formulated and used as described herein, MSMA-based compounds allow gelled fluids to be formulated from crude oils containing impurities such as asphaltenes, therefore increasing the versatility of the system. In one embodiment, a gelled liquid may be formulated from a crude oil containing up to about 1%–5% asphaltenes by weight, although greater amounts of asphaltenes may be present as well.

MSMA-based compounds may be employed in any amount suitable for reaction and/or gellation of organic fluids using components and methods described elsewhere herein. In one embodiment, MSMA-based compound is present in a gelled an amount of from about 1% to about 10% alternatively from about 2% to about 6% and further alternatively from about 2.5% to about 4% by volume.

In one exemplary embodiment, gelled organic fluids may be formulated as described elsewhere herein, with the exception that MSMA-based compounds may be combined with (or substituted for) a portion of fatty acid materials. In this regard, virtually any ratio of fatty acid to MSMA-based compound may be employed. In one embodiment, a ratio of fatty acid to MSMA-based compound may be from about 1:1 to about 10:1, alternatively from about 3:1 to about 7:1, further alternatively from about 3:1 to about 5:1. Examples of formulations falling within these ranges may be found in Tables 61–69.

Further viscosity enhancement may advantageously be achieved in any of the embodiments described herein with the incorporation of high rosin fatty acid/s in place of, or in addition to, fatty acids described elsewhere herein. Rosin content of tall oil fatty acids typically range from less than about 1% to about 40% by weight rosin. By "high rosin" it is meant that a fatty acid contains from about 20% to about 80% by weight rosin. Examples include, but are not limited to, "UNITOL-S" and "UNITOL AR40" (the latter containing about 38% rosin), available from Arizona Chemical Company, Panama City, Fla.; and International Paper Company, Chemical Division. Other examples of specific fatty acids and high rosin fatty acids include, but are not limited to "UNITOL" products available from Arizona Chemical and International Paper, such as "PDT" distilled tall oil, "AR-40" specialty tall oil, "DPX", etc. Solid high rosin fatty acids may be prepared for use by dilution with a solvent, such as an aromatic solvent like toluene, xylene, "AROMATIC 150" from Amoco Chemical, etc.

When present, additional viscosity may be imparted to a gelled organic fluid by high rosin fatty acids, and when introduced to an organic fluid at a temperature of, for example, about 25 C to about 27 C, considerable viscosity development may be achieved. Further increased viscosity may be achieved with increasing temperatures. In such a way, gel time (or vortex closure time as described in the examples) may be shortened (for example, from about 180 seconds to about 30 seconds, alternatively to about 30 seconds) and/or controlled, for example using temperature. In one embodiment, high rosin fatty acid is employed in a gelled organic fluid in an amount of from about 0.05 to about 0.4 alternatively from about 0.1 to about 0.2, although greater and lesser amounts are also possible.

Advantageously then, by utilizing the disclosed method and compositions, non-phosphate gelled organic liquids may be formulated having rheological and viscosity characteristics superior to conventional non-phosphate gelled hydrocarbon compositions. Furthermore, the disclosed organic liquid gels have better high temperature stability than previous non-phosphate systems. Surprisingly, by employing combinations of metal source compounds, such as a carboxylic acid salt in addition to metal saponifier (such as metal hydroxide), improved viscosity performance and stability may be achieved at relatively high temperatures as compared to conventional non-phosphate gelled hydrocarbon systems. In one exemplary embodiment, relatively good viscosity characteristics may be achieved at temperatures up to at least about 300° F. In another possible embodiment, viscosities of up to about 900 centipoise, alternatively up to about 800 centipoise, alternatively from about 300 centipoise to about 900 centipoise, further alternatively from about 300 to about 800 centipoise, further alternatively from about 800 to about 900 centipoise may be achieved at temperatures up to about 250° F. to about 275° F. In still another possible embodiment, a viscosity of at least about 400 centipoise as measured at $100^{-1}$ seconds on a Fann 50C rotational viscometer may be realized at a temperature of up to about 275° F.

In one respect, disclosed is a method of forming a gelled organic-based treatment fluid, including combining at least one organic base fluid, at least one carboxylic acid, and at least one first metal source compound to form the gelled organic fluid. The metal source compound may include at least one of carboxylic acid salt, metal oxide, metal hydroxide, metal alkoxide or mixture thereof. The combining further may include combining a second metal source compound with the hydrocarbon base fluid, carboxylic acid and first metal source compound; wherein the first metal source compound may include salt of carboxylic acid; and wherein the second metal source compound may include at least one of metal oxide, metal hydroxide, metal alkoxide, metal sulfate or mixture thereof. The carboxylic acid may include tall oil fatty acid; wherein the carboxylic acid salt may include aluminum octoate; and wherein the second metal source compound may include aluminum hydroxide. At least one first metal source compound may be combined in the form of a solid compound suspended in an organic fluid. The method may further include introducing the gelled organic-based treatment fluid into a wellbore, subterranean formation, pipeline interior, or fluid processing facility. The method may further included introducing the gelled organic-based treatment fluid into a pipeline interior.

In another respect, disclosed is a method of forming and using a gelled organic-based fluid, including combining at least one organic base fluid, at least one carboxylic acid, at least one first metal source compound, and at least one second metal source compound to form the gelled organic fluid; and introducing the gelled organic fluid into a wellbore, pipeline interior or fluid processing facility; wherein the first and second metal source compounds are different compounds; and wherein the metal of the first metal source has a valence of +3; and wherein the metal of the second metal source has a valence of +3.

In another respect, disclosed is a method of forming a gelled organic-based fluid, including combining the following components to form the gelled organic fluid: at least one organic base fluid; at least one MSMA-based compound; and at least one first metal source compound.

In another respect, disclosed is a method of treating a subterranean formation, including introducing a hydrocarbon-based treatment fluid into at least a portion of the formation, the hydrocarbon-based treatment fluid including a mixture of at least one hydrocarbon base fluid, at least one carboxylic acid, at least one first metal source compound including salt of carboxylic acid, and at least one second metal source compound. The salt of carboxylic acid may include at least one of aluminum ethyl hexanoate, aluminum methyl pentoate, iron octoate, aluminum stearate, or mixtures thereof. The carboxylic acid may include at least one fatty acid having from about 6 to about 24 carbon atoms, and in one embodiment specifically may be tall oil fatty acid. The second metal source compound may be at least one of metal salt, metal alkoxide, metal oxide, metal chelate, metal hydroxide, or a mixture thereof. The second metal source compound may be at least one of sodium hydroxide, aluminum hydroxide, aluminum isopropoxide, or a mixture thereof. The hydrocarbon-based treatment fluid may be introduced into the formation at a pressure above a fracturing pressure of the formation.

In another respect, disclosed is a method of treating a subterranean formation, including introducing a hydrocarbon-based treatment fluid into at least a portion of the formation, the hydrocarbon-based treatment fluid including a mixture of at least one hydrocarbon base fluid, at least one carboxylic acid, at least one first metal source compound including salt of carboxylic acid, and at least one second metal source compound; wherein the salt of carboxylic acid may include at least one of aluminum ethyl hexoate, aluminum methyl pentoate, iron octoate, aluminum stearate, or mixture thereof; and wherein the hydrocarbon-based treatment fluid may be introduced into the formation at a pressure above a fracturing pressure of the formation. The salt of carboxylic acid may include aluminum ethyl hexanoate. The carboxylic acid may include at least one fatty acid having from about 6 to about 24 carbon atoms, and in one embodiment may be tall oil fatty acid. The second metal source compound may be at least one of metal salt, metal alkoxide, metal hydroxide, metal oxide, metal chelate, or a mixture thereof. The second metal source compound may be at least one of sodium hydroxide, aluminum hydroxide, aluminum isopropoxide, or a mixture thereof. The hydrocarbon base fluid may include at least one of diesel, aromatic compound, or a mixture thereof. The hydrocarbon-based treatment fluid further may include a surfactant.

In another respect, disclosed is a method of treating a subterranean formation, including introducing a hydrocarbon-based treatment fluid into at least a portion of the formation, the hydrocarbon-based treatment fluid including a mixture of at least one hydrocarbon base fluid, at least one carboxylic acid, at least one first metal source compound including salt of carboxylic acid, and at least one second metal source compound; wherein the carboxylic acid may include at least one fatty acid having from about 6 to about 24 carbon atoms; wherein the salt of carboxylic acid may include at least one of aluminum ethyl hexoate, aluminum methyl pentoate, iron octoate, aluminum stearate, or mixture thereof, or a mixture thereof; wherein the second metal source compound may include at least one of metal salt, metal alkoxide, metal hydroxide, metal oxide, metal chelate, or a mixture thereof; and wherein the hydrocarbon-based treatment fluid may be introduced into the formation at a pressure above a fracturing pressure of the formation. The salt of carboxylic acid may include aluminum ethyl hexanoate; the carboxylic acid may include tall oil fatty acid; and the second metal source compound may be at least one of sodium hydroxide, aluminum hydroxide, aluminum isopropoxide, or a mixture thereof. The carboxylic acid may include tall oil fatty acid; and the second metal source compound may include aluminum hydroxide, aluminum isopropoxide, or a mixture thereof. The hydrocarbon base fluid may include at least one of diesel, aromatic compound, or a mixture thereof. The hydrocarbon-based treatment fluid further may include a surfactant. The surfactant may include at least one of sodium dodecylbenzenesulfonate, ethoxylated stearate, isopropyl alcohol, or a mixture thereof.

In another respect, disclosed is a gelled organic-based treatment fluid including a mixture of at least one organic base fluid, at least one carboxylic acid, at least one first metal source compound including salt of carboxylic acid, and at least one second metal source compound.

In another respect, disclosed is a reaction product of at least one carboxylic acid, at least one metal source compound, and at least one MSMA-based compound.

In another respect, disclosed is a reaction product of at least one carboxylic acid, at least one first metal source compound, and at least one second metal source compound; the first and second metal source compounds being different compounds.

In another respect, disclosed is a solid particulate reaction product of at least one, carboxylic acid and at least one salt of carboxylic acid. The reaction product may be of at least one carboxylic acid, at least one salt of carboxylic acid, and at least one second metal source compound including at least one of metal salt, metal alkoxide, metal hydroxide, metal oxide, metal chelate, or a mixture thereof. The reaction particulate may have a particle size of from about 100 mesh to about 325 mesh.

In another respect, disclosed is a method of forming a gelled organic-based treatment fluid, including combining at least one organic base fluid with the solid particulate reaction product, said reaction product being of the combination of at least one carboxylic acid, at least one salt of carboxylic acid, and at least one second metal source compound including at least one of metal salt, metal alkoxide, metal hydroxide, metal oxide, metal chelate, or a mixture thereof. The carboxylic acid may include tall oil fatty acid; wherein the carboxylic acid salt may include aluminum octoate; and wherein the second metal source compound may include aluminum hydroxide. The second metal source compound may be combined in the form of a solid compound suspended in an organic fluid. The method may further include introducing the gelled organic-based treatment fluid into a wellbore. The method may further include introducing the gelled organic-based treatment fluid into a subterranean formation. The method may further include introducing the gelled organic-based treatment fluid into a pipeline interior. The method may further include introducing the gelled organic-based treatment fluid into a fluid processing facility.

In another respect, disclosed is a method of forming a gelled organic-based fluid, including the steps of combining at least one organic base fluid with a solid reaction product of at least one carboxylic acid and at least one first metal source compound to form the gelled organic fluid. The first metal source compound may include at least one of carboxylic acid salt, metal oxide, metal halide, metal hydroxide, metal alkoxide, metal sulfate, or mixture thereof. The metal of the first metal source compound may be aluminum, iron, or a mixture thereof. The combining further may include combining a second metal source compound with the organic base fluid and the solid reaction product. The first metal source compound may include salt of carboxylic acid; and the second metal source compound may include at least one of metal oxide, metal halide, metal hydroxide, metal alkoxide, metal sulfate or a mixture thereof. The metal of the first and second metal source compounds may be aluminum, iron, or a mixture thereof. The solid reaction product may include a reaction product of at least one carboxylic acid, the first metal source compound and a second metal source compound. The first metal source compound may include salt of carboxylic acid; and the second metal source compound may include at least one of metal oxide, metal hydroxide, metal halide, metal alkoxide, metal sulfate or mixture thereof. The metal of the first and second metal source compounds may be aluminum, iron, or a mixture thereof. The carboxylic acid may include at least one fatty acid having from about 6 to about 24 carbon atoms; and the first metal source compound may include aluminum octoate, aluminum stearate, iron octoate, aluminum 2,4-pentadione, iron 2,4-pentadione, aluminum oxide, iron hydroxide, aluminum hydroxide, aluminum isopropoxide, aluminum chloride, sodium hydroxide, ferric ammonium sulfate, or a mixture thereof. The carboxylic acid may include at least one fatty acid having from about 6 to about 24 carbon atoms; the carboxylic acid salt may include aluminum octoate, aluminum stearate, iron octoate, aluminum 2,4-pentadione, iron 2,4-pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include at least one fatty acid having from about 6 to about 24 carbon atoms; the carboxylic acid salt may include aluminum octoate, aluminum stearate, iron octoate, aluminum 2,4-pentadione, iron 2,4-pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include oleic acid, linoleic acid, or a mixture thereof. The organic base fluid may be at least one of alcohol, aliphatic hydrocarbon, aromatic hydrocarbon, or a mixture thereof. The organic base fluid may be at least one of diesel, kerosene, gasoline, condensate, crude oil, mineral oil, vegetable oil, xylene, toluene, benzene, ethyl benzene, napthalene, or a mixture thereof. The solid reaction product may include a reaction product of at least one organic base fluid, at least one carboxylic acid, at least one first metal source compound and at least one second metal source compound. The solid reaction product may be combined with the organic base fluid in the form of a solid compound suspended in an organic fluid. The method may further include combining a surfactant with the organic base fluid. The method may further include combining with the organic base fluid at least one of a surfactant, organic amine, polyacrylic acid or mixture thereof. The surfactant may include at least one of fatty acid derived amine, alkoxylated fatty amine, linear alkyl benzene sulfonates, ethoxylated fatty alcohols, nonylphenols, fatty acid-derived amines, alkoxylated fatty amines, or mixtures thereof. The surfactant may include at least one of sodium dodecylbenzenesulfonate, ethoxylated stearate, isopropyl alcohol, or a mixture thereof. The method may further include combining with the organic base fluid a breaker material. The method may further include introducing the gelled organic-based fluid into a wellbore. The gelled organic-based fluid may be introduced into a subterranean formation at a pressure above a fracturing pressure of the subterranean formation. The method may further include introducing the gelled organic-based fluid into a pipeline interior. The method may further include introducing the gelled organic-based fluid into a fluid processing facility.

In another respect, disclosed is a method of forming and using a gelled organic-based fluid, including: combining at least one organic base fluid, at least one carboxylic acid, at least one first metal source compound, and at least one second metal source compound to form the gelled organic fluid; and introducing the gelled organic fluid into a wellbore, pipeline interior or fluid processing facility; wherein the first and second metal source compounds are different compounds. The first metal source compound may include at least one of carboxylic acid salt, metal oxide, metal halide, metal hydroxide, metal alkoxide, metal sulfate or a mixture thereof; and the second metal source compound may include at least one of carboxylic acid salt, metal oxide, metal halide, metal hydroxide, metal alkoxide, metal sulfate or a mixture thereof. The first metal source compound may include salt of carboxylic acid; and the second metal source compound may include at least one of metal oxide, metal hydroxide, metal halide, metal alkoxide, metal sulfate or a mixture thereof. The metal of the first and second metal source compounds may be aluminum, iron, or a mixture thereof. The carboxylic acid salt may include aluminum octoate, aluminum stearate, iron octoate, aluminum 2,4-pentadione, iron 2,4-pentadione, or a mixture thereof; and the metal of the second metal source compound may be aluminum, iron, or a mixture thereof. The carboxylic acid salt may include aluminum octoate, aluminum stearate, iron octoate, aluminum 2,4-pentadione, iron 2,4-pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include at least one fatty acid having from about 6 to about 24 carbon atoms; the carboxylic acid salt may include aluminum octoate, aluminum stearate, iron octoate, aluminum 2,4-pentadione, iron 2,4-pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include oleic acid, linoleic acid, or a mixture thereof. The organic base fluid may be at least one of alcohol, aliphatic hydrocarbon, aromatic hydrocarbon, or a mixture thereof. The organic base fluid may be at least one of diesel, kerosene, gasoline, condensate, crude oil, mineral oil, vegetable oil, xylene, toluene, benzene, ethyl benzene, napthalene, or a mixture thereof. At least one of the metal sources may be combined with the organic base fluid in the form of a solid compound suspended in an organic fluid. The method may further include combining a surfactant with the organic base fluid. The method may further include combining with the organic base fluid at least one of a surfactant, organic amine, polyacrylic acid or mixture thereof. The surfactant may include at least one of fatty acid derived amine, alkoxylated fatty amine, linear alkyl benzene sulfonates, ethoxylated fatty alcohols, nonylphenols, fatty acid-derived amines, alkoxylated fatty amines, or mixtures thereof. The surfactant may include at least one of sodium dodecylbenzenesulfonate, ethoxylated stearate, isopropyl alcohol, or a mixture thereof. The method may further include combining with the organic base fluid a breaker material. The gelled organic-based fluid may be introduced into a wellbore. The gelled organic-based fluid may be introduced into a subterranean formation at a pressure above a fracturing pressure of the subterranean formation. The gelled organic-based fluid may be introduced into a pipeline interior. The gelled organic-based fluid may be introduced into a fluid processing facility.

In another respect, disclosed is a gelled organic-based fluid including the reaction product of least one organic base fluid, at least one carboxylic acid, at least one first metal source compound, and at least one second metal source compound; wherein the carboxylic acid may include at least one fatty acid having from about 6 to about 24 carbon atoms; the carboxylic acid salt may include aluminum octoate, aluminum stearate, iron octoate, aluminum 2,4-pentadione, iron 2,4pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include oleic acid, linoleic acid, or a mixture thereof. The organic base fluid may be at least one of alcohol, aliphatic hydrocarbon, aromatic hydrocarbon, or a mixture thereof. The organic base fluid may be at least one of diesel, kerosene, gasoline, condensate, crude oil, mineral oil, vegetable oil, xylene, toluene, benzene, ethyl benzene, napthalene, or a mixture thereof.

In another respect, disclosed is a solid reaction product of at least one carboxylic acid and at least one first metal source compound. The first metal source compound may include at least one of carboxylic acid salt, metal oxide, metal halide, metal hydroxide, metal alkoxide, metal sulfate, or mixture thereof. The metal of the first metal source compound may be aluminum, iron, or a mixture thereof. The reaction product may be of at least one carboxylic acid, at least one first metal source compound, and at least one second metal source compound. The first metal source compound may include salt of carboxylic acid; and the second metal source compound may include at least one of metal oxide, metal halide, metal hydroxide, metal alkoxide, metal sulfate or a mixture thereof. The metal of the first and second metal source compounds may be aluminum, iron, or a mixture thereof. The carboxylic acid may include at least one fatty acid having from about 6 to about 24 carbon atoms; and the first metal source compound may include aluminum octoate, aluminum stearate, iron octoate, aluminum 2,4-pentadione, iron 2,4-pentadione, aluminum oxide, iron hydroxide, aluminum hydroxide, aluminum isopropoxide, aluminum chloride, sodium hydroxide, ferric ammonium sulfate, or a mixture thereof. The carboxylic acid may include at least one fatty acid having from about 6 to about 24 carbon atoms; the carboxylic acid salt may include aluminum octoate, aluminum stearate, iron octoate, aluminum 2,4-pentadione, iron 2,4-pentadione, or a mixture thereof; and the second metal source compound may include at least one of aluminum oxide, iron hydroxide, aluminum hydroxide, aluminum isopropoxide, aluminum chloride, sodium hydroxide, ferric ammonium sulfate, or a mixture thereof. The carboxylic acid may include oleic acid, linoleic acid, or a mixture thereof. The solid reaction product may include a reaction product of at least one organic base fluid, at least one carboxylic acid, at least one first metal source compound and at least one second metal source compound. The solid particulate reaction product may have a particle size of from about 100 mesh to about 325 mesh.

DESCRIPTION OF ILLUSTRATIVE EMBODIMENTS

Figure 1:
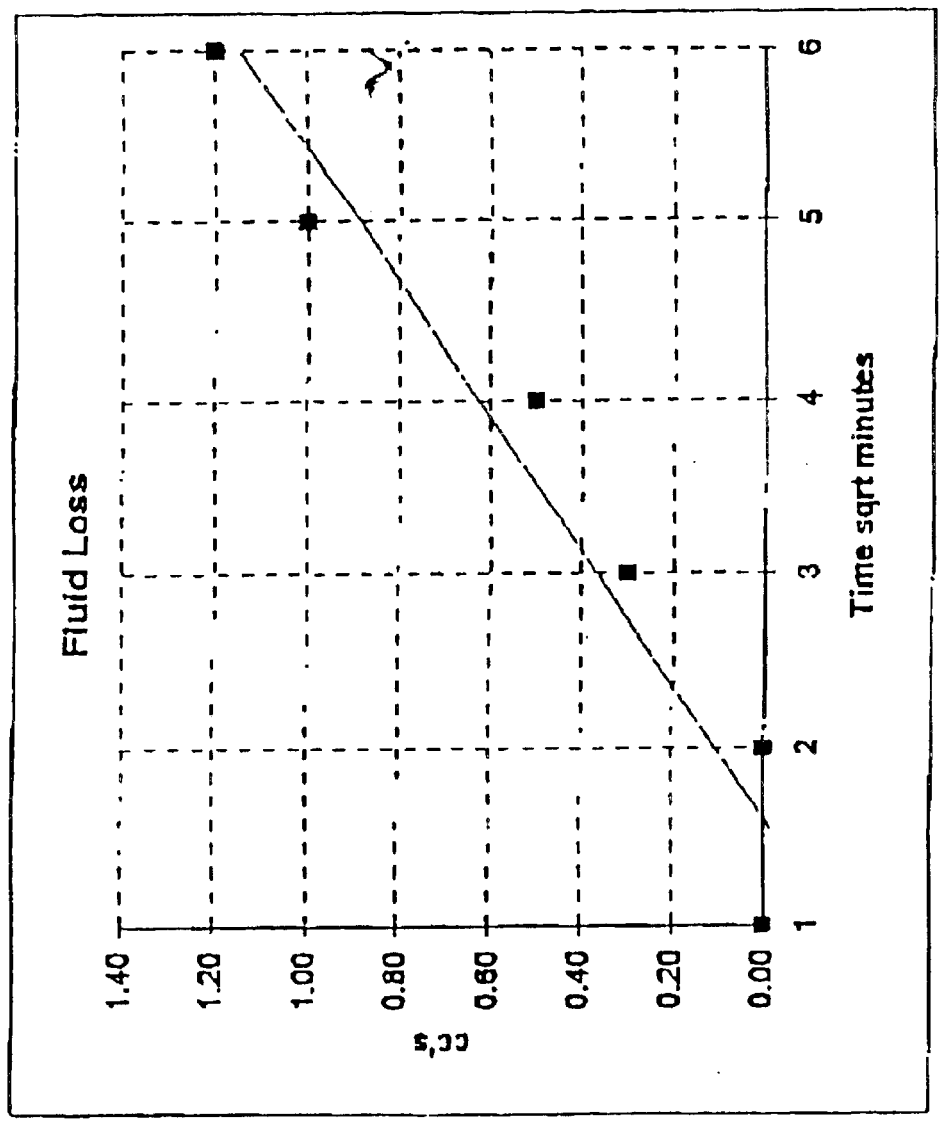
FIG. 1 shows fluid loss data for a MSMA-containing gelled organic fluid according to one embodiment of the disclosed methods and compositions.

As used herein, the indefinite articles "a" and "an" connote "one or more."

In the practice of the disclosed method and compositions, non-phosphate gelled organic liquids possessing relatively stable rheological characteristics at relatively high temperatures may advantageously be formulated from solid or liquid components combined with organic base fluid.

In one embodiment, a reaction product or gelling agent component may be first formed from individual reaction components. The reaction product may then be combined with an organic base fluid to form a gelled treatment fluid, for example, for use in a well treatment, pipeline treatment, etc. For example, at least one carboxylic acid may be combined with at least one metal source compound, such as a salt of carboxylic acid, other metal salt, metal oxide or metal hydroxide to form a viscous reaction product. In another example, at least one carboxylic acid may be combined with at least one first metal source compound comprising salt of carboxylic acid and at least one second metal source compound comprising another type of metal source compound, such as a metal alkoxide, metal hydroxide, metal oxide, metal sulfate, etc. to form a reaction product. These are just two examples only, and it will be understood that any combination of reaction components described herein may be used to form a reaction product or gelling agent, that may be subsequently or later added to an organic base fluid to form a gelled treatment fluid. Such reaction products may be solid or liquid, and in that regard may be relatively viscous liquids or relatively non-viscous liquids.

When reaction components are combined to from a reaction product or gelling agent prior to combination with an organic base fluid, the reaction components may be optionally combined in the presence of an organic solvent or mixture of organic solvents. As used herein, "organic solvent" includes, for example, any organic fluid medium suitable to facilitate ease of reaction and/or intermixing of the disclosed reactants, ease of handling of the disclosed reactants or resulting reaction products, and/or that may be optionally selected to be removable (e.g. by distillation) from a reaction product, following reaction. An organic solvent may also be selected to substantially non-reactive with the chosen reaction components. Organic solvents may be selected to have desired properties relative to the given reactants employed and may be chosen, for example, from any of the hydrocarbon or other organic fluids listed elsewhere herein as suitable for organic base fluids. Alternatively, no organic solvent may be used where the given individual reactants are capable of intermixing and reaction to form a reaction product or gelling agent in the absence of added organic solvent, or where individual reactin of components are added directly to an organic base fluid as described elsewhere herein.

A viscous reaction product or gelling agent may be used to gel or viscosify an organic base fluid by direct combination with an organic base fluid. Alternatively, a viscous reaction product may be dried, such as by desiccation, then ground to a solid particulate reaction product which may then be added to an organic base fluid to form a gelled organic fluid. In a further embodiment, the components of the above-mentioned embodiments may be individually added to, or combined directly with, an organic base fluid to form a gelled organic fluid. Such individual components may be added as solids or liquids, as appropriate. If desired, any of the solid components described herein may be combined with a suitable solvent prior to combination with an organic base fluid. Alternatively, a slurry of such solid components may be formed prior to combination if so desired.

With benefit of this disclosure, the disclosed non-phosphate gelled organic liquids may be employed in any application known in the art in which, for example, gelled hydrocarbon liquids are suitable for use. As used herein, the terms "gel" and "gelled" refer fluids that exhibit semi-solid elastic behavior. While not wishing to bound by theory, it is believed that the surprising stability of the disclosed temperature stable non-phosphate organic liquid gels results from formation of complexes between carboxyl groups of carboxylic acids and metal groups of carboxylic acid salts and/or other metal source compounds.

Examples of possible applications include, but are not limited to, well treatment fluids (including stimulation fluids such as fracture fluids, matrix stimulation fluids, acidizing fluids, hydrocarbon-based treatment fluids etc.), drilling fluids (such as drilling muds, drill-in fluids, workover fluids, packer fluids, completion fluids, fluids for use with coil tubing, etc.), pipeline treatment fluids (such as gelled pipeline pigs, separation plugs, etc.), as hydrocarbon friction reducer compositions in pipeline and other tubular applications (e.g., for use with crude oil, refined oil or other hydrocarbons, etc.), process facility treatment fluids (such as gelled fluids for cleaning and/or chemical processing equipment used in oil field facilities, refineries, chemical plants, refineries, etc.).

As used herein, an "organic base fluid" is any organic fluid medium suitable for forming an organic fluid gel, including those organic fluids commonly employed in oil field, pipeline and refinery or chemical plant applications. Suitable organic base fluids include, but are not limited to, hydrocarbon-based fluids and other organic fluids. Types of suitable organic base fluids include, but are not limited to, aliphatic, alicyclic and aromatic hydrocarbons, acids, ketones, aldehydes, ethylene glycols, polyethylene glycols, amines, alcohols, esters, derivatives of these compounds, as well as mixtures thereof. Specific examples of suitable aliphatic hydrocarbons include, but are not limited to, alkanes such as propane, n-butane, isobutane, n-hexane, n-octane, n-decane, n-tridecane, etc. Other aliphatics include alkenes and alkadienes. Alicyclic compounds include cyclohexane, etc. Specific examples of suitable aromatics include, but are not limited to, benzene, toluene, xylene, ethylbenzene and other alkyl benzenes, napthalene, etc. Other examples include nonylphenols, ethoxylated nonylphenol, etc. Particular examples of commercial aromatic products include, but are not limited to, "FRACSOL", "FRACSOL-S", "XYSOL" from Trysol of Calgary, Canada or Amsol of the United States.

Other specific examples of suitable organic base fluids include, but are not limited to at least one of diesel, gasoline, kerosene, reformate, naphthalene, xylene, toluene, mineral oil, light mineral oil, condensate, crude oil, lubricating oils, or mixtures thereof (such as diesel mixed with condensate to lower API gravity, etc.). Other organic base fluids such as alcohols (like methanol, ethanol, propanol, isopropyl alcohol, butanol, pentanol, hexanol, 2-methylhexanol, etc.), alkanes (such as hexane), glycols (such as ethylene glycol "EB" available from Dow Chemical), ester materials (such as "RDPE" available from Rhone Poulenc), and derivatized alkanes (such as alkylhexanes), may also be employed. Organic-based solvents known to those of skill in the art as "mutual solvents" may also be used. Other suitable organic fluids (including oily esters), are described in U.S. Pat. No. 5,519,063, which is incorporated by reference herein in its entirety.

Also suitable are synthetic oils (including, but not limited to, synthetic hydrocarbon-base oils, ester-type oils, alkylene polymers, polysiloxanes, etc.). Also suitable are more environmentally compatible (e.g., biodegradable) natural or synthetic organic base fluids such as Exxon's "ESCAID 90" or "ESCAID 110", or refined kerosene (such as "LOTOX" available from Exxon), "ALPHA OLEFIN" (from Baker Performance Chemical), "HYDROSOLV P150" or "HYDROSOLV B100" (from Shrieve Chemical Products), "ISOPAR L" or "ISOPAR M" (from Nalco-Exxon Chemical Company), etc. Natural organic based fluids such as animal oils and vegetable oils may also be suitable including, but not limited to, linseed oil, palm oil, cotton seed oil, rapeseed oil, soybean oil, olive oil, canola oil, sunflower oil, peanut oil, etc. Also suitable are one or more organic-based solvents known in the art as "mutual solvents." Examples of suitable co-solvents include mutual solvents such as glycol-ethers including, but not limited to, ethylene glycol monobutyl ether ("EGMBE").

With benefit of this disclosure, those of skill in the art will understand that the organic base fluids listed herein, as well as other organic base fluids, may be mixed or blended together as desired to provide a non-phosphate liquid organic gel having desired characteristics. In one exemplary embodiment, an organic fluid may be a liquid hydrocarbon that is at least one of diesel, condensate, or mixtures thereof. It will be understood that these organic base fluids are exemplary only, and that any other suitable organic fluids, including those mentioned elsewhere herein, may also be employed.

Further information on suitable organic-based fluids may be found in the U.S. patent application Ser. No. 09/151,169 entitled "Surfactant Compositions and Uses Therefor" by Joseph E. Thompson, Sr., filed Sep. 10, 1998, which is incorporated herein by reference in its entirety.

Examples of carboxylic acids which may be employed in the practice of the disclosed invention include any carboxylic acid suitable for use in forming a gelled organic liquid when combined with salt of carboxylic acid and other source of metal ions. Such suitable carboxylic acids may be branched, linear or unbranched, saturated, unsaturated, aliphatic and/or aromatic, and/or derivatives thereof. Suitable classes of carboxylic acids include, but are not limited to, solid, semisolid and liquid, saturated and unsaturated, fatty acids, such as those saturated carboxylic acids having from about 4 to about 22 carbon atoms. Additional information on suitable carboxylic acids may be found may be found elsewhere herein, for example, under the heading "Carboxylic Acids." Examples of monomers and polymers containing carboxylic acid functionality may be found in U.S. Pat. Nos. 4,612,332; 4,673,716; 4,694,046; 4,694,058; 4,709,759; 4,734,205; 4,780,517, 4,960,821; and 5,036,136, which are incorporated by reference herein in their entirety.

In one exemplary embodiment, examples of suitable saturated aliphatic carboxylic acids include, but are not limited to, saturated aliphatic carboxylic acids having from about 6 to about 35 carbon atoms, alternatively about 8 to about 28 carbon atoms, and further alternatively about 8 to about 18 carbon atoms. Specific examples of suitable and exemplary saturated aliphatic carboxylic acids include, but are not limited to, at least one of butyric acid, lauric acid or mixtures thereof. It will be understood that these acids are exemplary only, and that any other suitable saturated aliphatic carboxylic acid, including those mentioned elsewhere herein, may also be employed.

Examples of suitable unsaturated carboxylic acids include, but are not limited to, unsaturated acids aliphatic carboxylic acids having from about 6 to about 35 carbon atoms, alternatively about 8 to about 28 carbon atoms, and further alternatively about 8 to about 18 carbon atoms. Specific examples of suitable unsaturated carboxylic acids include, but are not limited to, oleic, linoleic, tall oil fatty acids (described elsewhere herein, e.g., in one embodiment primarily oleic and linoleic acids), palmitic acid, stearic acid, or mixtures thereof. It will be understood that these acids are exemplary only, and that any other suitable unsaturated aliphatic carboxylic acid, including those mentioned elsewhere herein, may also be employed.

In another exemplary embodiment, suitable aromatic carboxylic acids include, but are not limited to, aromatic carboxylic acids having from greater than about 6 carbon atoms, alternatively from about 6 to about 30 carbon atoms, further alternatively from about 6 to about 20 carbon atoms, although greater number of carbon atoms are possible. Specific examples of suitable aromatic atoms include, but are not limited to benzoic acid, and mixtures of benzoic acid with other aromatic carboxylic acids. It will be understood that these aromatic carboxylic acids are exemplary only, and that any other suitable aromatic carboxylic acid, including those mentioned elsewhere herein, may also be employed. It will also be understood with benefit of the present disclosure that mixtures and blends of branched, unbranched, saturated, unsaturated, aromatic and/or aliphatic carboxylic acids may be employed.

In the practice of the disclosed method and compositions, one or more metal source compounds may be employed, for example, to impart characteristics of stable viscosity at relatively high temperatures. Any relative amounts of one or more metal source compounds and one or more carboxylic acids may be combined that is suitable for at least partially viscosifying or gelling organic fluids disclosed herein. However, with benefit of this disclosure, those of skill in the art will understand that for complete interaction between metal source compounds and carboxylic acid material, sufficient carboxyl groups should be present to satisfy the valence of each metal site. For example, in one embodiment, mono carboxylic acids may be combined with aluminum source compound/s in amounts sufficient to achieve a molar ratio of about 3 moles of monocarboxylic acid to about 1 mole of aluminum, including any carboxylic acid groups supplied by carboxylic acid salt present. In another embodiment employing dicarboxylic acid, dicarboxylic acid may be combined with aluminum metal source compound/s in an amount sufficient to achieve a molar ratio of about 1.5 moles of dicarboxylic acid to about 1 mole of aluminum, taking into account any carboxylic acid salt present. However, it will also be understood that complete interaction between metal sites and carboxyl groups is not necessary to achieve benefits of the disclosed method, so that other molar ratios (greater and lesser), are possible. Furthermore, by varying the ratio of carboxyl groups to metal sites (from ratios less than stochiometric to ratios greater than stochiometric), viscosity characteristics may be varied. For example, suitable ranges of molar ratios of aluminum to carboxylic acid for monocarboxylic acid formulations may be from about 1 to about 11, alternatively from about 2 to about 10, further alternatively from about 3 to about 7. Table A is a list of 10 example formulations and molar ratios achieved therewith.

TABLE A

Example Formulations and Molar Ratios

| Component | Amount, g/250 ml | Molecular Weight | Moles Carboxylic Acid | Moles Al | Molar Ratio of Carb. Acid to Al |
|---|---|---|---|---|---|
| Stearic Acid | 15 | 284.47 | .0527 | | |
| Al Isopropoxide | 0.91 | | | .0045 | |
| Al Octoate | 3 | | .0198 | .0066 | |
| Totals | | | .0724 | .0110 | 6.570 |
| Linoleic Acid | 13.5 | 280.44 | .0481 | | |
| Al Isopropoxide | 3.27 | | | .0160 | |
| Al Octoate | 3 | | .0198 | .0066 | |
| Totals | | | .0678 | .0226 | 3.005 |
| Linoleic Acid | 13.5 | 280.44 | .0481 | | |
| Al Isopropoxide | .91 | | | .0045 | |
| Al Octoate | 3 | | .0198 | .0066 | |
| Totals | | | .0678 | .0110 | 6.154 |
| 2-ethyl-hexanoate acid | 13.1 | 144.21 | .0908 | | |

TABLE A-continued

Example Formulations and Molar Ratios

| Component | Amount, g/250 ml | Molecular Weight | Moles Carboxylic Acid | Moles Al | Molar Ratio of Carb. Acid to Al |
|---|---|---|---|---|---|
| Al Isopropoxide | 0.91 | | | .0045 | |
| Al Octate | 3 | | .0198 | .0066 | |
| Totals | | | .1106 | .0110 | 10.027 |
| Oleic Acid | 13.65 | 282.46 | .0483 | | |
| Al Isopropoxide | 3.3 | | | .0162 | |
| Al Octate | 3 | | .0198 | .0066 | |
| Totals | | | .0680 | .0227 | 2.994 |
| Oleic Acid | 13.65 | 282.46 | .0483 | | |
| Al Isopropoxide | 0.91 | | | .0045 | |
| Al octoate | 3 | | .0198 | .0066 | |
| Totals | | | .0680 | .0110 | 6.171 |
| Palmitic Acid | 15 | 256.42 | .0585 | | |
| Al Isopropoxide | 3.98 | | | .0195 | |
| Al Octate | 3 | | .0198 | .0066 | |
| Totals | | | .0782 | .0261 | 3.002 |
| Palmitic Acid | 15 | 256.42 | .0585 | | |
| Al Isopropoxide | 0.91 | | | .0045 | |
| Al Octvate | 3 | | .0198 | .0066 | |
| Totals | | | .0782 | .0110 | 7.093 |
| 2-ethyl-hexanoic acid | 13.1 | 144.21 | .0908 | | |
| Al Isopropoxide | 6.18 | | | .0303 | |
| Al Octate | 3 | | .0198 | .0066 | |
| Totals | | | .1106 | .0368 | 3.002 |
| Stearic Acid | 15 | 284.47 | .0527 | .0527 | |
| Al Isopropoxide | 3.6 | | | .0176 | |
| Al Octate | 3 | | .0198 | .0066 | |
| Totals | | | .0724 | .0242 | 2.994 |

Suitable "metal source compounds" include any metal source capable of supplying metal atoms capable of complexing, reacting or otherwise interacting with carboxylic acid to form a gelled organic liquid when combined with organic liquid. Metal source compounds may include compounds having ionically or covalently bonded metal ions. Suitable metal ions include, for example, ions of metals from IUPAC Groups 1–14, alternatively IUPAC Groups 1–13, alternatively IUPAC Groups 1, 2, 8, and 3 of the periodic table. These metal ions are also identified in order number 11, 12, 13, 18 and 20 of the periodic table. Included are metal ions selected from the alkali earth and/or alkaline earth metal groups of the periodic table. In one exemplary embodiment, metal ions may be selected from at least one of iron ions, aluminum ions, sodium ions, calcium ions or mixtures thereof.

In another exemplary embodiment, metal source compounds may include a metal atom that has a +3 valence, for example, aluminum, iron, etc. For example, first and/or second metal sources containing metal atoms that have a +3 valence may be employed, as desired, in the embodiments described herein that include such metal source compounds. It will be understood that these types of compounds are exemplary only, and that any other suitable metal source compounds, including those mentioned elsewhere herein, may also be employed.

Salts of carboxylic acid which may be employed as metal source compounds in the practice of the disclosed method and compositions include any carboxylic acid salt suitable for use in forming a gelled organic liquid when combined with carboxylic acid and/or when optionally combined with other metal source compounds. Suitable types of carboxylic acid salts include, but are not limited to, salts of branched, linear or unbranched, saturated, unsaturated, aliphatic and/or aromatic carboxylic acids, such as any of those types of carboxylic acids described elsewhere herein. Suitable metals for forming carboxylic acid salts include any metal selected from the same groups of the periodic table as mentioned elsewhere herein for metal source compounds. Specific exemplary examples include carboxylic salts of the metals aluminum, iron, calcium, sodium, or mixtures thereof. Included are metals suitable for forming so-called heavy metal soaps of carboxylic or fatty acids.

In one more specific exemplary embodiment, a carboxylic acid salt may be at least one of an aluminum salt, iron salt or mixture thereof. Specific examples of such suitable carboxylic acid salts include aluminum salt of 2-ethylhexoic acid (aluminum ethylhexoate or "aluminum octoate"), aluminum salt of 2-methylpentonoic acid (or aluminum methyl pentoate), iron octoate, aluminum stearate, or mixtures thereof. In one particular embodiment, a carboxylic acid salt is aluminum octoate. It will be understood that these compounds are exemplary only, and that any other suitable carboxylic acid salt compound, including those mentioned elsewhere herein, may also be employed. For example, additional information on suitable carboxylic acid salts may be found under the heading "Salts of Carboxylic Acid."

In the practice of the disclosed method and compositions, other metal source compounds and mixtures of metal source compounds may be employed in addition to, or in place of, salts of carboxylic acid. Some exemplary compounds are listed in the following paragraph, although it will be understood that other suitable metal source compounds may be employed, such as those mentioned elsewhere herein. Examples of suitable metal source compounds include other metal salts (other than salts of carboxylic acids), metal alkoxides, metal oxides, metal hydroxides, metal halides, metal sulfates, metal ammonium sulfates, metal-containing organics, metal-containing inorganics, or mixtures thereof. Specific examples of suitable other metal salts (other than carboxylic acid salts) include, but are not limited to, aluminum hydroxide, aluminum oxide, aluminum sulfate, and aluminum chloride. Examples of suitable metal alkoxides include, but are not limited to, linear or branched metal alkoxides. Specific examples of suitable metal alkoxides include aluminum isopropoxide and aluminum salt of benzoic acid. Examples of suitable metal oxides include, but are not limited to, linear or branched metal oxides. Specific examples of suitable metal oxides include aluminum oxide, magnesium oxide, iron oxide, calcium oxide, or mixtures thereof. Specific examples of suitable metal hydroxides include aluminum hydroxide, sodium hydroxide, iron hydroxide, ammonium hydroxides, magnesium hydroxide, calcium hydroxide or mixtures thereof. Specific examples of suitable metal sulfates include, but are not limited to, aluminum sulfate, iron sulfate, ferric ammonium sulfate, magnesium sulfate, or mixtures thereof. Specific examples of suitable metal ammonium sulfates include, but are not limited to, ferric ammonium sulfate, ferric ammonium citrate, or mixtures thereof. Other possible salts include aluminum acetate. Other suitable metal sources include metal chelates such as chelates of acetyl acetonate (2,4 pentanedione) and other similar organic compounds (ketones, diketones, etc.). Exemplary compounds include, but are not limited to, aluminum-2,4 pentanedione, aluminum lactate or mixtures thereof. It will be understood that these compounds are exemplary only, and that any other suitable types of metal source compounds or suitable specific metal source compounds, including those mentioned elsewhere herein, may also be employed. Similarly, other possible salts can include iron hydroxide and ferric-2,4 pentanedione.

In the case of water sensitive materials such as aluminum isoproxide, it is usually desirable to combine the water sensitive material with a non-aqueous base fluid prior to combination with organic base fluid, so as to prevent reaction with water.

Combinations of more than one metal source with a carboxylic acid, such as a fatty acid, may be employed to, for example, vary gelling time and/or vary gelled fluid characteristics. Type and combinations of organic base fluids may also be used to vary gelling time. Combinations of multiple metal sources may include combinations of two or more of any of the metal source compounds and/or described elsewhere herein. In one exemplary embodiment, aluminum isopropoxide and aluminum hydroxide may be combined with carboxylic acid in a molar ratio of from about 1 to about 9 moles of aluminum isopropoxide per mole of aluminum hydroxide to achieve the desired effect.

In another embodiment, one or more aromatic organic base fluids may be present with or without other organic base fluids to accelerate gellation rate such as would be desirable, for example, in a continuous mix process. In this regard, one or more aromatic compounds may be added to facilitate dissolution of the components to decrease time for gellation of an organic fluid, or may be employed as an organic base fluid. Just a few suitable aromatic compounds include, but are not limited to, benzene, napthalene, xylene, toluene, and derivatives and mixtures thereof. For example, xylene proportioned with diesel at a desired ratio, for example from about 15% to about 95% (alternatively from about 75% to about 95%) diesel by weight of a total organic base fluid mixture, and from about 85% to about 5% (alternatively from about 25% to about 5%) xylene by weight of total a organic base fluid mixture. It will be understood that greater amounts of aromatics, including up to about 100% aromatic (such as xylene) may be employed. It will also be understood that these compounds are exemplary only, and that any other suitable types of aromatic compounds, including those mentioned elsewhere herein, may also be employed.

In addition to the above described components, one or more other additives may be employed to alter the characteristics of a gelled organic fluid. With benefit of the disclosure, those of skill in the art will understand that such additives include any additive known in the art that is suitable for altering characteristics of, for example, a liquid hydrocarbon gel, or for assisting with or modifying the combination or reaction of individual ingredients to form such gels. Examples of such additives which may be employed include, but are not limited to, non emulsifiers and/or surfactants.

In one embodiment, optional surfactant/s may be employed to facilitate interaction between two or more of the components in a mixture, such as any surfactants capable of behaving as hydrotopes. Both ionic (anionic and cationic) and non-ionic surfactants may be used. Mixtures of anionic and nonionic or cationic surfactants and nonionic surfactants are also possible. Examples of suitable surfactant types include, but are not limited to, linear alkyl benzene sulfonates, ethoxylated fatty alcohols, nonylphenols, fatty acid-derived amines, alkoxylated fatty amines, or mixtures thereof. Specific examples of suitable surfactants include, but are not limited to, sodium dodecylbenzenesulfonate ("DDBSA"), isopropyl alcohol, etc.

Additional information on suitable surfactants and surfactant types may be found in U.S. patent application Ser. No. 09/151,169, entitled "SURFACTANT COMPOSITIONS AND USES THEREFOR" by Joseph E. Thompson, Sr., et al. filed Sep. 10, 1998, which is incorporated by reference herein in its entirety.

With benefit of this disclosure, specific suitable hydrotopes and/or non-emulsifiers include, but are not limited to, non-emulsifiers compatible with the chosen gelled fluid system and known in the art for use to, for example, ensure water-wetting of a formation during a hydrocarbon-based fracturing treatment. Specific examples include, but are not limited to, a mixture of dodecylbenzene sulphonic acid salt and Pan Acid (known as "NE-110W" and available from Baker Performance Chemicals), and a mixture of isopropyl alcohol ("IPA") and DDBSA (known as "E-118" and available from Baker Performance Chemicals).

With benefit of this disclosure, those of skill in the art will understand that gelation rate may vary as a function of selected individual components, relative amounts of components, temperature, solid component particle sizes, amount of shear imposed on the fluid, etc. For any given metal source/s, smaller solid component particle size, higher temperatures, presence of surfactant and/or aromatics, greater amounts of metal source compound relative to carboxylic acid, and greater amounts of shear are some of the variables that typically result in faster gel development. Ultimate viscosity of an organic liquid gel may be controlled, for example, by varying relative amounts of carboxylic acid and one or more metal source compounds.

In one embodiment, a carboxylic acid-based soap may first be formed (for example using any of the carboxylic acids mentioned herein) to achieve early viscosification. Such a soap may be formed using any method and/or compounds known in the art for forming such soaps. With benefit of this disclosure, those of skill in the art will understand that viscosity imparted by such a soap may be varied by composition and identity of metal components employed, with formation of heavy metal soaps (using metals such as aluminum, calcium, cobalt, lead, zinc, etc.) achieving greater viscosities than soaps formed with lighter metals such as sodium. If desired, additional metal source compound/s may be employed in conjunction with formation of such a soap to further modify rheological properties of the gelled fluid, in some cases on a delayed basis so as to achieve further viscosification after a desired period of time, such as to allow displacement of a fluid into a wellbore prior to further viscosification.

In one exemplary embodiment, a metal source compound (including, but not limited to, metal hydroxide source compound such as sodium hydroxide, aluminum hydroxide, potassium hydroxide etc.) may be combined with carboxylic acid (such as tall oil fatty acid from Arizona Chemical or Acme-Hardesty) and optional metal salt of carboxylic acid (such as 325 mesh aluminum octoate carboxylic acid salt from Witco, and/or 100 mesh to 325 mesh aluminum stearate from Acme Hardesty) to achieve early viscosification of an organic fluid followed by delayed viscosification at higher temperatures. In this regard a salt of carboxylic acid may be combined simultaneously, or before or after, the other metal source compound/s. In such an embodiment, it is believed that early viscosification may occur via saponification of the fatty acid by metal hydroxide, followed by later interaction with metal of carboxylic soap upon heating (such as encountered when displaced into a wellbore) to form a more temperature stable gel of aluminum salt of the fatty acid. Furthermore, it will be understood that stoichiometry of the carboxyl groups of the carboxylic acid in relation to the metal groups of the carboxylic acid salt and/or other metal source compounds may be varied to control gelation rate and/or gelled liquid characteristics.

Other optional components which may be employed in the formulation of the disclosed non-phosphate gelled organic fluids include friction reducer components, such as may be formed by incorporation of lengthy high molecular weight neutralized crosslinked anionic polymers into a gelled organic fluid. Such friction reducing compounds may be used to reduce frictional drag in flow through pipes or conduits, for example, in a manner as described in U.S. Pat. No. 4,780,221 which is incorporated by reference herein in its entirety.

In one embodiment, invert emulsion materials such as "FRO 18" or "FRO 19" from BJ Services may be employed. In another embodiment, an anionic polymer may be a polyacrylic acid including, but not limited to, homopolymers of acrylic acid or methacrylic acid or copolymers of these acids or their salts, esters or amides with each other or with one or more other ethylenically unsaturated monomers, like styrene, maleic acid, maleic anhydride, 2-hydroxyethyl acrylate, acrylonitrile, vinylacetate, ethylene, propylene, etc. Also suitable are those anionic polymers described elsewhere herein, such as the CARBOPOL polyacrylics, and those polymers, and polymers containing monomers, having carboxylic acid functionality as described elsewhere herein. One or more such anionic polymers may be added to an organic base fluid along with other components described herein, such as one or more carboxylic acids, carboxylic acid salts, oxides, etc.

When friction reducing characteristics are desired, polyacrylic acid/s may be neutralized with an organic base, for example an organic amine including, but not limited to, ethanolamines such as diisopropanolamine, triethanolamine, diethanolamine, ethyl diethanolamine, diethylethanolamine, N-methyldiethanolamine, triamylamine, b-dimethlyaminopropionitritite, dodecylamine, morpholine, di-2-(ethyl hexyl)amine, mixtures thereof etc. Examples of commercially available organic amines include, but are not limited to, "ETHOMEEN" from BASF-Wyandette Corp., "JEFFAMINE D-1000" from Huntsman Chemical, "ARMEEN" from Armak Industrial Chemical Division, "ALAMINE 7D" from Henkel Corporation, etc. Further examples of suitable anionic polymers, organic bases, other components and methods of using the same may be found in U.S. Pat. No. 5,641,890, which is incorporated by reference herein in its entirety. Other examples of polyamines and methods of manufacturing the same may be found, for example, in U.S. Pat. Nos. 4,615,393; 4,780,221; European Patent Application No. 88305437.1 (Publication No. 0 295 877); European Patent Application No. 86305124.9 (Publication No. 0 207 787); European Patent Application No. 89303738.2 (Publication No. 0 338 738); and European Patent Application No. 87310946.6 (Publication No. 0 271 362); which are incorporated by reference herein in their entirety.

Table 1 gives a partial list of exemplary additives that may be employed to vary particular characteristics of organic fluid gels. With benefit of this disclosure, those of skill in the art will understand that the characteristics, as well as listed components, are not exclusive and are exemplary only. Further, it will be understood that two or more individual components and component types may be combined in various ways, both within the same category, and across categories.

TABLE 1

Additives to Vary Organic Fluid Gel Characteristics

| Desired Characteristic | Exemplary Additive Types | Exemplary Specific Additives |
|---|---|---|
| Decreased Initial Gel Time | Metal Hydroxides | sodium hydroxide, aluminum hydroxide |
|  | Aromatics and Derivatives Thereof | Tall Oil fatty Acid aluminum Ispropoxide toluene, xylene, benzene Fracsol S ® Xysol ® |
| High Temperature Viscosity Stability | Carboxylic Acids Carboxylic Metal Salts Refined Oils | aluminum Ispropoxide aluminum octoate, Tall Oil Fatty Acid aluminum Oleiate diesel, kerosene, reformate. |
| Delayed Viscosity Development at Higher Temperatures | Carboxylic Acids Carboxylic Metal Salts | aluminum Ispropoxide aluminum octoate, Tall Oil Fatty Acid aluminum Oleiate |

Carboxylic Acids

In the practice of the disclosed methods and compositions, carboxylic acid compositions may be selected from a wide variety of naturally occurring and synthetic carboxylic acids, derivatives of these carboxylic acids, and oils and other compositions which include these carboxylic acids and derivatives thereof. It will be understood with benefit of this disclosure that mixtures of specific carboxylic acids, as well as types of carboxylic acids, are possible.

Carboxylic acids include those compounds containing at least one carboxyl group, —$CO_2H$. Some example of carboxylic acids are acetylsalicylic acid, oleic acid, methanoic acid, 2-chlorobutanoic acid, propanedioic acid, carboxylic acid dimer, benzoic acid, hexanedioic acid (adipic acid), 2,4,6-trinitrobenzoic acid, etc. Just one method of manufacture of suitable carboxylic acids is by hydrolysis of an ester to yield a carboxylic acid and an alcohol.

For example, in one embodiment, carboxylic acids may be:

For monocarboxylic acid embodiment:

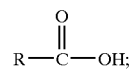

wherein R=carbon chain of about 14 to about 17 carbon atoms (e.g., —$(CH_2)_{13-16}CH_3$), and R may be linear or branched; or wherein R=carbon chain of about 5 to about 16 carbon atoms (e.g., —$(CH_2)_{4-15}CH_3$), and R may be linear or branched; with it being understood that in either of these cases, a hydrocarbon chain of R may have optional single or multiple unsaturated subsets. Furthermore, in either case R may have optional hydroxyl, mercato or cyand functional groups.

The invention may be practiced with blends of monocarboxylic acids and dicarboxylic acids where:

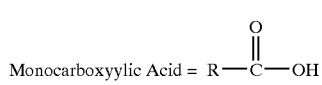

(1)

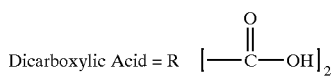

(2)

Suitable carboxylic acids for use herein include, but are not limited to, liquid compounds such as cis-unsaturated acids through $C_{18}$ and solid compounds such as saturated aliphatic acids (from decanoic through the higher acids) and trans-unsaturated acids (e.g., elaidic acid). Naturally occurring carboxylic acids may include both odd- and even-numbered alkanoic acids of molecular formula $C_nH_{2n}O_2$, for example, up through hexanoic acid. Acids which may be manufactured from petrochemical feedstocks include, but are not limited to, formic, acetic, propionic and butyric acids. Tables 1 and 1a list examples of alkanoic or saturated acids.

Fatty acids include a large group of aliphatic monocarboxylic acids, which may occur as glycerides (esters of glycerol) in natural fats and oils, other esters in waxes and essential oils, and as free acids in tall oil.

The term "fatty acids" includes saturated acids of the acetic acid series, $C_nH_{2n+1}COOH$, both normal and branched-chain, as well as related unsaturated acids, certain substituted acids (hydroxy and keto), and aliphatic acids containing alicyclic substituents, such as the chaulmoogra-oil acids. Certain other alicyclic acids (naphthenic acids), containing no aliphatic chain, are also referred to as fatty acids and their salts called soaps.

Naturally occurring fatty acids (also called "fat acids") include higher straight-chain unsubstituted acids containing an even number of carbon atoms. Some branched-chain, hydroxy, and keto acids may be found naturally occurring, and many others may be prepared synthetically. Unsaturated fatty acids include those having differing number of double bonds in the hydrocarbon chain, including monoethenoid, diethenoid, triethenoid, etc. (or monoethylenic, etc.). Also included are acids containing one or more triple-bonded carbon atoms, referred to as acetylenic or ethynoid (ethinoid) acids. Naturally occurring higher fatty acids may be derived from animal fats, vegetable oils, fish oils, etc. Higher saturated fatty acids include pelargonic, lauric, myristic, palmitic, stearic acids, etc.

TABLE 2

Examples of Straight-Chain Alkanoic Acids of the Formula $C_nH_{2n}O_2$

| Value of n | Systematic Name (Trivial Name) |
|---|---|
| 1 | methanoic (formic) |
| 2 | ethanoic (acetic) |
| 3 | propanoic (propionic) |
| 4 | butanoic (butyric) |
| 5 | pentanoic (valeric) |
| 6 | hexanoic (caproic) |
| 7 | heptanoic (enanthic) |
| 8 | octanoic (caprylic) |
| 9 | nonanoic (pelargonic) |
| 10 | decanoic (capric) |
| 11 | undecanoic (undecylic) |
| 12 | dodecanoic (lauric) |
| 13 | tridecanoic (tridecylic) |

TABLE 2-continued

Examples of Straight-Chain Alkanoic Acids of the Formula $C_nH_{2n}O_2$

| Value of n | Systematic Name (Trivial Name) |
|---|---|
| 14 | tetradecanoic (myristic) |
| 15 | pentadecanoic (pentadecylic) |
| 16 | hexadecanoic (palmitic) |
| 17 | heptadecanoic (margaric) |
| 18 | octadecanoic (stearic) |
| 19 | nonadecanoic (nonadecylic) |
| 20 | eicosanoic (arachidic) |
| 22 | docosanoic (behenic) |
| 24 | tetracosanoic (lignoceric) |
| 26 | hexacosanoic (cerotic) |
| 28 | octacosanoic (montanic) |
| 30 | tricontanoic (melissic) |
| 33 | tritriacontanoic (psyllic) |
| 35 | pentatriacontanoic (ceroplastic) |

TABLE 3

Alternate List of Saturated Carboxylic Acids

| Common Name | Synonyms |
|---|---|
| Formic | Methanoic |
| Acetic | Ethanoic |
| Propionic | Propanoic |
| Butyric | Butanoic |
| Valeric | Pentanoic |
| Caproic | Hexanoic |
| Enanthic | Heptanoic |
| Caprylic | Octanoic |
| Pelargonic | Nomanoic |
| Capric | Decanoic |
| η-Undecylic | Undecanoic; hendecanoic |
| Lauric | Dodecanone |
| η-Tridecylic | Tridecanoic |
| Myristic | Tetradecanoic |
| η-Pentadecylic | Tetradecanoic |
| Palmitic | Pentadecanoic |
| Margaric | Heptadecanoic |
| Stearic | Octadecanoic |
| η-Nonadecylic | Nonadecanoic |
| Arachidic | Eicosanoic; arachic |
| η-Hencicosoic | Hepeiconsanoic |
| Behenic | Docosanoic |
| η-Tricosoic | Tricosanoic |
| Lignoceric | Tetracosanoic |
| η-Pentacosoic | Pentacosanoic |
| Cerotic | Hexacosanoic |
| η-Heptacosoic | Heptacosanoic |
| Montanic | Octacosanoic |
| η-Nonsocoso1e | Nonicosanoic |
| Melissic | Triacontanoic |
| η-Hentnacontoic | Hentriaconianoic |
| η-Dotriacontoic | Dotriacontanoic |
| η-Tetratriacontoic | Tetratriacontanoic |
| Cerophlastic | Pentatriacontanoic |
| η-Hexatriscontoic | Hexatriacontanoic |
| η-Octatriacontoic | Octatriacontanoic |
| η-Hexatetracontoic | Hexatetracontanoic |
| | Branched-chain acids |
| Methylbutyric | 2-Methylbutanoic; dextravaleric |
| Isovaleric | 3-Methylbutanoic |
| Pivalic | 2,2 Dimethylpropanoic; trimethyl-acetic |
| 2-Ethylhexoic | 2-Ethylbexanoic; octoic |

Alkenoic acids of molecular formula $C_nH_{2n-2}O_2$ include, but are not limited to, acids such as acrylic, methacrylic, undecylenic, oelic acids, etc. and those listed in Tables 4 and 5. Of these, acrylic and methacrylic acids may have a petrochemical origin, and undecylenic and oleic acids may have natural sources.

TABLE 4

Examples of Straight-Chain Alkenoic Acids of the Formula $C_nH_{2-n}O_2$

| Value of n | Systematic Name (Trivial Name) |
|---|---|
| 3 | propenoic (acrylic) |
| 4 | trans-2-butenoic (crotonic) |
| 4 | cis-2-butenoic (isocrotonic) |
| 4 | 3-butenoic (vinylacetic) |
| 5 | 2-pentenoic (β-ethylacrylic) |
| 5 | 3-pentenoic (β-pentenoic) |
| 5 | 4-pentenoic (allylacetic) |
| 6 | 2-hexenoic (isohydroascorbic) |
| 6 | 3-hexenoic (hydrosorbic) |
| 7 | trans-2-heptenoic |
| 8 | 2-octenoic |
| 9 | 2-nonenoic |
| 10 | 4-decenoic (obtusilic) |
| 10 | 9-decenoic (caproleic) |
| 11 | 10-undecenoic (undecylenic) |
| 12 | 3-dodecenoic (linderic) |
| 13 | tridecenoic |
| 14 | 9-tetradecenoic (myristoleic) |
| 15 | pentadecenoic |
| 16 | cis-9-hexadecenoic (cis-9-palmitoleic) |
| 16 | trans-9-hexadecenoic (trans-9-palmitoleic) |
| 17 | 9-heptadecenoic |
| 18 | cis-6-octadecenoic (petroselinic) |
| 18 | trans-6-octadecenoic (petroselaidic) |
| 18 | cis-9-octadecenoic (oleic) |
| 18 | trans-9-octadecenoic (elaidic) |
| 18 | cis-11-octadecenoic |
| 18 | trans-11-octadecenoic (vaccenic) |
| 20 | cis-9-eicosenoic (godoleic) |
| 22 | cis-11-docosenoic (cetoleic) |
| 22 | cis-13-docosenoic (erucic) |
| 22 | trans-13-docosenoic (brassidic) |
| 24 | cis-15-tetracosenoic (selacholeic) |
| 26 | cis-17-hexacosenoic (ximenic) |
| 30 | cis-21-triacontenoic (lumequeiec) |

Polyunsaturated aliphatic monocarboxylic acids include, but are not limited to, acids such as sorbic, linoleic, linolenic, eleostearic, and various polyunsaturated fish acids, such as those listed in Table 6. Sorbic acid may be made synthetically. The other acids, except those from tall oil, may occur naturally as glycerides and may be used in this form.

TABLE 5

Alternate List of Monoethanoid Acids

| Common Name | Synonyms |
|---|---|
| Obtusilic | 4-Decenoic |
| Caproleic | cis-9-Decenoia |
| 10-Undecylenic | 10-Undecenoic: 10-hendecenoic |
| Lauroleic | cis-9-Dodecenoic |
| Physeteric | 5-Tetradecenoic |
| Myristoleic | cis-9-Tetradecenoic |
| Palmitoleic | cis-9-Hexadecenoic |
| Petroselimic | cis-6-Octadecenoic |
| Petroselaidic | trans-6-Octadecenoic |
| Oleic | cis-9-Octadecenoic |
| Elaidic | trans-9-Octadecenoic |
| Vacoenic | trans-11-Octadecenoic |
| Gadoleic | cis-9-Eicosenoic |
| Cetoleic | 11-Docosenoic |
| Erucic | cis-13-Docosenoic |
| Brassidic | trans-13-Docosenoic |
| Selscholeic | cis-15-Tetracosenoio; nevonic |
| Ximenic | 17-Hexacosenoic |
| Lumequeic | 21-Triscontenoic |

TABLE 6

Examples of Polyunsaturated Fatty Acids

| Total Number of Carbon Atoms | Systematic Name (Trivial Name) |
|---|---|
| | Dienoic acids ($C_nH_{2n-4}O_2$) |
| 5 | 2,4-pentadienoic (β-vinylacrylic) |
| 6 | 2,4-hexadienoic (sorbic) |
| 10 | 2,4-decadienoic |
| 12 | 2,4-dodecadienoic |
| 18 | cis-9,cis-12-octadecadienoic (linoleic) |
| 18 | trans-9,trans-12-octadecadienoic (linolelaidic) |
| 22 | 9,13-docosadienoic |
| | Trienoic acids ($C_nH_{2n-6}O_2$) |
| 16 | 6,10,14-hexadecatrienoic (hiragonic) |
| 18 | cis-9,cis-12,cis-15-octadecatrienoic (linolenic) |
| 18 | cis-9,trans-11,trans-13-octadecatrienoic (α-eleostearic) |
| 18 | trans-9,trans-11,trans-13-octadecatrienoic (β-eleostearic) |
| 18 | cis-9,cis-11,trans-13-octadecatricnoic (punicic) |
| 18 | trans-9,trans-12,trans-15-octadecatrienoic (linolenelaidic) |
| | Tetraenoic acids ($C_nH_{2n-8}O_2$) |
| 18 | 4,8,12,15-octadecatetraenoic (moroctic) |
| 18 | 9,11,13,15-octadecatetraenoic (α-parinaric) |
| 18 | 9,11,13.15-octadecatetraetioic (β-parinaric) |
| 20 | 5,8,11,14-eicosatetraenoic (arachidonic) |
| | Pentaenoic acids ($C_nH_{2n-10}O_2$) |
| 22 | 4,8,12,15,19-docosapentaenoic (clupanodonic) |

Shorter-chain alkynoic (acetylenic) acids include, but are not limited to, those made synthetically and those long-chain acids which occur naturally as listed in Table 7.

TABLE 7

Examples of Acetylenic Fatty Acids

| Total Number of Carbon Atoms | Systematic Name (Trivial Name) |
|---|---|
| 3 | propynoic (propiolic propargylic) |
| 4 | 2-butynoic (tetrolic) |
| 5 | 4-pentynoic |
| 6 | 5-hexynoic |
| 7 | 6-heptynoic |
| 8 | 7-octynoic |
| 9 | 8-nonynoic |
| 10 | 9-decynoic |
| 11 | 10-undecynoic ([dehydro-10-undecylenic]) |
| 18 | 6-octadecynoic (tariric) |
| 18 | 9-octadecynoic (stearolic) |
| 18 | 17-octadecene-9,11-diynoic (isanic, erythrogenic) |
| 18 | trans-11-octadecene-9-ynoic (ximenynic) |
| 22 | 13-docosynoic (behenolic) |

Substituted fatty acids include, bur are not limited to, acids such as methacrylic acid, 2-ethylhexanoic acid, ricinoleic acid, etc. and substituted fatty acids which exist naturally such as those listed in Table 8. Included are fatty acids with a methyl group in the penultimate position and referred to as iso acids, and those with a methyl group in the antepenultimate position and referred anteiso acids.

TABLE 8

Examples of Substituted Acids

| Total Number of Carbon Atoms | Systematic Name (Trivial Name) |
|---|---|
| 4 | 2-methylpropenoic (methacrylic) |
| 4 | 2-methylpropanoic (isobutyric) |
| 5 | 2-methyl-cis-2-butenoic (angelic) |
| 5 | 2-methyl-trans-2-butenoic (tiglic) |
| 5 | 3-methyl-2-butenoic (β,β-dimethyl acrylic) |
| 5 | 2-methylbutanoic |
| 5 | 3-methylbutanoic (isovaleric) |
| 5 | 2,2-dimethylpropanoic (pivalic) |
| 8 | 2-ethylhexanoic |
| 14 | 3,11-dihydroxytetradecanoic (ipurolic) |
| 16 | 2,15,16-trihydroxyhexadecanoic (ustilic) |
| 16 | 9,10,16-trihydroxyhexadecanoic (aleuritic) |
| 16 | 16-hydroxy-7-hexadecenoic (ambrettolic) |
| 18 | 12-hydroxy-cis-9-octadecenoic (ricinoleic) |
| 18 | 12-hydroxy-trans-9-octadecenoic (ricinelaidic) |
| 18 | 4-oxo-9,11,13-octadecatrienoic (licanic) |
| 18 | 9,10-dihydroxy-octadecanoic |
| 18 | 12-hdroxy-octadecanoic (dl) |
| 18 | 12-oxooctadecanoic |
| 18 | 18-hydroxy-9,11,13-octadecatrienoic (kamlolenic) |
| 18 | 12,13-epoxy-9-octadecenoic (vernolic) |
| 18 | 8-hydroxy-trans-11-octadecene-9-ynoic (ximenynolic) |
| 18 | 8-hydroxy-17-octadecene-9,11-diynoic (isanolic) |

Also included are naturally occurring fatty acids having alicyclic substituents, such as cyclopentenyl-containing chaulmoogra acids, and cyclopropenyl or sterculic acids (see Table 9). Prostaglandins include those formed by in vivo oxidation of 20-carbon polyunsaturated fatty acids, such as arachidonic acid. Prostaglandins (e.g., $PGE_1$) may have different degrees of unsaturation and oxidation when compared to the parent compound, prostanoic acid.

TABLE 9

Examples of Fatty Acids with Alicyclic Substituents

| Total Number of Carbon Atoms | Common Name |
|---|---|
| 6 | aleprolic |
| 10 | aleprestic |
| 12 | aleprylic |
| 14 | alepric |
| 16 | hydnocarpic |
| 18 | chaulmoogric |
| 18 | malvalic (halphenic) |
| 19 | sterculic |
| 19 | lactobacillic |

Naturally occurring aromatic acids include, but are not limited to acids such as benzoic, salicylic, cinnamic, gallic acids, etc. Such acids may be generally crystalline solids with relatively high melting points. In this regard, any of the solid carboxylic acid and/or solid metal source compounds described herein may be combined with organic fluids by direct dispersion in such fluids, by addition as an organic-based slurry or solution, etc.

Suitable carboxylic acids include branched-chain acids containing at least one branching alkyl group attached to the carbon chain. A few examples are given in Tables 10, 11 and 12.

Among other sources, branched-chain acids may be isolated from wool fat. This includes iso acids (with branching methyl on the carbon second from the end of the chain), even-carbon acids from $C_{10}$ to $C_{28}$, dextrorotatory anteiso acids (with branching methyl on the carbon third from the end of chain), odd-carbon acids from $C_9$ to $C_{27}$, and normal even-carbon acids from $C_{10}$ to $C_{26}$. Lower-molecular branched-chain acids (e.g., with seven or less carbons) may be isolated from petroleum.

TABLE 10

Some Branched-Chain Acids

Branched-Chain Acid (Trivial Name)

2-methylpropanoic (isobutyric)
2-methylbutanoic (isopentanoic)
3-methylbutanoic isovaleric
2,2-dimethylpropanoic (neopentanoic)
(isooctanoic)
2-ethyihexanoic
(isononanoic)
2,2-dimethyloctanoic (neodecanoic)
(isopalmitic)
(isostearic)

TABLE 11

Ethynoid and Substituted Ethenoid Fatty Acids

| Common Name | Synonyms |
|---|---|
| | Ethynoid acids |
| Propiolic | 2-Propynoic; propargylic |
| Tetrolic | 2-Butynoic |
| 4-Pentynoic | — |
| Dehydroundecylenic | 10-Undecynoic |
| Tariric | 6-Octadecynoic |
| Stearolic | 9-Octadecynoic |
| Behenolic | 13-Docosynoic |
| Isanic | Octadec-17-enedi-9,11(°)-ynoic; erythrogenic |
| Ricinoleic | 12-Hydroxy-cis-9-octa-decenoic; ricinolic |
| Licanic | 4-Oxo-9,11,13-octadeca-trienoic; couepic |

TABLE 12

Di-, Tri-, and Other Polyethenoid Fatty Acids

| Common Name | Synonyms |
|---|---|
| Sorbic | 2,4-Hexadienoic |
| Linolelaidic | cis-9,cis-12-Octadecadien-oic; linolic |
| Linoledlaidic | trans-9,trans-12-Octadeoa-dienoic |
| Hiragonic | 6,10,14-Hexadecatrienoic |
| α-Eleostearic | cis-9,cis-11,trans-13-Octa-decatrienoic |
| β-Eleostearic | trans-9,cis-11,cis-13-Octa-decatrienoic |
| Punicic | 9,11,13-Octadecatrienoic |
| Linolenic | cis-9,cis-12,cis-15-Octa-decatrienoic |
| Elaidolinolenic | trans-9,trans-12,trans-15-Octadecatrinoic |
| Pseudoeleostearic | trans-10,trans-12,trans-14-Octadecatrienoic |
| Moroctic | 4,8,12,15-Octadecatetra-enoic |
| α-Parinaric | 9,11,13,15-Octadecatetra-enoic |
| β-Parinaric | 9,11,13,15-Octadecatetra-enoic |
| Arachidonic | 5,8,11,14-Eicosatetraenoic |
| Clupanodonic | 4,8,12,15-19-Docosa-pentaenoic |
| Nisinic | 4,8,12,15,18,21-Tetra-cosahexaenoic |

Tables 13 and 14 list other examples of suitable carboxylic acids.

TABLE 13

Other Examples of Carboxylic Acids

| | |
|---|---|
| acetic | palmitic, 90% |
| acrylic | (hexadecanoic) |
| benzoic | pelargonic (nonanoic) |

TABLE 13-continued

Other Examples of Carboxylic Acids

| | |
|---|---|
| butyric | phthalic anhydride |
| castor oil acids, dehydrated | propionic |
| coconut oil acids | ricinoleic |
| distilled | salicylic |
| double distilled | soybean oil acids |
| corn oil acids | single-distilled |
| cottonseed oil acids | double-distilled |
| formic | stearic |
| isobutyric | single-pressed |
| lauric (dodecanoic) | double-pressed |
| linseed oil acids/ | triple-pressed |
| distilled | tall oil acids |
| water-white | 2% or more rosin |
| methacrylic | less than 2% |
| myristic | tallow fatty acids |
| (tetradecanoic) | technical |
| oliec | hydrogenated |
| single-distilled (red) | terephthalic, dimethyl ester |
| double-distilled (white) | undecylenic |
| palm oil acids | (10-undecenoic) |
| single-distilled | |
| double-distilled | |

TABLE 14

Other Examples of Carboxylic Acids trimethylacetic
fluoroacetic
chloroacetic
bromoacetic
iodoacetic
dichloroacetic
trichloroacetic
α-chloropropionic
β-chloropropionic
lactic
Dicarboxylic Acids:

oxalic
malonic
succinic
glutaric
adipic
pimelic
o-phthalic

Tall oil fatty acids primarily consist of oleic and linoleic acids and may be obtained by the distillation of crude tall oil. Crude tall oil is a by-product of the kraft pulping process, and is typically a mixture of fatty acids, rosin acids, and unsaponifiables. Table 15 lists typical components of tall oil fatty acid products, the relative composition of which may vary between crude tall oil products and distilled tall oil products. Table 16 lists examples of fatty acids.

TABLE 15

One Embodiment of
Typical Fatty Acid Compositions of Tall Oil Products

Fatty Acids:

$C_{15}H_{32}O_2$
$C_{17}H_{34}O_2$
$C_{18}H_{36}O_2$
$C_{18}H_{34}O_2$
$C_{18}H_{32}O_2$
$C_{18}H_{32}O_2$ (isomers)
$C_{19}H_{38}O_2$
$C_{20}H_{36}O_2$ TABLE 15-continued One Embodiment of
Typical Fatty Acid Compositions of Tall Oil Products Rosin acids
Unsaponifiables

TABLE 16

Examples of Fatty Acids

| | |
|---|---|
| Acetoacetic acid | 2-2-Hydroxytetracosanoic acids |
| Aleprestic acid | Isovaleric acid |
| Dotriacontanoic acid | Juniperic acid |
| Heptacosanoic acid | Ketostearic acids |
| Docosatrienoic acid | Lanoceric acids |
| Alepric acid | Lauric acid |
| Aleprolic acid | Lauroleic acid |
| Aloprylic acid | Lignocerica acid |
| Aleuritic acid | Linoleic acid |
| Ambrettolic acid | Linolelaidic acid |
| Arachidic acid | Linolelaidie acid |
| Arachidonic acid | Linolenic |
| Behenic acid | Margaric acid |
| Bonotonic acid | Melissic acid |
| Caproic acid | Methylbutyric acid |
| Brassidic acid | Montanic Acid |
| Capric acid | Moroctic acid |
| Caprolei acid | Myristic acid |
| Caprylic acid | Myristoleic acid |
| Cerotic acid | Nisinic acid |
| Cetoleic acid | Octad |
| Chaulmootric acid | Oleic acid |
| Clupanodome acid | Oleyl alcohol |
| 11,12-Dihydroxyeicosanoic acid | 13-Oxodotriacontanoic acid |
| Dihydroxystearic acids | Palmitic acid |
| Diketostearic acids | Palmitoleic acid |
| Docosadienoic acid | Pelargonic acid |
| Docosahexaenoic acid | Pentacosanoic acid |
| Eicosadienoic acid | Petroselinic acid |
| Eicosapentaenoic acid | Physoteric acid |
| Eicosatet-raenoic acid (See also Arachidonic acid) | Pivalic acid Pseudoeleostearic acid |
| Eicosatrienoic acid | Punicic acid |
| Elaidic acid | Tetratriacontanoic acid |
| Elaidolinolenic acid | Thynnic acid |
| Eleostearic acid | Tricosanoic acid |
| Enanthic acid | Tridecanoic acid |
| Eurcic acid | Tritriascontaonoic acid |
| 2-Ethylhexoic acid | 10-undecylenic acid |
| Gadoleic acid | Undecylio acid |
| Gorlio acid | Vaccenic acid |
| Heneicosanoic acid | Valerio acid |
| Hentriacontanoic acid | Vernolic acid |
| Hiragonic acid | |
| Hydnocarpic acid | |
| Hydroxydecanoic acids | |
| Hydroxystearic acids | |

Examples of high rosin fatty acids which may be utilized to accelerate gelling include, but are not limited to, "UNITOL-S" or UNITOL AR40 (available from International Paper, Chemicals Division) etc. Others examples are described elsewhere herein. High rosin fatty acids may be substituted in whole or in part for non-high rosin fatty acids used in embodiments described elsewhere herein. Those of skill in the art will understand with benefit of this disclosure that gel time may be adjusted by varying the amount of high rosin fatty acid, and that gel times may be measured using methods described in the examples herein.

Sources of Fatty Acids

Sources of $C_6$–$C_{24}$ fatty acids include, but are not limited to, those obtained from natural sources such as animal tallows and greases, vegetable, coconut, palm, marine oils, etc. Such acids may also be produced synthetically from petroleum sources. For example, fatty acids may be produced by oxidation of hydrocarbons.

Methods of synthesizing fatty acids include, but are not limited to, the following methods:

Catalytic Oxidation of Paraffinic Hydrocarbons.

Oxidation of Olefins.

Oxidation or Carboxylation of Ethylene-Growth Compounds—including those compounds obtained from ethylene by the Ziegler process and containing an even number of carbon atoms.

Oxidation of Natural Fats—including dibasic and straight chain monobasic acids produced by oxidation of unsaturated fatty acids with ozone or other oxidizing agents, (e.g., oleic acid oxidation produces azelaic, $HO_2C(CH_2)_7CO_2H$, and pelargonic acids, $CH_3(CH_2)_7CO_2H$).

Alkali Fusion of Alcohols—including those acids formed by treatment of fatty alcohols with alkalies at 300° C. and ca 5.6 MPa (800 psig) to produce the corresponding fatty acid plus hydrogen.

Telomerization—including those acids formed by telomerization of ethylene and butadiene with formic and acetic acids, methyl acrylate, or methyl chloride to produce acids of an odd number of carbon atoms.

Saponification of Natural Fats.

Glycerol Recovery—including those acids present in sweet water from a continuous countercurrent fat splitter that may contain, for example, about 12–20% glycerol, emulsified fat, slight amounts of soluble acids and proteinaceous material, and a trace of inorganic salts.

Crystallization—such as, for example, separation of oleic, stearic, and monoleic acids by crystallization (qv), either with or without solvents. Cotton seed, soya bean, corn oil, and other liquid edible oils may be winterized by lengthy treatments at low temperatures to allow more saturated triglycerides to crystallize and drop out of solution; followed by filtering of the resulting slurries. Further, liquid acids may be removed from a mass of crystals by cold pressing. The solid fraction may be hot pressed to remove the remaining liquid acids.

Hydrogenation—including hydrogenation of the solid fractions from crystallization to obtain saturated acids with an IV of less than one, such as hydrogenation by a batch method.

Distillation.

Fatty acids suitable for use in the disclosed method and compositions include, but are not limited to, those produced by processing selected fats and oils such as coconut, soybean, cottonseed, corn, and other vegetable oils, and lard and beef tallow. Such fatty acids may be originally present as triesters of glycerol (triglycerides) with other mixed lipid constituents such as sterols.

Specific examples of suitable fatty acids include, for example, unfractionated fatty acids, each of which typically has the same fatty acid composition as a parent fat or oil. These fatty acids may be referred to as soapstocks, and may be obtained as by-products from alkali treatment during refining of an oil. Other sources include, but are not limited to, from oils such as coconut, and lard and beef tallow. Still other sources of fatty acids, include natural oils and tall oil acids.

Fatty acids may be produced by a combination of crystallization and fractional distillation. Saturated stearic and oleiec fatty acid types may be produced from animal fats such as inedible tallow. As an example, stearic acid may be prepared from them by hydrogenation, crystallization, and distillation. Other examples include types of oleic acid, low poly(unsaturated) oleic, crystallized white oleic, crystallized red oil, and distilled animal acids, are also available.

Other common saturated fatty acids are octanoic, decanoic, lauric, myristic, and palmitic acids which are usually obtained from fractional distillation of coconut oil.

Certain longer chain length fatty acids such as the $C_{20}$ and $C_{22}$ are available from if hydrogenated fish oils and rapeseed oil, sources that contain relatively large amounts of these chain lengths in unsaturated forms.

Following is information on a few of the many commercially available carboxylic acid products suitable for use as carboxylic acid components in the disclosed method and apparatus. Included are carboxylic acid products and their derivatives (including fatty acid products and fatty acid derivatives), and carboxylic acid polymers such as polyacrylics.

Table 17 lists commercially available carboxylic acid products from KIC CHEMICALS, INC., 451 Main Street, P. O. Box 437, Armonk, N.Y. 10504-0437., 451 Main Street, P. O. Box 437, Armonk, N.Y. 10504-0437.

TABLE 17

Carboxylic Products Available From Kic Chemicals, Inc.

| Fatty Acids | |
|---|---|
| Capric | Myristic |
| Caprylic/Capric Blend | Oleic |
| Caproic | Palmitic |
| Caprylic | Stearic, Triple-Pressed |
| Lauric | Stearic, NF Powder |
| Other Products | |
| Ascorbic Acid USP | Sesame Oil NF |
| Benzoic Acid USP/Technical | Sodium Benzoate USP |
| Citric Acid USP | Succinic Acid FCC |
| Fumaric Acid NF/FCC | Sulfamic Acid |
| Malic Acid FCC | Vitamin E Succinate (natural) |

Also available from KIC are Isophthalic Acid, Lactic Acid, and Terephthalic Acid. Particular products available form KIC include Oleic Acid (Food Grade Kosher 100% Natural, Vegetable-Based, Product Form—Liquid), Stearic Acid Rubber Grade (100% Natural, Vegetable-Based Product Form—Flakes/Liquid), Triple-Pressed Stearic Acid 40% Kosher 100% Natural (Vegetable-Based, Product Form—Beads), Triple-Pressed Stearic Acid 50% 100% Natural (Vegetable-Based, Product Form: Flakes).

Tables 18–20 list carboxylic products available from BF GOODRICH CHEMICAL DIVISION, Cleveland, Ohio. These products include CARBOPOL RESINS, such as CARBOPOL 430 Resin, polyacrylic acid in water. CARBOPOL 400 resins are polyacrylic acids of varying molecular weight, available from BF GOODRICH CHEMICAL DIVISION. Other examples are given in Tables 18 and 19.

TABLE 18

CARBOPOL Resins

| Carbopol Resin | Liquid Chelating Agents | | | | Dry Chelating Agents | |
|---|---|---|---|---|---|---|
| | 420 | 430 | 475 | 488 | 421 | 431 |
| Activity, minimum, % | 65 | 50 | 45 | 25 | 85–90* | 85–90* |
| Molecular weight, dry basis | 2,100 | 5,100 | 104,000 | 243,000 | 2,700 | 6,000 |

*Sodium salt of polyacrylic acid

TABLE 19

Properties Of CARBOPOL Resins

| CARBOPOL RESIN | Molecular Weight |
|---|---|
| 420 | 2,100 |
| 421 | 2,700 |
| 430 | 5,100 |
| 431 | 6,000 |
| 475 | 104,000 |
| 488 | 243,000 |

Other resins include CARBOPOL 676, CARBOPOL 940, CARBOPOL 934, CARBOPOL 941, CARBOPOL 970 (see also Table 14).

TABLE 20

Properties of CARBOPOL Resins

| Type | Molecular Weight (Approx.) |
|---|---|
| 907 | 450,000 |
| 910 | 750,000 |
| 941 | 1,250,000 |
| 934 | 3,000,000 |
| 934P | 3,000,000 |
| 940 | 4,000,000 |

Suitable carboxylic products are also available from Arizona Chemical Company, Panama City, Fla. These products include Tall Oil Fatty Acids such as the following fatty acids containing non-conjugated linoleic, conjugated linoleic, oleic and/or saturated components: SYLFAT DFA, SYLFAT FA-1, SYLFAT FA-2, SYLFAT FA-3, SYLFAT EPG, SYLFAT 95C, SYLFAT 94B, SYLFAT 2 and SYLFAT 102. Other products from this supplier include Distilled Tall Oils such as SYLVATAL D30E, SYLVATAL D25LR, SYLVATAL D30LR, SYLVATAL D40LR, SYLVATAL D40T, SYLVATAL D601R, SYLVABLEND RT-29, SYLVATAL RT-30, SYLVATAL S40 and SYLVATAL S40DD. Other products include Disproportionated Rosins/Soaps such as SYLVAROS DR-22, SYLVAROS DRS-40, SYLVAROS DRS-42 and SYLVAROS DRS43. Other products from this supplier include Co-products of the Tall Oil Fractionation Process such as FA90, FA140, Heads, Pitch, HD19, CC2028, SYLVABLEND EB001, S93 Crude. Other products from this supplier include Thermal Dimer Acids—SYLVATAL FA-7001 and SYLVABLEND FA-7002. Other products from this supplier include Asphalt and Concrete Blends such as SYLVABLEND AB-155 and SYLVABLEND CB-170. Other products from this supplier include Lower Acid Number Tall Oil Rosins such as SYLVAROS RB and SYLVAROS 315. Other products from this supplier include Dust Control and Flotation Blends such as SYLVABLEND AB-40, SYLVABLEND AD-60, SYLVABLEND FRAN 002 and SYLVABLEND FR-2234 available from Arizona Chemical. Other products from this supplier include Tall Oil Rosins such as SYLVAROS R Type S, SYLVAROS 80, SYLVAROS 10RX and SYLVAROS ACF. Other products from this supplier include Dimer Acids such as SYLVADYM T-17, SYLVADYM T-18, SYLVADYM T-22, SYLVADYM MX, SYLVADYM M-15 and SYLVADYM M-35. Other products from this supplier include Monomer Acids such as SYLFAT D-1 and SYLFAT RD-1. Other products from this supplier include Fatty Acid Esters such as SYLFAT 2249, SYLFAT 2154, SYLFAT 2173, SYLFAT 2210, SYLFAT 2156 and SYLFAT K. Other products from this supplier include Terpenes such as SYLVAPINE DP, SYLVAPINE ANTEHOLE and SYLVAPINE Pine Oil (Natural) available from Arizona Chemical. Other products from this supplier include Specialty Blends such as SYLVABLEND RB-45, SYLVABLEND RB-85, SYLVABLEND RB-90, SYLVABLEND RB95 and SYLVABLEND RB-120 available from Arizona Chemical.

Carboxylic acid products available from Acme-Hardesty Co., Blue Bell, Pa., include: Oleic Acid, Stearic Acid, Fractionated Fatty Acids (Caproic, Caprylic, Capric, Caprylic/Capric, Lauric, Myristic, Palmitic, Behenic, Erucic), Distilled Fatty Acids (Coconut, Linseed, Palm Kernal, Tall Oil), Hydrogenated Fatty Acids (Rubber Grade, Marine, Tallow), Hydrogenated Glycerides (Marine, Soya, Tallow), Castor Oil/Derivatives (#1 Castor Oil, Deodorized Castor Oil, Hydrogenated Castor Oil, Pale Pressed Castor Oil, USP Castor Oil, 12-Hydroxy Stearic Acid, Methyl 12-Hydroxy Stearate, N N'Ethylene Bis 12-Hydroxystearamide, Ricinoleic Acid, 70/80 deg. Melt Point Castor Wax-Stick Grade), Vegetable Oils (Coconut, Linseed, Tung). Some other specific products available from Acme-Hardesty include ACME 60-R 85, 70% stearic acid, 745 coconut fatty acid.

A specific example of tall oil fatty acid is TALL OIL FATTY ACID #1 from Acme-Hardesty Co. having the following composition: Linoleic, Nonconjugated 34%, Linoleic, Conjugated 9%, Oleic 44%, Saturated 5%, Other Fatty Acids 8%. A specific example of PALMITIC ACID 55% available from Acme-Hardesty is Triple Pressed Stearic Acid having a fatty acid composition of C12 (trace), C14 (1.5% Max), C16 (52–36%), C18 (42–48%), and C18 linear (Trace). TALL OIL FATTY ACID #2 from Acme-Hardesty Co. has the following composition: Linoleic, Nonconjugated 37%, Linoleic, Conjugated 7%, Oleic 50%, Saturated 2%, Other Fatty Acids 4%. 95% PALMITIC ACID from Acme-Hardesty Co. has the following composition: C12 (1.0% MAX), C14 (3.0% MAX), C16 (95% MIN), C18 (3.0% MAX). 90% STEARIC ACID from Acme-Hardesty Co. has the following composition: C16 (10% Max), C18 90% Min), C18 linear (2.0% Max). DOUBLE PRESSED STEARIC ACID, from Acme-Hardesty Co. has the following composition: C14 (1.5%), C16 (55–60%), C18 (33–41%), C18 linear (1.5%).

Table 21 lists carboxylic acid products available from HUMKO.

TABLE 21

Humko Chemical Product Guide

| Product | Description (CTFA Adopted Name) |
| --- | --- |
| Lauric and Myristic Acids | |
| Industrene 365 | Caprylic/Capric (Mixture Caprylic/Capric Acid) |
| Industrene 325 | Distilled Coconut (Coconut Acid) |
| Industrene 223 | Hydrogenated Coconut (Hydrogenated Coconut Acid) |
| Industrene 328 | Stripped Coconut (Coconut Acid) |
| Hystrene 5012 | Hydrogenated Stripped Coconut (Hydrogenated Coconut Acid) |
| Hystrene 9512 | 95% Lauric (Lauric Acid) |
| Hystrene 9912 | 99% Lauric (Lauric Acid) |
| Hystrene 9014 | 90% Myristic Acid (Myristic Acid) |
| Hystrene 9514 | 95% Myristic Acid (Myristic Acid) |
| Stearic and Palmitic Acids | |
| Hystrene 9016 | 90% Palmitic (Palmitic Acid) |
| Industrene 4518 | Single Pressed Grade (Stearic Acid) |
| Industrene 5016 | Double Pressed Grade (Stearic Acid) |
| Hystrene 5016 | Triple Pressed Grade (Stearic Acid) |
| Industrene 4516 | 45% Palmitic (Palmitic Acid) |
| Hystrene 4516 | 45% Palmitic (Palmitic Acid) |
| Industrene R | Stearic Acid |
| Industrene B | Stearic Acid |
| Industrene 7018 | 70% Stearic Acid (Stearic Acid) |
| Hystrene 7018 | 70% Stearic Acid (Stearic Acid) |
| Industrene 9018 | 90% Stearic (Stearic Acid) |
| Hystrene 9718 | 92% Stearic (Stearic Acid) |
| Behenic and Arachidic Acids | |
| Hystrene 3022 | 30% Behenic and Arachidic (Hydrogenated Menhaden Acid) |
| Hystrene 5522 | 55% Behenic and Arachidic (Hydrogenated Menhaden Acid) |
| Hystrene 7022 | 70% Behenic and Arachidic (Behenic Acid) |
| Hystrene 9022 | 90% Behenic and Arachidic (Behenic Acid) |
| Tallow Type Acids | |
| Hystrene 1835 | Soap Acid Blend (Mixture Tallow/Coconut Acid) |
| Industrene 145 | Tallow Acid |
| Industrene 143 | Tallow Acid |
| Oleic Acids | |
| Industrene M | Oleic-Stearic Acid |
| Industrene 105 | Oleic Acid |
| Industrene 106 | Low-Titer (Oleic Acid) |
| Industrene 205 | Oleic Acid |
| Industrene 206 | Low-Titer (Oleic Acid) |
| Industrene 206LP | Low-Titer (Oleic Acid) |
| Linoleic and Linolenic Acids | |
| Industrene 120 | Linseed (Linolenic Acid) |
| Industrene 130 | Linoleic Acid (Linoieic Acid) |
| Industrene 224 | Oleic-Linoleic Acid |
| Industrene 225 | Soya Acid (Linoleic Acid) |
| Industrene 226 | Soya Acid (Linoleic Acid) |

MSMA-Based Compounds

Partial monoesters of styrene maleic anhydride copolymers and fatty alcohols ("MSMA's") include MSMA's as well as derivatives of MSMA's (such as sodium salts of sulfonated MSMA's). Such compounds are typically available in resin form, and may be utilized in the disclosed methods and compositions by direct combination with other components in an organic base fluid, or by prior dissolution in an organic solvent, such as toluene, xylene, or any other solvent or mixture of solvents suitable for dissolution of the selected MSMA-based compound/s.

Among suitable MSMA-based compounds are those compounds formed from styrene maleic anhydride copolymers formed via the following reaction:

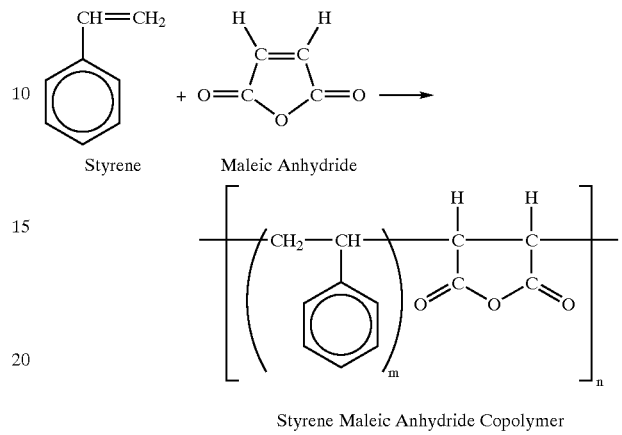

Styrene Maleic Anhydride Copolymer

In one embodiment, m=from about 1 to about 3; and n=from about 6 to about 8. It will be understood with benefit of this disclosure that values of m and n may vary outside these ranges as well.

Suitable MSMA compounds include those formed by the esterfication of styrene maleic anhydrides copolymer with one or more fatty alcohols, as in the following reaction:

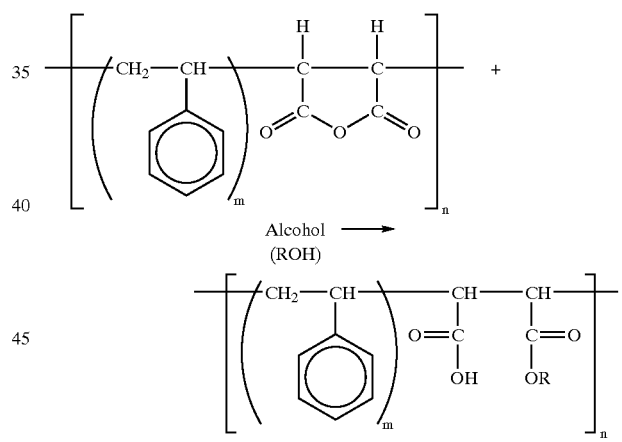

wherein m and n are the same as given above for MSMA compounds. In one embodiment, ROH represents a fatty alcohol in which R is a branched or straight carbon chain that may be saturated or unsaturated, and which may have from about 8 to about 20 carbon atoms, alternatively from about 6 to about 38 carbon atoms. The degree of esterfication of such MSMA compounds may vary from very little to almost complete esterfication, but in one embodiment ranges from about 35% to about 75%.

Specific examples of fatty alcohols for MSMA esterfication include, but are not limited to those produced by the Ziegler and Oxo processes, reduction of vegetable oils and fatty acids with sodium, catalytic hydrogenation at elevated temperatures and pressures, and hydrolysis of spermacetia and sperm oil by saponification and vacuum fractional distillation. Specific examples of saturated fatty alcohols include, but are not limited to, octyl, decyl, lauryl, myristyl, cetyl and stearyl alcohols, etc. Specific examples of unsaturated fatty alcohols include, but are not limited to oleyl, linoleyl, linolenyl, etc.

Although one embodiment of MSMA compounds formed from monofunctional alcohols are described above, it will be understood with benefit of this disclosure that MSMA compounds formed from multifunctional fatty alcohols (difunctional, trifunctional, etc.) are also possible. Furthermore, it is also possible that partial esters of styrene maleic anhydride and alcohols other than fatty alcohols, are also possible. In addition, partial esters of styrene maleic anhydride may be formed with other organic carbon chains having one or more carboxyl functionalities formed thereon. In those cases where multifunctional alcohols and/or alcohols with one or more carboxyl functionalities are employed, those of skill in the art will understand with benefit of this disclosure that properties of a gelled organic fluid may be varied and/or enhanced by virtue of additional hydroxyl sites available for complexation or reaction with metal groups supplied by metal source compounds.

Derivatives of MSMA compounds may also be employed in the disclosed methods and compositions, in a similar manner or in place of MSMA compounds. Examples of such MSMA derivatives include, but are not limited to, MSMA compounds having aryl groups that are substituted or partially substituted. In one exemplary embodiment, sulfornated MSMA derivatives may be formed having the following structure

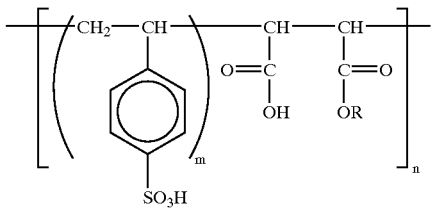

where m, n, and R have those values described above for MSMA compounds.

Further information on specific suitable MSMA-based compounds available under the tradename SMA® from Elf Atochem may be found in the following publications from Elf Atochem: "SMA Multifunctional Resins General Bulletin"; "The Use of SMA Resins as Multivalent Ion Complexation Agents" (Version 3.0, June 1998); "SMA Fatty Alcohol Esters"; and "Technical Information, Developmental Products, Sulfonated SMA Resins S-SMA X 1000 and S-SMA X 3000," each of the foregoing being incorporated herein by reference. Specific examples include MSMA compounds made from base SMA® resins SMA 1000, SMA 2000, SMA 3000, and SMA 4000, with styrene/maleic anhydride ratios of 1, 2, 3 and 4, respectively. These include ester resins SMA 1440, SMA 17352, SMA 2625 and SMA 3840. These compounds are available in aqueous solution and are designated with a "H" suffix. Additional suitable MSMA-based compounds include SMA X10840, SMA X11825 (C18 fatty alcohol), SMA X11850(C16 to C18 fatty alcohol) and SMA X31890 (C18 fatty alcohol). Still others include, but are not limited to, SMA XGA-10, SMA XGA-30, SMA 1000F, SMA 1440 F, SMA 17352F, SMA 2000F, SMA 2625F, SMA EF-30, SMA 3840F, SMA EF40, SMA 3000F, etc.

Further examples of styrene maleic anhydride and styrene maleic anhydride derivative copolymer starting materials (ie., which may be esterfied), as well as MSMA-based compounds may be found in U.S. Pat. Nos. 4,284,414; 4,450,261; 5,076,852; 3,650,970; 3,657,123; 3,528,939; 3,511,820; 5,132,271; 5,330,588 and 3,741,943; which are each incorporated herein by reference. Still other such information may be found in American Chemical Society Symp. Ser., 1983, Vol. 229, Iss. Eff. Hostile Environ. Coat. Plast. pp. 49–64; Japanese Kokai Tokyo Koho, May 16, 1984 (Patent No. 84 84933, Patent Application Number 83-184060); German Offen., May 22, 1969 (Patent No. 1800712); and U.S. Pat. No. 1,482,171; which each incorporated herein by reference.

Optional "activator" materials may be added to a MSMA-containing formulation to achieve, among other things, reduced gellation time and/or smoother gels. In this regard, an activator may be any compound containing carboxylic acid functionalities, typically having a low carbon count. Examples include relatively low carbon count carboxylic acids, including multi-functional carboxylic acids such as citric acid. While not wishing to bound by theory, it is believed that such activator compounds favor aluminum cross linking and in that way affect the gellation reaction. Other suitable activators include, but are not limited to the high rosin fatty acids described elsewhere herein (such as "Unitol S").

Fat and Fatty Oil-based Organic Fluids

Among the organic fluids suitable for use in the disclosed method and compositions are fats and fatty oils, such as those derived from vegetable, animal, and marine sources and which may be by-products in the production of vegetable proteins or fibers and animal marine proteins. Examples of fat sources include, but are not limited to, oilseeds, fruit pulps, animals, and fish. Advantageously, such organic fluids may serve dual functions as both source of fatty acids as well as base fluids for formulating treatment fluids, and component slurries or suspensions. Suitable organic fluids include, but are not limited to, marine fats and Cruciferae fats, for example, those characterized by fatty acids having carbon chains of up to about $C_{24}$.

Although fatty acids in fats may be esterified with glycerol to form glycerides, some fats may have greater than about 5% free fatty acid. Table 22 is a partial list of sources of exemplary organic fluids and fatty acids that may be employed in the disclosed method and compositions.

TABLE 22

Some Sources of Organic Fluids and Related Fatty Acids

| Fatty Acid | Common Name | Source of Organic Oil/Acid |
|---|---|---|
| butanoic | butyric | butter |
| hexanoic | caproic | butter |
| octanoic | caprylic | coconut |
| decanoic | capric | coconut |
| dodecanoic | lauric | coconut, palm kernel |
| tetradecanoic | myristic | coconut, palm kernel, butter |
| hexadecanoic | palmitic | palm, cottonseed, butter, animal fat, marine fats |
| cis-9-hexadecenoic | palmitoleic | butter, animal fats |
| octadecanoic | stearic | butter, animal fats |
| cis-9-octadecenoic | oleic | olive, tall oil, peanut, canbra, animal fats, butter, marine fats |
| cis,cis-9,12-octadecadienoic | linoleic | safflower, sunflower, corn, soy, cottonseed |
| cis,cis,cis-9,12,15-octadecatrienioic | linolenic | linseed |

TABLE 22-continued

Some Sources of Organic Fluids and Related Fatty Acids

| Fatty Acid | Common Name | Source of Organic Oil/Acid |
|---|---|---|
| cis,cis,cis,cis-6,9,12,15-octadecatetraenoic | | marine fat |
| cis,trans,trans-9,11,13-octadecatrienoic | α-eleostearic | tung |
| 12-hydroxy-cis-9-octadecenoic | ricinoleic | castor |
| cis-9-eicosenoic | gadoleic | marine fat |
| cis-11-eicosenoic | | rapeseed |
| all cis-5,8,11,14-eicosatetraenoic | arachidonic | animal, marine fats |
| all cis-8,11,14,17-eicosatetraenoic | | marine fats |
| all cis-5,8,11,14,17-eicosapentaenoic | | marine fats |
| docosanoic | behenic | |
| cis-11-docosenoic | cetoleic | marine fats |
| cis-13-docosenoic | erucic | rapeseed |
| all cis-7,10,13,16,19-docosapentaenoic | | marine fats |
| all cis-4,7,10,13,16,19-docosahexaenoic | | marine fats |

Milk fats are typically characterized by low unsaturation and the presence of a wide variety of saturated fatty acids of short chain length. Lauric acid oils are typically distinguished by relatively low unsaturation and a high content of lauric acid as well as other short-chain acids. Lauric acid oils may be derived from seeds of cultivated or noncultivated palms. Vegetable butters are typically low in unsaturation and contain principally $C_{14}$, $C_{16}$, and $C_{18}$ acids. Vegetable butters may be derived from seeds of tropical trees. Cocoa butter is one example. Land-animal fats are typically relatively low in unsaturation and contain principally $C_{16}$ and $C_{18}$ acids, with unsaturated acids consisting primarily of oleic and linoleic acids.

Oleic-linoleic acid oils are of medium, but rather variable unsaturation (iodine), with fatty acids being predominantly $C_{18}$ acids. These oils are normally liquid in the raw form but may be hydrogenated to produce plastic fats. These fats may be derived from the fruit pulp of perennial plants (palm, olive) and the seeds of cultivated annual plants (e.g., cotton, peanut, corn, safflower, sesame, and sunflower seeds). Erucic acid oils resemble the oleic-linoleic acid oils in composition except that the predominant unsaturated fatty acid is a $C_{22}$ acid, erucic acid, and there may be a minor proportion (6–10%) of linolenic acid. Exemplary oilseeds include, but are not limited to, ravison, mustard seed, and rapeseed (colza), including zero erucic rapeseed varieties (typically called canbra or canola oil in Canada).

Linolenic acid oils, derived almost wholly from the seeds of cultivated annual plants, are generally similar to the oleic-linoleic acid oils but are distinguished from the latter by containing the more highly unsaturated acid, linolenic acid. Exemplary suitable oils of this type include, but are not limited to, soybean and linseed oils. Conjugated acid oils typically have relatively high content of unsaturated fatty acids with conjugated double bonds. These may be derived from the seeds of subtropical trees, and examples include tung and oiticica oils.

Marine oils are characterized by content of fatty acids that varies considerably in chain length both above and below 18 carbons, and by the presence of highly unsaturated acids (4 or more double bonds), together with a considerable content of saturated acids (as much as 25% of the total acids). Examples include those derived from small oily fishes, such as California sardine (pilchard), menhaden and herring. Other examples include fish-liver oils, typically derived from different species of fish. Hydroxy-acid oils include castor oil which consists principally of glycerides of ricinoleic (12-hydroxyoleiec) acid.

TABLE 23

Examples of Fats and Related Acid Types

| Fat | Acid Type |
|---|---|
| Vegetable | |
| babassu | lauric acid |
| castor | hydroxy acid |
| coconut | lauric acid |
| corn | oleic-linoleic acid |
| cottonseed | oleic-linoleic acid |
| linseed | linolenic acid |
| oiticica | conjugated acid |
| olive | oleic-linoleic acid |
| palm | oleic-linoleic acid |
| palm kernel | lauric acid |
| peanut (groundnut) | oleic-linoleic acid |
| rapeseed regular | erucic acid (oleic-linoleic acid) |
| low erucic (canbra or canola) | |
| safflower regular | oleic-linoleic acid |
| high oleic | |
| sesame | oleic-linoleic acid |
| soybean | linoleic-linolenic acid |
| sunflower | oleic-linoleic acid |
| tung | conjugated acid |
| Animal | |
| butter | milk |
| lard | land animal |
| tallow and grease | land animal |
| Marine | |
| whale | marine |
| sperm whale | marine |
| fish (liver) | marine |
| herring | |
| sardine (pilchard) | |
| sardine (Peruvian) | |
| menhaden | |

TABLE 24

Examples of Vegetable Oils and Related Acid Types

| Fat or Oil | Type or group |
|---|---|
| Almond oil | Oleio-linoloic acid |
| Apricot-kernal oil | Oleio-linoloic acid |
| Babassu oil | Lauric acid |
| Bornao tallow | Vegetable butter |
| Candlenut (lumbang) oil | Linolenic acid |
| Castor oil | Hydroxy acid |
| Chinese vegetable tallow | Vegetable butter |
| Cocoa butter | Vegetable butter |
| Coconut (copra) oil | Lauric acid |
| Cohune oil | Lauric acid |
| Corn oil | Oleio-linoloic acid |
| Cottonseed oil | Oleio-linoloic acid |
| Grapefruitseed oil | Lauric acid |
| Hempseed oil | Lauric acid |
| Kap oil | Oleio-linoloic acid |
| Linseed oil | Linolenic acid |
| Mowrab (illip) fat | Vegetable butter |
| Murumuru oil | Lauric acid |
| Mustard oil | |
| O | Conjugated acid |

TABLE 24-continued

Examples of Vegetable Oils and Related Acid Types

| Fat or Oil | Type or group |
|---|---|
| Olive oil | Oleio-linoloic acid |
| Orangeseed oil | Linolenic acid |
| | Lauric acid |
| Palm oil | Oleio-linoloic acid |
| Palm-kernal oil | Lauric acid |
| Peanut oil | Oleio-linoloic acid |
| Perilla oil | Linolenic acid |
| Poppyseed oil | Oleio-linoloic acid |
| | Erucic acid |
| | Erucic acid |
| Rice-bran oil | Oleio-linoloic acid |
| Safflower oil | Oleio-linoloic acid |
| Sesame oil | Oleio-linoloic acid |
| Shea fat | Vegetable butter |
| Soybean oil | Linolenic acid |
| | Conjugated acid |
| Sunflowerseed oil | Oleio-linoloic acid |
| Teaseed oil | Oleio-linoloic acid |
| Tung (China wood oil) | Conjugated acid |
| Ucuhuba butter | vegetable butter |
| Walnut (English) oil | Linolenic acid |
| Wheat germ oil | Linolenic acid |

Salts of Carboxylic Acids

In the practice of the disclosed methods and compositions, carboxylic acid salt metal source compounds may be selected from a wide variety of carboxylic salts including, but not limited to, salts of natural and synthetic carboxylic acids and derivatives thereof described elsewhere herein. It will be understood with benefit of this disclosure that mixtures of specific carboxylic acid salts, as well as types of carboxylic acid salts, are possible.

Suitable carboxylic acid salts include, but are not limited to, those salts which occur when a carboxylic acid reacts with an alkaline substance, such as in a reaction of the following type involving carboxylic acid and alkaline hydroxide:

$$RCOOH + MOH \rightarrow RCOO^- + M^+ + H_2O;$$

wherein:

M=Li, Na, K, Ca, Mg, Zn, Al, $NH_4$, or $R_4N$; and

R=derivatized or underivatized aliphatic or aromatic group (such as R groups of those carboxylic acids described elsewhere herein).

It will be understood with benefit of this disclosure that an alkaline substance employed in salt formation by such a reaction also may be another type of alkaline substance including, but not limited to, an oxide or carbonate of having M and R substituents selected from those given elsewhere herein.

Carboxylic acid salts and other suitable metal source compounds may be based on carboxylic acids or derivatives thereof. A few examples of such derivatives are given in Table 25.

TABLE 25

Examples of Fatty Acid Derivatives

Fatty Acid Derivatives adipic acid esters, total
di(2-ethylhexyl) adipate
diisodecyl adipate
diisopropyl adipate
n-octyl n-decyl adipate
complex linear polyesters and polymeric plasticizers
epoxidized esters, total
epoxidized soybean oil
isopropyl myristate
isopropyl palmitate
oleic aid esters, total
butyl oleate
glyceryl trioleate
methyl oleate
propyl oleates
all other oleates
sebacic acid esters
stearic acid esters, total
n-butyl stearate
alcohols, $C_{12}$ and higher, unmixed
alcohols, mixtures, total
distearyl 3,3'-thiodipropionate
dodecyl mercaptan
erucamide
lauroyl chloride
stearic acid salts:
aluminum stearates, total
barium stearate
calcium stearate
magnesium stearate
zinc stearate
sulfurized lard oil for lubricants In one embodiment of the disclosed method, metal salt/s (e.g., aluminum salt) of 2-ethylhexanoic acid (often called 2-ethylhexoic in industry) is employed. 2-ethylhexoic acid may be made by the hydrogenation of 2-ethyl-2-nexenal (α-ethyl-β-propylacrolein), $CH_3(CH_2)_2CH:C(C_2H_5)CHO$, to 2-ethylhexanal (α-ethyl-caproaldehyde), which may be catalytically oxidized in the liquid phase to the acid. Metallic salts of ethylhexoic acid (known also as octoates) include, but are not limited to those of aluminum, iron, lead, cobalt, copper, nickel, zinc, magnesium and manganese, and may be made, for example, by diffusion or double decomposition. One specific example of an octoate derivative is Oxyaluminum Octoate in an ester carrier available under the product name "OAO" from Chattem Chemicals, Inc. of Chattanooga, Tenn.

Carboxylic acid salts available from Acme-Hardesty Co. include: Zinc Stearate (Polymer Grade, Powder), Calcium Stearate (Polymer Grade, Powder), and aluminum Stearate as listed in Table 26.

TABLE 26

Aluminum Stearate from Acme-Hardesty Co.

| | TYPE 1 | TYPE 2 | TYPE 3 |
|---|---|---|---|
| APPEARANCE | White Powder | White Powder | White Powder |
| FREE FATTY ACID % | 5.8 max | 8 max | 20 max |

Carboxylic acid salts available from Chattem Chemicals, Inc, of Chattanooga, Tenn. include aluminum benzoates, octoates, stearates (such as organo aluminum stearate) and chelates. Table 27 lists examples of metal salt compounds commercially available in organic solution from Chattem.

TABLE 27

Commercially Available Carboxylic Acid Salt Liquid Solutions from Chattem

| Product | Product Description | Product Characteristics |
|---|---|---|
| KHD | liquid oxyaluminum acrylate | Aluminum Content: 8.3 to 8.9% (typical 8.6%) |
| OAS/ MSII | liquid cyclized aluminum mono stearate | Aluminum Content: 5.0% to 5.5% |

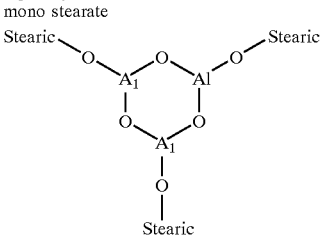

Other Metal Source Compounds

In the practice of the disclosed methods and compositions, other metal source compounds (i.e., other than metal salts of carboxylic acid) may be selected from a wide variety of compounds capable of supplying metal ions including, but not limited to, organic and inorganic metal salts and organometallic compounds (including coordination compounds). Such compounds may available be in the solid, liquid or paste form. It will be understood with benefit of this disclosure that mixtures of specific metal source compounds, as well as types of metal source compounds, are possible. Table 28 lists exemplary metal alkoxide compounds, and Tables 29–31 list some commercially available metal source compounds, including some commercially available carboxylic acid salts not previously mentioned.

TABLE 28

Metal Alkoxides

Aluminum Butoxide
Aluminum Isoproxide
Aluminum Methoxide
Iodine Pentoxide
Lithium Butoxide
Lithium Methoxide
Lithium t-butoxide
Palladium Methoxide
Potassium t-butoxide
Sodium Butylate
Sodium Ethoxide
Sodium Methoxide
Tin Ethoxide
Titanium Isopropoxide
Titanium Methoxide
Zirconium Butoxide

TABLE 29

Commercially Available Metal Salts from Chattem

| Product | Product Description | Product Characteristics |
|---|---|---|
| AIP (white granular powder) | aluminum isopropoxide (aluminum isopropylate) | Aluminum Content: about 13% |
| VISCO MASTER 2200 (liquid solution) | liquid aluminum alkoxide | Aluminum Content: 10.2% to 10.8% |
| TRI-XL LV (liquid solution) | low viscosity cyclic trimer of tri-oxy-aluminum isopropoxide in a severely hydrotreated paraffinic hydrocarbon oil | Aluminum Content: 12.5% to 13.0% |

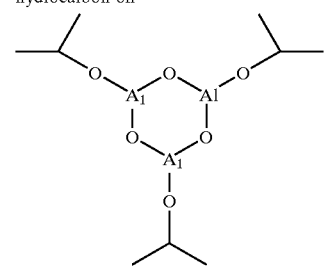

TABLE 30

Examples of Compounds Available from Alfa Aesar, A Johnson Matthey Company, Organics and Organometallics 1999–00

Metal Alkoxides

Zirconium 1-Dutoxide, 99.99% (metals basis)    $[(CH_3)_3CO]_4Zr$
Zirconium Ethoxide    $(CH_3CH_2O)_4Zr$
Zirconium 2-ethylhexanoate, 96±%
Zirconium 2-ethylhexanoate, TABLE 30-continued Examples of Compounds Available from Alfa Aesar, A
Johnson Matthey Company, Organies and Organometallics 1999–00

| | |
|---|---|
| ~20% in mineral spirits (6% Zr) | |
| Zirconium isopropoxide, C 43.8%, H 8.8% | [(CH$_3$)$_2$CHO]$_4$Zr |
| Zirconium (IV) 2,4-pentanadionate | |
| Zirconium (IV) n-propoxide, 70% w/w in n-propanol | Zr(OCH$_3$CH$_2$CH$_3$)$_4$ |
| Tin (IV) Isopropoxide, 98% (metal basis) | [(CH$_3$)$_2$COH]$_4$Sn |
| Tin (IV) Isopropoxide, 10% w/v in isopropanol, 98% (metal basis) | [(CH$_3$)$_2$COH]$_4$Sn |
| Titanium (IV) n-propoxide, 98% | Ti(OCH$_2$CH$_2$CH$_3$)$_4$ |
| Aromatic Bases | |
| a-Xylene, 99% (Isotopic) | |
| m-Xylene, 99% | |
| p-Xylene, 99% | |
| p-Xylene-d10, 99% (Isotopic) | |
| Aluminum Sources | |
| Aluminum acetate, basic | approx. (CH$_3$CO$_2$)$_2$AlOH.H$_2$O |
| Aluminum n-butoxide, 90–95% | [CH$_3$(CH$_2$)$_3$O]$_3$Al |
| Aluminum tert-butoxide | [CH$_3$CH$_2$CH(CH$_3$)O]$_3$Al |
| Aluminum calcium isopropoxide, 10% w/v in IPA, 99.8% (metals basis) | [(CH$_3$)$_3$CO]$_3$Al [((CH$_3$)$_2$CHO]$_4$Al)$_2$Ca |

TABLE 31

Examples of Compounds Available from ACROS ORGANICS
(Fisher Scientific) Catalog of Fine Chemicals, 98/99

Isopropoxide Group

Ferric 2-ethylhexanoate
Metal Alkoxides

| | |
|---|---|
| Titanium (IV) n-butoxide, 99% | [CH$_3$(CH$_2$)$_3$O]$_4$Ti |
| Titanium (IV) cresylate | (CH$_3$C$_6$H$_4$O)$_4$Ti |
| Titanium (IV) Isopropoxide, 99.999% | [CH$_3$)$_2$CHO]$_4$Ti |

TABLE 31-continued

Examples of Compounds Available from ACROS ORGANICS
(Fisher Scientific) Catalog of Fine Chemicals, 98/99

Aromatic Bases

| | |
|---|---|
| Toluene, reagent ACS | C$_6$H$_5$CH$_3$ |
| Naphthalene, 99% | C$_{10}$H$_8$ |
| Aluminum Sources | |
| Aluminum acetylacetonate, 98% | (CH$_3$COCH$_2$COCH$_2$)$_3$Al |
| Aluminum 2-ethylhexanoate | [CH$_3$(CH$_2$)$_3$CH(C$_2$H$_5$)COO]$_2$AlOH |
| Aluminum hydroxide, powder | H$_3$AlO$_3$ |
| Aluminum isopropoxide, 98+% | [(CH$_3$)$_2$CHO]$_3$Al |
| Aluminum tri-sec-butoxide, 97% | [C$_2$H$_5$CH(CH$_3$)O]$_3$Al |
| Aluminum triethoxide | (C$_2$H$_5$O)$_3$Al |
| Iron Sources | |
| Ferric acetylacetonate | (CH$_3$COCH$_2$COCH$_2$)$_3$Fe |
| Ferric benzolacetonate | C$_{30}$H$_{27}$FeO$_6$ |
| Ferric oxide | FeO$_3$ |

Surfactant Materials

In the practice of the disclosed methods and compositions, surfactants may be selected from a wide variety of compounds capable of facilitating interaction of components of gelled organic fluids. Commercially available surfactants include, but are not limited to, the following surfactants from Akzonobel Chemicals Incorporated: "ARMAK 1730" (alkoxylated fatty amine), "ARMEEN C" (fatty acid derived amine), "ARQUAD 2C-75" (quad in isopropanol base), "ETHOMEEN T/12" (alkoxylated fatty amine), "R-MACK 703." Examples of other suitable surfactants commercially available from Witco, Stepan, Akzo and Ethox are listed in Tables 32, 33, 34 and 35.

TABLE 32

Witco Surfactants

| | | |
|---|---|---|
| Ethoxylated Fatty Alcohols | RO—(CH$_2$CH$_2$O)$_n$H | R = fatty alcohol |
| Propoxylated Fatty Alcohols | RO—(CHCH$_2$O)$_n$H<br>                   \|<br>                   CH$_3$ | R = fatty alcohol |
| Ethoxylated Fatty Amines | R—N(CH$_2$CH$_2$O)$_n$H / (CH$_2$CH$_2$O)$_n$H | R = fatty radical |
| Amines Oxides | R—N(CH$_3$)(CH$_3$)→O | R = coconut fatty radical |
| Alkylbenzene Sulfonates | CH$_3$(CH$_2$)$_n$—C$_6$H$_4$—SO$_3$X | X - sodium, calcium, amine, etc. |

TABLE 32-continued

Witco Surfactants

| | | |
|---|---|---|
| Alkyldimethylbenzyl Ammonium Chloride | R—N$^+$(CH$_3$)(CH$_2$C$_6$H$_5$)—CH$_3$ · Cl$^-$ (with H$_3$C) | R = lauryl or stearyl radical |
| Cocoamidopropyl Betaine | RC(O)NH—(CH$_2$)$_3$—N$^+$(CH$_3$)$_2$—CH$_2$—C(O)—O$^-$ | R = coco group |
| Ethoxylated Fatty Acids | R—C(O)—O(CH$_2$CH$_2$O)$_n$H | R = fatty radical |
| Propoxylated Fatty Acids | R—C(O)—O(CH$_2$CHO)$_n$H with CH$_3$ branch | R = fatty radical |
| Sulfonated Fatty Acids | CH$_3$—CH$_2$(CH$_2$)$_n$—COONa with SO$_3$Na | |
| Glycerol Ethoxylates | CH$_2$—O—(CH$_2$CH$_2$O)$_n$—H<br>CH—O—(CH$_2$CH$_2$O)$_n$—H<br>CH$_2$—O—(CH$_2$CH$_2$O)$_n$—H | |

TABLE 33

Stepan Surfactant Products

| Class | Product | Chemical Description |
|---|---|---|
| Detergents | | |
| Alkylbenzene Sulfonates | BIO-SOFTD-40 | Sodium alkylbenzene sulfonate, linear |
| | BIO-SOFTD-53 | Sodium alkylbenzene sulfonate, linear |
| | BIO-SOFTD-62 | Sodium alkylbenzene sulfonate, linear |
| | BIO-SOFTN-300 | TEA alkylbenzene sulfonate, linear |
| | NACCONOL-40G | Sodium alkylbenzene sulfonate, linear |
| | NACCONOL-90G | Sodium alkylbenzene sulfonate, linear |
| | NINATE 401 | Calcium alkylbenzene sulfonate, branched |
| | NINATE 411 | Amine alkylbenzene sulfonate, branched |
| Sulfonic Acid | BIO-SOFT S-100 | Alkylbenzene sulfonic acid, linear |
| | BIO-SOFT S-130 | Alkylbenzene sulfonic acid, linear |
| | STEPANTAN H-100 | Alkylbenzene sulfonic acid, branched |
| Hydrotropes | STEPANATE SXS | Sodium xylene sulfonate |
| | STEPANATE AXS | Ammonium xylene sulfonate |
| | STEPANATE SCS | Sodium cumene sulfonate |
| Emulsion Polymerization | | |
| Alkyl Ethoxylate Sulfates | POLYSTEP B-11 | Ammonium lauryl ether sulfate, 4 EO |
| | POLYSTEP B-12 | Sodium lauryl ether sulfate, 4 EO |
| | POLYSTEP B-19 | Sodium lauryl ether sulfate, 30 EO |
| | POLYSTEP B-20 | Ammonium lauryl ether sulfate, 30 EO |
| | POLYSTEP B-22 | Ammonium lauryl ether sulfate, 12 EO |
| | POLYSTEP B-23 | Sodium lauryl ether sulfate, 12 EO |
| Alkylphenol Ethoxylate Sulfates | POLYSTEP B-1 | Ammonium nonyl phenol ethoxylate sulfate, 4 EO |
| | POLYSTEP B-27 | Sodium nonyl phenol ethoxylate sulfate, 4 EO |
| | POLYSTEP C-OP3S | Sodium octyl phenol ethoxylate sulfate, 3 EO |
| Textiles | | |
| Sulfonates | BIO-SOFT D-40 | Sodium alkylbenzene sulfonate, linear |
| | BIO-SOFTD-62 | Sodium alkylbenzene sulfonate, linear |
| | BIO-SOFT AS-40 | Sodium olefin sulfonate |
| | BIO-TERGE PAS-8S | Octane sulfonate salt |
| | NINATE 411 | Alkylamine alkylbenzene sulfonate |
| Sulfonic Acid Alkanolamides | BIO-SOFT S-100 | Alkylbenzene sulfonic acid |
| | NINOL 11-CM | Coconut diethanolamide |
| | NINOL 201 | Oleic diethanolamide |
| | NINOL 40-CO | Coconut diethanolamide |
| | NINOL 1301 | Fatty alkanolamide, modified |
| | AMIDOX C-2 | Ethoxylated cocoamide |
| | AMIDOX C-5 | Ethoxylate cocoamide |

TABLE 34

Akzo Industrial Surfactants
(Mixture of $RCO_2(CH_2CH_2O)_xH$ and $RCO_2(CH_2CH_2O)_xOCR$
Ethoxylated Fatty Acids)

| Registered Tradename | Common Name |
| --- | --- |
| Ethofat O/20 | Ethoxylated (10) oleic acid |
| Ethofat 18/14 | Ethoxylated (4) stearic acid |
| Ethofat 242/25 | Ethoxylated (15) tall oil acid |
| Ethofat 433 | Ethoxylated (15) tall oil acid |

TABLE 35

Ethox Surfactants

| Surfactant | Comments |
| --- | --- |
| Ethoxylated Alcohols and Alkyl Phenols | |
| ETHAL OA-23 | POE (23) Oleyl Alcohol - Hydrophilic emulsifier and detergent, useful in stabilizing dispersions and scouring textile goods |
| ETHAL OA-23/70% | POE (23) Oleyl Alcohol - 70% Solution of ETHAL OA-23 |
| ETHAL OA-35 | POE (35) Oleyl Alcohol - stabilizer and emulsifier |
| ETHAL 368 | POE (3) $C_{16}$–$C_{18}$ Alcohol - oil soluble emulsifier and lubricant |
| ETHAL CSA-20 | POE (20) $C_{16}$–$C_{18}$ Alcohol - Viscosity modifier and emulsifier for aqueous systems. Base for cosmetic creams and lotions. |
| ETHAL CSA-25 | POE (25) $C_{16}$–$C_{18}$ Alcohol - Hydrophilic emulsifier which exhibits good detergency in mildly acidic of alkaline solutions and hot aqueous systems |
| ETHAL SA-20 | POE (20) $C_{18}$ Alcohol - Viscosity modifier and emulsifier for aqueous systems. Base for cosmetic creams and lotions. |
| Ethoxylated Glycerides | |
| ETHOX 1212 | Ethoxylated Coconut Glyceride - Excellent lubricant for textiles and metals |
| ETHOX 2119 | Polyoxyalkylene Coconut Glycerides - Lubricant for textiles and metals. |
| ETHOX 2132 | Polyoxyalkylene Coconut Glycerides - Lubricant for textiles and metals. |
| ETHOX 2976 | Polyoxyalkylene Castor Oil - Emulsifier and lubricant |
| ETHOX 2992 | Polyoxyalkylene Coconut Glycerides - Lubricant for textiles and metals. |

Preparation of Organic Gels

The disclosed liquid organic gels may be prepared in any manner suitable for combining the components described herein in an organic-based fluid to form a liquid organic gel. For example, the disclosed organic liquid gels may be prepared by combining individual components with an organic base fluid, or alternatively by mixing a preformulated gelling compound containing these components with an organic fluid.

In one embodiment, organic liquid gels may be formed using the methods described herein that offer substantially stable viscosities at temperatures up to at least about 250° F., alternatively up to at least about 275° F., alternatively up to at least about 300° F., alternatively up to at least about 325° F., alternatively up to at least about 350° F., further alternatively from about −30° F. to about 250° F., further alternatively from about −30° F. to about 275° F., further alternatively from about −30° F. to about 300° F., further alternatively from about −30° F. to about 350° F. In this regard, colder temperatures may be encountered, for examples, in pipelines. In such cases, rheology may be modified to suit colder conditions, such as by using greater percentages of aromatics such as xylene. As used herein in relation to well fracture treatments, the term "stabilized viscosity" means that viscosity that allows for effective proppant transport in a fracture in a subterranean formation.

Further, where desired one or more optional breaker materials may be added to a formulation to cause a gelled fluid to lose its structure, viscosity, etc. In one embodiment, one or more breaker materials may be added for providing a delayed reduction in viscosity of organic gels prepared herein. Such viscosity reduction may be desirable, for example, when a gelled organic fluid is used as a well treatment fluid such as a hydraulic fracturing fluid. In such a case, a breaker material may be combined with other components of the gelled fluid prior to introduction of the fluid downhole, and may be formulated so that a gelled organic fluid viscosity is substantially maintained or increased during the time the fluid is displaced downhole and into the formation but is decreased, for example, after sufficient time has occurred to allow transport of proppant into the subterranean formation.

Any material/s suitable for imparting viscosity reduction characteristics to the disclosed non-phosphate gelled fluids may be employed as breaker/s. In one embodiment, such materials may function by reacting or interacting with metal atoms or ions therein so as to reduce viscosity or gel characteristics of the fluid by, for example, tying up a portion of the metal ions or atoms therein. Examples of suitable materials include, but are not limited to, materials (sequestering agents, metal chelating agents, etc.) having a higher affinity for metal ions than the carboxylic acid-based materials employed in a given gelled organic fluid. Specific examples of such materials include, but are not limited to, amines, acids, acid salts, acid-producing materials, oxylates, etc. Specific examples of suitable acids include, but are not limited to, aminopolycarboxylic acids (e.g., ethylenediaminetetraacetic acid ("EDTA"), ethyleneglycolbis (beta-aminoethyl ether)-N,N,-tetraacetic acid; nitrilotriacetic acid, etc.), hydroxycaboxylic acids (e.g., gluconic, tartaric, citric acids), salts and mixtures thereof, etc. Specific examples of suitable acid salts include, but are not limited to, salts of oxalic acid, sodium salt of citric acid, etc. Specific examples of suitable oxylates include, but are not limited to, calcium oxylate, etc. Specific examples of suitable amines include, but are not limited to, hexamethylene tetramine, triethylenepentamine ("TEPA"), etc.

Optional gel breaker material/s may be combined with other components of a non-phosphate organic gelled fluid in any manner and amount known in the art. For example, in one embodiment, a gel breaker may be added after an organic fluid has been gelled using components described elsewhere herein, such as added at a point at or near a downhole blender.

In one embodiment, a breaker material may be a solid (such as citric acid-based solid), or in other form that partitions over time into a gelled organic fluid where it may interact with metals in the gelled organic fluid. In an alternative embodiment, a breaker material may be encapsulated or coated with a material (such as vinyl co-polymer, like poly-vinylidine chloride) that breaks down over time to allow partitioning of the breaker material into the gelled organic fluid. In still another alternative embodiment, encapsulated breaker materials may be formed by impregnating particulate carrier material with breaker materials, such as those described elsewhere herein. Examples of suitable particulate carrier materials include those made from individual porous particles of material impregnated with breaker material, and coated with a material (such as vinyl co-polymer, like poly-vinylidine chloride) selected to dissolve or otherwise break down in the selected organic phase, so as to allow diffusion or dispersion of the breaker material into the organic phase. In any case, when particles of breaker material (encapsulated or not) are employed for hydraulic fracturing, it may be desirable to use particle sizes that are equivalent to, or similar to, the size of proppant employed in the fracture job. However, any other size particles suitable for imparting breaker action to a gel may be employed. With benefit of this disclosure, those of skill in the art will understand that breaker concentration may be selected based on amount and type of gelling components employed, and on the specific pump-time and extent and time of breaking action that is desired.

With benefit of this disclosure, those of skill in the art will understand that viscosity reduction rate may depend on a number of factors including, but not limited to, identity and relative amounts of breaker and gelled fluid components employed, temperature, and when encapsulated breakers are employed, particle size and porosity, particle coating thickness, etc. As such, desired break time may be achieved by varying component characteristics and amounts to fit individual applications.

Direct Combination of Individual Components with Organic Fluid

For example, in one exemplary embodiment a gelled organic liquid may be prepared by combining suitable quantities of at least one carboxylic acid, at least one salt of carboxylic acid, and at least one metal source compound directly with an organic-base fluid, and agitating the mixture to achieve gellation. Examples of such suitable components are described elsewhere herein. In such an embodiment, individual components may be combined directly with an organic-based fluid in any relative amount suitable for forming a liquid organic gel. As used herein, the terms "combine" or "combining" include any method suitable for admixing, exposing, contacting or otherwise causing two or more materials, compounds, or components to come together.

In one embodiment of a batch mixed process, carboxylic acid is typically first dispersed in an organic fluid in a mixing vessel (for example in a frac tank containing circulating organic fluid). Next, carboxylic acid salt (such as aluminum octoate) is added (as a solid or as a suspension in organic fluid), and mixed or circulated (such as in a frac tank) with the organic fluid. Then, the mixture is withdrawn from the mixing vessel, and a metal hydroxide (such as aluminum hydroxide and/or aluminum isopropoxide) is added for fast viscosity development as the fluid is displaced to a wellbore, pipeline, process facility, etc.

In one particular example, individual components may be blended or mixed with diesel to achieve a diesel-based hydrocarbon gel. In this embodiment liquid tall oil fatty acid may be combined in an amount of from about 0.5% to about 10% by total weight of mixture, alternatively from about 2% to about 8% by weight of total mixture, and further alternatively from about 4% to about 7% by weight of total mixture. Aluminum octoate carboxylic salt may be combined in an amount of from about 0.25% to about 10% by total weight of mixture, alternatively from about 0.5% to about 8% by weight of total mixture, and further alternatively form about 1.5% to about 6% by weight of total mixture. A 10% by weight aluminum isopropoxide metal source compound solution may be combined in an amount of from about 0.1% to about 1% by weight of total mixture, alternatively from about 0.2% to about 0.8% by weight of total mixture, and further alternatively from about 0.4% to about 0.6% by weight of total mixture. From about 0.1% to about 2% by total weight of mixture, alternatively from about 0.5% to about 1.5% by total weight alternatively from about 0.75% to about 1.25% by total weight of mixture of "NE-110W" (from Baker Performance Chemical) DDBSA (or alternatively "ETHOX MS-8" ethoxylated stearate from Ethox Chemicals) surfactant may optionally be added to facilitate dissolution of solid reactants. Although particular ranges of amounts of components are given for this embodiment, other amounts and/or components are also possible. In one embodiment, a gelled diesel based hydrocarbon liquid may be so formed to have a minimum viscosity of greater than about 300 centipoise at 100 s$^{-1}$ at up to about 250° F.

Formation of Viscous or Solid Reactant Product for Subsequent Addition to Organic Fluid In an alternate exemplary embodiment, at least one carboxylic acid and at least one salt of carboxylic acid as described herein may be combined to form a reaction product. The reaction product may be a viscous mass that may be added to an organic fluid, or alternatively may be dried to form a solid and then ground to a desired particle size. In either case at a later time a viscous or particulate reaction product material may be combined with an organic-based fluid (such as by dispersing or blending) to achieve an organic liquid gel.

In this embodiment, individual carboxylic acid and carboxylic acid salt and/or other metal source compound components may be blended or mixed in any amounts suitable for forming a viscous reaction product, or a reaction product which may be dried and ground to form a particulate solid capable of gelling hydrocarbon liquids.

In one exemplary embodiment, a solid particulate reaction product may be formed by blending or mixing aluminum octoate carboxylic acid salt into tall oil fatty acid in, for example, an agitated reaction vessel. In this embodiment, aluminum octoate may be combined with a tall oil fatty acid and optional aluminum isopropoxide in an amount of from about 5% to about 95%, alternatively from about 15% to about 85%, and further alternatively from about 20% to about 80% by total weight of mixture. The tall oil fatty acid may be present in an amount of from about 5% to about 95%, alternatively from about 15% to about 85%, and further alternatively from about 20% to about 80% by total weight of mixture. Aluminum isopropoxide may be combined in an amount of from about 0.1% to about 1.0%, alternatively from about 25% to about 8%, and further alternatively from about 0.35% to about 7% by total weight of mixture. Surfactant may optionally be added to facilitate dissolution of the reactants, typically at a concentration of less than about 0.75% by volume of the mixture. The mixture may be agitated using any suitable agitation method in the art. Although particular ranges of amounts of components are given for this embodiment, other amounts and/or components are also possible.

A reaction product of the above-described embodiment may be converted to a solid using any method known in the art suitable for drying or removing liquid components from the reaction mixture. Such suitable methods include, but are not limited to, exposure to the atmosphere, drum heat, etc. A reaction product that is a paste or a rigid gel can be metered as a paste or extruded into hydrocarbon and subsequently sheared until an elastic gel is formed.

Once a reaction product has been dried, it may be ground or pulverized to form particulate solid using any suitable particulatizing method known in the art, for example including, but not limited to, ball mill grinder, air-classified grinder, etc. The material may then be bagged for further use, etc.

Although the solid reaction product described above may be ground or otherwise processed to any particle size desired, in one embodiment a particle size of the reaction product is from about 100 mesh to about 325 mesh. Smaller particle sizes yield more surface area and speed gelation times.

When added to an organic-base fluid, such solid particulate reaction product may be added in any amount suitable for forming a liquid organic gel. However, in one embodiment, from about 50 pounds per thousand gallons of total mixture ("ppt") to about 1000 ppt, alternatively from about 200 ppt to about 800 ppt, alternatively from about 300 ppt to 700 ppt of dried particulate reaction product may be added to a diesel base fluid. In one embodiment, about 0.1% by volume of mixture of surfactant as previously described may optionally be added to facilitate dissolution of the solid reaction product particulate. The fluid may be agitated or otherwise sheared to form a gel having desired consistency or rheology.

Well Treatment Fluids

Among many possible uses, the disclosed liquid organic gels may be employed as a component of a well treatment fluid, such as a drilling, stimulation, completion or workover fluid. In this regard, the disclosed organic-based fluids may be introduced into a wellbore and/or subterranean formation to function as viscosifiers or gelled components of circulating, lost circulation, or kill fluids (drilling muds, drill-in fluids, packer fluids, workover fluids, gelled pills, etc.), as well as fulfilling similar purposes as components of stimulation fluids (such as fracture fluids, gelled acids, foamed fluids, diversion fluids, etc.), injection profile modification fluids, etc. With benefit of this disclosure, it will be understood that the disclosed liquid organic gels may be employed in any drilling or well treatment application known in the art in which, for example, gelled liquid hydrocarbons may be employed, just a few examples of which may be found in U.S. Pat. Nos. 5,609,207; 5,552,377; 5,492,178; 5,426,137; 5,411,091; 5,382,411; 5,381,864; 5,082,059; 5,057,233; 4,877,894; 4,665,982; 4,404,112; 4,301,868; 4,186,802; 3,757,864; 3,654,992; 3,654,991; and 3,654,990, each of which is incorporated by reference herein in its entirety.

A well treatment fluid may be prepared using the disclosed methods and compositions in any suitable manner including, but not limited to, using those preparation techniques described elsewhere herein. For example, an organic liquid gel may be prepared by combining the separate carboxylic acid, carboxylic salt and metal source components directly with an organic-based fluid as previously described. In such case, these components may be combined in a batch process performed at the wellsite using mixing vessels such as frac tanks.

Alternatively, the components may be batched mixed away from the wellsite and transported to the wellsite using methods known in the art. A liquid organic gel may be similarly prepared at or away from the wellsite by mixing particulate reaction product prepared in a manner previously described herein.

The disclosed organic gelled fluids may also be prepared using continuous mixing methods at the wellsite, such as those employing concomitantly introduced component process streams. In this regard, with benefit of this disclosure, those of skill in the art will understand that any continuous mixing method known in the art which is suitable for combining the disclosed components to form gelled organic fluids may be employed.

For example, when formulating well stimulation fluids individual liquid components may be combined with organic base fluid (such as in a blender tub, or upstream or downstream thereof) to form a well treatment fluid just prior to being introduced into a wellbore.

Similarly, solid components may be combined in a similar manner as liquid components, for example, by combining a first organic-based liquid (such as diesel, a diesel/fatty acid mixture, a diesel/fatty acid salt mixture, or a diesel/fatty acid/fatty acid salt mixture etc.) with a slurry or suspension comprising the solid material (such as aluminum hydroxide) in a second organic liquid (such as one or more vegetable oils described elsewhere herein, e.g., sunflower, coconut oil, etc.) at similar locations. Metal source compounds or mixtures thereof may be combined in a second organic liquid at any concentration suitable for forming a solid/liquid suspension therein, and which may be pumped or is otherwise flowable. In one embodiment, metal source compound/s (such as aluminum oxide, aluminum hydroxide, caustic powder, etc.) may be suspended in a second organic liquid at a concentration of, for example, from about 1 lb/gallon to about 7 lb/gallon, alternatively from about 3 lb/gallon to about 5 lb/gallon, by weight of total solution. However, concentrations outside this range are also possible. Furthermore, optional suspension agents, such as organophilic clays, may be added to help suspend metal source compounds in a suspension.

Metal source compound suspensions may be combined, for example, by delivering a second organic liquid slurry or suspension containing the metal source compound to the first organic liquid already containing the other metal source compounds and carboxylic acid, or by concomitantly delivering to an organic fluid process stream separate organic liquid slurries or suspensions containing each of the solid components. One example of the latter scheme would be concomitant delivery to a first organic fluid process stream (such as diesel) of fatty acid diluted with vegetable oil, fatty acid salt/vegetable oil suspension and/or aluminum hydroxide vegetable oil suspension. A sodium hydroxide fine powder dispersed in vegetable oil may also be added to saponify the fatty acid. Many variations and modifications are possible.

Advantageously, such use of organic fluid base slurries avoids exposing metal source compounds to water or substantial amounts thereof, which may be desirable when handling such materials. In either case, it will be understood that separate components may be combined with organic base fluid at the same location, or in separate locations of a process stream being formulated and introduced, for example, into a well bore.

In formulating a slurry of solid metal source compound, it is usually desirable to choose an organic fluid that will not react with the solid metal source compound under conditions encountered prior to combination with an organic fluid/carboxylic acid mixture. Advantageously, by selecting an organic base fluid for formulating the metal source compound slurry (and/or by selecting a treatment fluid base fluid) that converts to carboxylic or fatty acids upon heating to react with metal components of the treatment fluid, additional enhancement of viscosity may be achieved as a treatment fluid is heated, such as when being displaced downhole as a well treatment fluid.

It will be understood by those of skill in the art with benefit of this disclosure that various components may advantageously be selected based on the anticipated treatment conditions, such as downhole temperature, so that desired viscosities may exist at different points in the mixing process (e.g., at mixing points, in the wellbore, in the formation, etc.) Similar methodology may also be employed when mixing other types of treatment fluids (such as pipeline or process equipment treatment fluids), based on the conditions expected therein. Furthermore, in those applications where temperature and shear may be controlled, these variables may be manipulated to cause desired viscosity changes as well.

For example, carboxylic acid (e.g., fatty acid) and carboxylic acid salt (e.g., aluminum octoate) may be combined with organic fluid (e.g., diesel, Fracsol, xylene) in a blender tub of a continuous mix process, with a metal hydroxide or saponifier (e.g., potassium hydroxide, sodium hydroxide, aluminum hydroxide, or alternatively, any other metal source compound capable of saponifying or forming soap with the carboxylic acid at ambient or relatively lower temperatures) being added to the process stream downhole of the blender tub and, if desired, such that shear is induced to the fluid by a centrifugal pump displacing the fluid. In such an embodiment, substantially immediate viscosity development is achieved by soap formation with the metal hydroxide or other suitable saponifier, for example to help transport proppant downhole. Secondary viscosity may then be advantageously realized due to the carboxylic acid salt as the treatment fluid is displaced downhole and heated and/or exposed to shearing. Such secondary viscosity may serve, for example, to impart increased high temperature stability and/or rheology for proppant transport, fluid loss control, etc. Other suitable metal source compound components for developing delayed or secondary viscosity include, but are not limited to metal alkoxides (such as aluminum isopropoxide), etc.

It will also be understood with benefit of this disclosure by those of skill in the art that any batch mixing method known in the art which is suitable for combining the disclosed components to form gelled organic fluids may also be employed. For example, individual liquid and/or solid components described herein may be combined in a mixing vessel (for example, one or more frac tanks), and circulated until suitable mixing or gellation occurs. Slurried or suspended solid components may also be added to a mixing vessel in a similar manner. In one exemplary embodiment, carboxylic acid and carboxylic acid salt components may be combined with organic base fluid in a mixing vessel to form a treatment fluid, then saponifying or relatively rapid soap-forming metal source compound/s (such as previously described) may be combined with the treatment fluid as it is displaced to the wellbore to achieve early viscosification in a manner similar to that previously described for a continuous mixing process. In another embodiment, only carboxylic acid component may be added to organic fluid in a mixing vessel, then all other metal source compounds added to form a treatment fluid as the mixture is displaced to the wellhead. Other variations are also possible. In any case, it is typically desirable in such a batch mixing process to combine components in such a way that the organic fluid does not develop excess viscosity that would impede removal or displacement of the fluid from the mixing vessel.

In either of batch or continuous mixing processes, one or more optional surfactant/s and/or aromatic compounds as previously described may be combined with a treatment fluid, for example, to facilitate speed of dispersion/integration and/or interaction of solid components with the treatment fluid. Such surfactant or aromatic addition may be particularly desirable, for example, when using a continuous mixing process and solid components.

For hydraulic fracturing, a batch or continuous mixed gelled organic-based treatment fluid may be combined with proppant in any manner known in the art and introduced into the wellbore in subterranean formation at a pressure above the fracturing pressure of the subterranean formation. With benefit of this disclosure, those of skill in the art will understand that the disclosed non-phosphate organic liquid gels may be employed to hydraulically fracture a subterranean formation using any method in combination of components known in the art of, for example, oil-based fracturing. In one example, the disclosed non-phosphate gelled organic fluids may be displaced into a subterranean formation above the fracturing pressure of the formation, and with or without proppants like sand (such as Ottawa, Brady or Colorado Sands), synthetic organic particles, glass microspheres, ceramics (including aluminosilicates such as "CARBOLITE," "NAPLITE" or "ECONOPROP"), resin-coated sand (such as "ACME BORDEN PR 6000" or "SANTROL TEMPERED HS"), sintered bauxite, and mixtures thereof.

It will be understood with benefit of this disclosure that one or more of the above-described methods of combining components of the disclosed non-phosphate gelled organic fluids, as well as variations thereof, may be employed to other types of organic based treatment fluids including, but not limited to, pipeline treatment fluids and fluid processing equipment treatment fluids.

Pipeline Treatment Fluids

With benefit of the present disclosure, the disclosed non-phosphate organic liquid gels may be employed by those of skill in the art in a number of ways including, but not limited to, in any manner and/or for any purpose known in the art that makes use of, for example, gelled hydrocarbon fluids within a pipeline interior. For example, a pipeline treatment fluid may be used to clean and/or convert pipeline transmission lines, isolate a pipeline from invasive materials, displace solid materials and/or fluids through a pipeline, or to separate pipeline products from each other or from other materials within the pipeline. Specific examples of such uses include, but are not limited to, use of a gelled plug or pig to isolate two separate fluids (such as different pipeline products) under static or dynamic conditions of flow within a pipeline interior. The disclosed liquid organic gels may also be used to remove debris or contaminants from the interior of the pipeline, such as by displacing a gelled pig of a treatment fluid containing non-phosphate organic liquid gel through at least a portion of a pipeline. Further information on using gelled materials in pipeline include, but are not limited to, those methods described in U.S. Pat. Nos. 5,419,183; 5,197,324; 4,635,727; 4,543,131; 4,416,703; 4,252,465; 4,003,393, and 5,145,590, each of which is incorporated herein by reference in its entirety.

In one exemplary embodiment, when used as a gel pig, the pipeline treatment fluid may be employed in conjunction with a mechanical pig as is known in the art. In one exemplary embodiment, a gel pig may be formed from a liquid organic gel and displaced through a pipeline by fluid under pressure. In this regard, displacement fluid may be gas or liquid, depending upon the needs of the user and the availability of fluids. A gel pig may be used alone or as an element of a "pig train" in a pipeline cleaning process. Such a pig train may be formed, for example, by preceding and/or following a pipeline treatment fluid gel plug with mechanical pigs and/or other chemical pig segments. Such chemical pig segments may be of the same or different composition and may include the additives such as corrosion inhibitors, bactericides, passivation agents, etc. Such chemical pig segments may be liquids or gels.

In other exemplary embodiments, a non-phosphate liquid organic gel pipeline treatment fluid may be employed as a separation plug or pig to separate one or more materials, such as pipeline product fluids (e.g., hydrocarbons, paraffins, asphaltenes, fuel oil, condensate, etc.), existing within a pipeline, under static or dynamic conditions, or as a microplug to remove fluids, solids and semi-solids (such as sand, tar, corrosion products and other debris and contaminants, etc.) from the interior of a pipeline.

It will be further understood with benefit of this disclosure that a non-phosphate gelled organic pipeline treatment fluid may be combined with other common pipeline chemicals or additives, such as biocides, oxygens, scavengers, scale inhibitors, dyes, etc.

Process Equipment Treatment Fluids

In other embodiments of the disclosed method and compositions, the disclosed non-phosphate liquid organic gels may be employed in fluid processing applications including, but not limited to, oil field production facility, refinery, and chemical plant applications.

Breaker Materials

In the practice of the disclosed method, any breaker material suitable for reducing viscosity of the disclosed gels may be employed. Examples include calcined magnesium oxide and tetraethylenepentamine.

Calcined magnesium oxide used in an amount of from about 10 to about 50 pounds per thousand gallons of gelled fluid. In one embodiment, calcined magnesium oxide (such as –325 mesh "Mag Chem 10" from Martin Marietta, or RG-35 from BJ Services) may be encapsulated with, for example, an oil soluble resin such as described in U.S. Pat. No. 5,497,830, which is incorporated herein by reference. Calcined magnesium oxide may be used in size suitable for imparting gel breaking charactertics, such as from about –40 mesh to about –325 mesh, although smaller and larger sizes are also possible. Reactivity (or degree of calcination) may be varied to meet particular conditions and desired breaking times. In one embodiment, –325 mesh calcined magnesium oxide may be suspended in diesel in an amount of 5 pounds per gallons to form a slurry having about 52% calcined magnesium oxide by weight of the slurry, and also contains about 1.1% organophillic clay ("A140" available from Rheox) by weight of the slurry, 0.7% amidozaline dispersant/surfactant by weight of total slurry. One example of such a suspension is available as "GBL-5L" from BJ Services, and in one embodiment it may be added in an amount sufficient to supply from about 10 to about 50 pounds of active magnesium oxide per thousand gallons of gelled fluid.

Additional information on breakers includes the following: Mag Chem 10 from Martin Marietta, or RG-35 from BJ Services) may be encapsulated with, for example, an hydrocarbon(oil) soluble resin such as "VINSOL Resin" by Hercules Incorporated, Wilmington, Del., which is described in U.S. Pat. No. 5,497,830, which is incorporated by reference herein. Calcined magnesium oxide may be used in size suitable for imparting gel breaking characteristics, such as from about –40 mesh to about –325 mesh, although smaller and larger sizes are also possible. Reactivity (or degree of calcination) may be varied to meet particular conditions and desired breaking times. In one embodiment, –325 mesh calcined magnesium oxide may be suspended in diesel in an amount of 5 pounds per gallons to form a slurry having about 52% calcined magnesium oxide by weight of the slurry, and also contains about 1.1% organophillic clay ("Bentone A140" available from Rheox, Inc., Highstown, N.J.) by weight of the slurry, 0.7% amidozaline dispersant/surfactant by weight of total slurry. One example of such a suspension is available as "GBL-5L" from BJ Services, and in one embodiment it may be added in an amount sufficient to supply from about 10 to about 50 pounds of active magnesium oxide per thousand gallons of gelled fluid. Solid amine breakers such as hexamethylenetetraamine (available, for example from Spectrum Chemical Manufacturing Corporation, Gardena, Calif.) and tetramethylenepentamine ("En Cap 90706" available from Fritz Industries, Inc. of Dallas, Tex.) may be used alone or in combination in amounts of from about 5 to about 20 pounds per thousand gallons of gelled fluid, although greater and lesser amounts are also possible. Such solid breaker materials may be added at any point in a continuous or batch mix process. Breaker reactivity, size, composition, etc. may be varied by those of skill in the art to achieve control break of the gel at a desired point, such as when a fracturing fluid encounters downhole conditions.

Solid amine breakers such as hexamethylenetetraamine and tetraethylenepentamine ("En Cap 90706", "En Cap 80715" available from Fritz Industries, Inc. of Dallas, Tex.) may be used alone or in combination in amounts of from about 5 to about 20 pounds per thousand gallons of gelled fluid, although greater and lesser amounts are also possible.

Such solid breaker materials may be added at any point in a continuous or batch mix process. Breaker reactivity, size, composition, etc. may be varied by those of skill in the art to achieve control break of the gel at a desired point, such as when a fracturing fluid encounters downhole conditions.

EXAMPLES

The following examples are illustrative and should not be construed as limiting the scope of the invention or claims thereof.

In Examples 1–15, non-phosphate gelled fluids were mixed using the following procedure: 214 g diesel organic fluid is measured into clean dry jar & mounted on a Servodyne Lightning Mixture Model 444530 made by Cole-Palmer Instruments. A 1" diameter 6 blade paddle is immersed half-way into the volume of the fluid in a slightly off-center position. The mixer is set at 2000 RPM (+/–50 RPM) and the components added and mixed.

Examples 1–15 were each carried out at a temperature of 75° C.

Example 1

Preparation and Use of Particulate Reaction Product Formed from Fatty Acid, Aluminum Carboxylic Acid Salt, and Aluminum Second Metal Source Compound 13.65 grams of tall oil fatty acid ("SLYFAT FA-1" available from Arizona Chemicals, also available as "G20" from BJ Services) was delivered into a clean, dry 250 milliliter beaker.

SYLFAT FA-1 contains 92.7% fatty acids, 2.8% unsaponifiables and 4.5% rosin acids, with less than 0.1% moisture and less than 0.01% ash. The fatty acid content of SYLFAT FA-1 includes 34% non-conjugated linoleic, 9% conjugated linoleic, 44% oleic, and 5% saturated. SYLFAT FA-1 has an acid number of 194, a saponification number of 197, and an iodine number of 131. SYLFAT FA-1 Sp has a saponification number of 198.

In this example, 3 grams of aluminum 2-ethylhexanoate (aluminum octoate) was dispersed into the tall oil fatty acid. 1 gram of a 10% aluminum isopropoxide solution was also added. This mixture was then blended with a spatula until a viscous to solid mass reaction product was developed. This reaction product was then placed in a desicator and allow to continue solidify and/or dry for 16 hours. After this period, the material was ground with mortar and pestle to approximately a 100 to 325 mesh particle size. A 214 gram sample of "off road" No.2 diesel was delivered into a clean, dry 16 ounce graduated wide-mouth jar. "Off-road diesel" is a term used herein to describe diesel fuel sold for non-highway use, and selected for use in the examples due to its lower cost. This solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 2

Gellation of Diesel from Fatty Acid, Aluminum Carboxylic Acid Salt and Aluminum Second Metal Source Compound A 214 gram of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 40 L/M$^3$ of tall oil fatty acid(SYLFAT FA-1) was then added to the diesel solution and mixing continued at the same speed. Aluminum 2-ethylhexanoate (aluminum octoate) was dispersed at a concentration of 4.8 Kg/M3 into the mixing solution. Aluminum chloride solution was delivered at 0.6 Kg/M$^3$. A 50% by weight sodium hydroxide solution was then delivered at 2 L/M$^3$. Solution mixing continued until a viscous gel developed.

Example 3

Preparation and Use of Particulate Reaction Product Formed from Fatty Acid and Aluminum Carboxylic Acid Salt 60 grams of tall oil fatty acid (SYLFAT FA-1) was delivered into a clean, dry 250 milliliter beaker. 20 grams of aluminum 2-ethylhexanoate (aluminum octoate) was dispersed into the tall oil fatty acid and mixed with spatula until a viscous to solid mass developed. This reaction product was then placed in a desicator and allow to continue solidify and/or dry for 16 hours. After this period, the material was ground with mortar and pestle to approximately a 100 to 325 mesh particle size. A 214 gram sample of "off road" No.2 diesel was delivered into a clean, dry 16 ounce graduated wide-mouth jar. This solution was then positioned on a Lightning Mixer apparatus. The solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 4

Preparation and Use of Particulate Reaction Product Formed from Fatty Acid, Aluminum Carboxylic Acid Salt and Aluminum Second Metal Source Compound Sixty (60) grams of tall oil fatty acid (SYLFAT FA-1) was delivered into a clean, dry 250 milliliter beaker. Three (3) grams of aluminum 2,4 pentanedione was dispersed into the tall oil fatty acid and twenty (20) grams of aluminum 2-ethylhexanoate (aluminum octoate) was dispersed into the tall oil fatty acid and mixed with spatula until a viscous to solid mass developed. This reaction product was then placed in a desicator and allowed to continue solidify and/or dry for 16 hours. After this period, the material was ground with mortar and pestle to approximately a 100 to 325 mesh particle size distribution. A 214 gram aliquot of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 5

Preparation and Use of Particulate Reaction Product Formed from Fatty Acid, Iron Carboxylic Acid Salt and Aluminum Second Metal Source Compound 13.65 grams of tall oil fatty acid (SYLFAT FA-1) was delivered into a clean, dry 250 milliliter beaker. 3 grams of iron 2-ethylhexanoate (iron octoate) was then dispersed into the tall oil fatty acid. 1 gram of a 10% aluminum isopropoxide solution was also added. This mixture was then blended with a spatula until a viscous to solid mass reaction product was developed. This reaction product was then placed in a desicator and allow to continue solidify and/or dry for 16 hours. After this period, the material was ground with mortar and pestle to approximately a 100 to 325 mesh particle size distribution. A 214 gram of "off road" No.2 diesel was delivered into a clean, dry 16 ounce graduated wide-mouth jar. This sample solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 6

Preparation and Use of Particulate Reaction Product Formed from Fatty Acid, Iron Metal Source and Aluminum Second Metal Source Compound 13.65 grams of tall oil fatty acid (SYLFAT FA-1) was delivered into a clean, dry 250 milliliter beaker. 4 grams of ferric ammonium sulfate was then dispersed into the tall oil fatty acid. 1 gram of a 10% aluminum isopropoxide solution was also added. This mixture was then blended with a spatula until a viscous to solid mass reaction product was developed. This reaction product was then placed in a desicator and allow to continue solidify and/or dry for 16 hours. After this period, the material was ground with mortar and pestle to approximately a 100 to 325 mesh particle size. A 214 gram sample of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–200 mesh reaction product was then dispersed into the diesel solution at a concentration of 17.65 grams per 250 milliliters diesel. Mixing continued until a viscous gel developed.

Example 7

Preparation and Use of Particulate Reaction Product Formed from Fatty Acid, Iron Metal Source and Aluminum Second Metal Source Compound 13.65 grams of tall oil fatty acid (SYLFAT FA-1) was delivered into a clean, dry 250 milliliter beaker. 3 grams of ferric hydroxide was then dispersed into the tall oil fatty acid. 1 gram of a 10% aluminum isopropoxide solution was also added. This mixture was then blended with a spatula until a viscous to solid reaction product was developed. This reaction product was then placed in a desicator and allow to continue solidify and/or dry for 16 hours. After this period, the material was ground with mortar and pestle to approximately a 100 to 325 mesh particle size. A 214 gram sample of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–200 mesh reaction product was then dispersed into the diesel solution at a concentration of 17.65 grams per 250 milliliters diesel. Mixing continued until a viscous gel developed.

Example 8

Preparation and Use of Particulate Reaction Product Formed from Fatty Acid, Aluminum Salt of Carboxylic Acid and Two Aluminum Second Metal Source Compounds 13.65 grams of tall oil fatty acid (SYLFAT FA-1) was delivered into a clean, dry 250 milliliter beaker. 3 grams of aluminum 2-ethylhexanoate (aluminum octoate) was dispersed into the tall oil fatty acid. 0.3 grams of aluminum oxide was also dispersed into the mixing fluid. 1 gram of a 10% aluminum isopropoxide solution was also added. This mixture was then blended with a spatula until a viscous to solid mass reaction product was developed. This reaction product was then placed in a desicator and allow to continue solidify and/or dry for 16 hours. After this period, the material was ground with mortar and pestle to approximately a 100 to 200 mesh particle size distribution. This reaction product was then placed in a desicator and allow to continue solidify and/or dry for 16 hours. A 214 gram sample of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 9

Gellation of Diesel Using Fatty Acid, Aluminum Salt of Carboxylic Acid and Aluminum Second Metal Source Compound A 214 gram sample of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 60 L/M³ of tall oil fatty acid (SYLFAT FA-1) was then added to the diesel solution and mixing continued at the same speed. Aluminum 2-ethylhexanoate (aluminum octoate) at a concentration of 12 Kg/M3 was dispersed into the mixing solution. A 10% Aluminum isopropoxide solution was delivered at 4 L/M³. Solution mixing continued until a viscous gel developed.

Example 10

Gellation of Diesel Using Fatty Acid, Aluminum Salt of Carboxylic Acid and Aluminum Second Metal Source Compound A 214 gram sample of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 20 L/M³ of tall oil fatty acid ("SYLFAT FA-1") was then added to the diesel solution and mixing continued at the same speed. Aluminum 2-ethylhexanoate (aluminum octoate) at a concentration of 2.4 Kg/M3 was dispersed into the mixing solution. A 10% Aluminum isopropoxide solution was delivered at 1.25 L/M³. Solution mixing continued until a viscous gel developed.

Example 11

Gellation of Diesel Using Fatty Acid, Aluminum Salt of Carboxylic Acid and Aluminum Second Metal Source Compound in Combination with Surfactant A 214 gram sample of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 20 L/M³ of tall oil fatty acid (SYLFAT FA-1) was then added to the diesel solution and mixing continued at the same speed. Aluminum 2-ethylhexanoate (aluminum octoate) at a concentration of 2.4 Kg/M3 was dispersed into the mixing solution. A 10% Aluminum isopropoxide solution was delivered at 1.25 L/M³. A fatty acid derived amine surfactant ("ARMEEN C" from Akzonobel Chemicals Incorporated) solution was then delivered at a concentration of 2 L/M³. Solution mixing continued until a viscous gel developed.

Example 12

Gellation of Diesel Using Fatty Acid, Aluminum Salt of Carboxylic Acid and Aluminum Second Metal Source Compound in Combination with Surfactant A 214 gram sample of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 20 L/M³ of tall oil fatty acid(SYLFAT FA-1) was then added to the diesel solution and mixing continued at the same speed. Aluminum 2-ethylhexanoate (aluminum octoate) at a concentration of 2.4 Kg/M3 was dispersed into the mixing solution. A 10% Aluminum isopropoxide solution was delivered at 1.25 L/M³. A alkoxylated fatty amine surfactant solution ("ARMAK 1730" from Akzonobel Chemicals Incorporated) was then delivered at 2 L/M$^3$. Solution mixing continued until a viscous gel developed.

Example 13

Gellation of Diesel Using Fatty Acid, Aluminum Salt of Carboxylic Acid and Two Aluminum Second Metal Source Compounds A 214 gram aliquot of "off road" No.2 diesel was delivered into a clean, dry 16 ounce graduated wide-mouth jar. This solution was then positioned on a Lightning Mixer apparatus. Solution was blended at about 2000 rpm (+/−) 50. A proportional concentration equaling 20 L/M$^3$ of tall oil fatty acid (SYLFAT FA-1) was then added to the diesel solution and mixing continued at the same speed. Aluminum 2-ethylhexanoate (aluminum octoate) at a concentration of 2.4 Kg/M3 was dispersed into the mixing solution. A 10% Aluminum isopropoxide solution was delivered at 1.25 L/M$^3$. An aluminum hydroxide/vegetable cooking oil suspension solution containing 4 lb/gallon aluminum hydroxide was then delivered at 1–5 L/M$^3$. Solution mixing continued until a viscous gel developed.

Example 14

Preparation and Use of Particulate Reaction Product Formed from Fatty Acid and Aluminum Salt of Carboxylic Acid Sixty (60) grams of tall oil fatty acid (SYLFAT FA-1) was delivered into a clean, dry 250 milliliter beaker. Twenty (20) grams of aluminum stearate was then dispersed into the tall oil fatty acid and mixed with spatula until a viscous to solid mass developed. This reaction product was then placed in a desicator and allow to continue solidify and/or dry for 16 hours. After this period, the material was ground with mortar and pestle to approximately a 100 to 325 mesh particle size. A 214 gram aliquot of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Example 15

Preparation and Use of Particulate Reaction Product Formed from Fatty Acid and Aluminum Salt of Carboxylic Acid Sixty (60) grams oleic acid was delivered into a clean, dry 250 milliliter beaker. Twenty (20) grams of aluminum stearate was dispersed into the tall oil fatty acid a and mixed with spatula until a viscous to solid mass developed. This reaction product was then placed in a desicator and allow to continue solidify and/or dry for 16 hours. After this period, the material was ground with mortar and pestle to approximately a 100 to 325 mesh particle size. A 214 gram sample of "off road" No.2 diesel was delivered into a clean, dry 16 ounce graduated wide-mouth jar. This solution was then positioned on a Lightning Mixer apparatus. Solution was blended at 2000 rpm (+/−) 50. The 100–325 mesh reaction product was then dispersed into the diesel solution at a concentration of 17.65 grams per 250 milliliters diesel. Mixing continued until a viscous gel developed.

Examples 16–18

In examples 16–18, as well as each of the other examples herein where viscosity is measured on a FANN rotational visocometer, the following procedure was employed. First, the described materials were mixed according to the mixing instructions for achieving "vortex closure" as outlined in relation to Example 20. Then, to measure viscosity, a 45 milliliter sample of the individual gelled organic fluid was delivered to a FANN 50C rotational viscometer rotor cup. The sample was then mounted on the viscometer and pressurized to 300 PSI with nitrogen. The viscometer was zeroed, and its viscosity measurement program initiated, and viscosity measurements taken as heating is applied. Results are shown in the tables accompanying each example.

Example 16

Rheological Measurements at 150° F. of Gelled Fluid System Comprising Diesel, Fatty Acid, Aluminum Salt of Carboxylic Acid and Aluminum Second Metal Source Compound A non-phosphate gelled fluid system was formed by combining the following components with "off road" No.2 diesel to achieve a viscous gel: tall oil fatty acid ("SYLFAT FA-1" from Arizona Chemical/"G-20" from BJ Services) at a concentration of 60 gallons per thousand gallons of diesel ("GPT"); aluminum 2-ethylhexanoate (aluminum octoate) powder at a concentration of 100 pounds per thousand gallons of diesel ("PPT"); and aluminum isopropoxide ("PETROSURF XL" from Rhone Poulenc) at a concentration of 4 GPT.

Rheological characteristics of the gel were evaluated at 150° F. using a "FANN 50C" rheometer, and are presented in Table 36. Results of this example show that suitable fracturing rheology is obtained at this temperature.

TABLE 36

Example 16 Fann 50c Readings at 150° F.

| TIME | TEMP | | | Viscosity (Cp) | | |
|---|---|---|---|---|---|---|
| (minutes) | (° F.) | n' | K | 170 s$^{-1}$ | 100 s$^{-1}$ | 40 s$^{-1}$ |
| 2 | 87 | .597 | .1636 | 989 | 1225 | 1772 |
| 18 | 143 | .439 | .2526 | 678 | 913 | 1527 |
| 35 | 150 | .426 | .2748 | 690 | 936 | 1583 |
| 51 | 152 | .415 | .291 | 691 | 942 | 1610 |
| 68 | 153 | .403 | .307 | 685 | 940 | 1625 |
| 84 | 153 | .398 | .3135 | 682 | 939 | 1629 |
| 100 | 153 | .389 | .3259 | 677 | 936 | 1638 |
| 117 | 153 | .389 | .3265 | 678 | 938 | 1641 |
| 133 | 153 | .384 | .3321 | 672 | 932 | 1639 |
| 150 | 153 | .379 | .3386 | 668 | 929 | 1640 |
| 166 | 153 | .372 | .3475 | 661 | 923 | 1641 |
| 182 | 153 | .372 | .3473 | 661 | 922 | 1640 |
| 199 | 153 | .372 | .3468 | 660 | 921 | 1638 |
| 215 | 153 | .364 | .3565 | 651 | 912 | 1634 |
| 232 | 153 | .366 | .3527 | 651 | 911 | 1629 |
| 248 | 153 | .359 | .3626 | 645 | 907 | 1632 |
| 264 | 153 | .362 | .3575 | 646 | 907 | 1627 |
| 281 | 153 | .361 | .3578 | 643 | 903 | 1622 |
| 297 | 153 | .356 | .3644 | 639 | 899 | 1622 |
| 314 | 153 | .354 | .3647 | 633 | 891 | 1611 |
| 330 | 153 | .35 | .3707 | 630 | 890 | 1614 |
| 346 | 153 | .352 | .3675 | 631 | 890 | 1612 |
| 363 | 153 | .348 | .3717 | 625 | 884 | 1606 |
| 379 | 153 | .345 | .3761 | 623 | 882 | 1607 |
| 396 | 153 | .346 | .3729 | 621 | 878 | 1599 |
| 412 | 153 | .347 | .3691 | 618 | 874 | 1589 |
| 428 | 153 | .349 | .3643 | 616 | 870 | 1580 |

TABLE 36-continued

Example 16 Fann 50c Readings at 150° F.

| TIME (minutes) | TEMP (° F.) | n' | K | Viscosity (Cp) | | |
|---|---|---|---|---|---|---|
| | | | | 170 s⁻¹ | 100 s⁻¹ | 40 s⁻¹ |
| 431 | 153 | .339 | .3806 | 611 | 868 | 1591 |
| 448 | 153 | .341 | .376 | 610 | 866 | 1583 |
| 464 | 153 | .342 | .3738 | 610 | 865 | 1580 |
| 480 | 153 | .336 | .3816 | 604 | 858 | 1578 |
| 497 | 153 | .334 | .3835 | 600 | 855 | 1574 |
| 513 | 153 | .335 | .3804 | 599 | 852 | 1567 |
| 530 | 153 | .33 | .388 | 595 | 849 | 1569 |
| 546 | 153 | .329 | .3874 | 591 | 844 | 1561 |
| 562 | 153 | .329 | .3871 | 591 | 843 | 1560 |
| 579 | 153 | .327 | .3885 | 587 | 839 | 1554 |
| 595 | 153 | .328 | .3858 | 586 | 837 | 1549 |
| 612 | 153 | .324 | .3906 | 581 | 832 | 1545 |
| 628 | 153 | .326 | .3866 | 581 | 831 | 1541 |
| 644 | 153 | .323 | .39 | 577 | 827 | 1537 |
| 661 | 153 | .321 | .3933 | 576 | 826 | 1538 |
| 677 | 153 | .321 | .3913 | 573 | 822 | 1530 |
| 694 | 153 | .322 | .3895 | 573 | 822 | 1529 |
| 710 | 153 | .318 | .3955 | 570 | 819 | 1530 |
| 726 | 153 | .316 | .397 | 567 | 815 | 1525 |
| 743 | 153 | .315 | .3987 | 566 | 814 | 1525 |
| 759 | 153 | .314 | .3985 | 563 | 810 | 1519 |
| 776 | 153 | .31 | .404 | 559 | 806 | 1517 |
| 792 | 153 | .313 | .3986 | 560 | 807 | 1514 |
| 808 | 153 | .31 | .403 | 558 | 804 | 1514 |
| 825 | 153 | .311 | .4001 | 557 | 802 | 1508 |
| 841 | 153 | .311 | .4005 | 557 | 803 | 1510 |
| 858 | 153 | .309 | .4016 | 553 | 798 | 1503 |
| 874 | 153 | .309 | .4014 | 553 | 797 | 1502 |
| 890 | 153 | .306 | .4059 | 550 | 795 | 1502 |
| 907 | 153 | .302 | .4124 | 548 | 793 | 1504 |
| 923 | 153 | .307 | .4035 | 550 | 794 | 1499 |
| 939 | 153 | .303 | .4089 | 546 | 790 | 1497 |
| 956 | 153 | .303 | .4084 | 545 | 789 | 1495 |
| 972 | 153 | .305 | .4058 | 547 | 791 | 1496 |
| 989 | 153 | .298 | .417 | 543 | 788 | 1499 |
| 1005 | 153 | .305 | .4035 | 544 | 787 | 1488 |
| 1021 | 153 | .305 | .4044 | 545 | 789 | 1491 |

Example 17

Rheological Measurements at 215° F. of Gelled Fluid System Comprising Diesel, Fatty Acid, Aluminum Salt of Carboxylic Acid and Aluminum Second Metal Source Compound A non-phosphate gelled fluid system was formed by combining the following components with "off road" No.2 diesel to achieve a viscous gel: tall oil fatty acid ("SYLFAT FA-1" from Arizona Chemical/"G-20" from BJ Services) at a concentration of 60 gallons per thousand gallons of diesel ("GPT"); aluminum 2-ethylhexanoate (aluminum octoate) powder at a concentration of 100 pounds per thousand gallons of diesel ("PPT"); and aluminum isopropoxide ("PETROSURF XL" from Rhone Poulenc) at a concentration of 4 GPT.

Rheological characteristics of the gel were evaluated at 215° F. using a "FANN 50C" rheometer, and are presented in Table 37. Results of this example show that suitable fracturing rheology is obtained at this temperature.

TABLE 37

Example 17 Fann 50c Readings at 215° F.

| TIME (minutes) | TEMP (° F.) | n' | K | Viscosity (Cp) | | |
|---|---|---|---|---|---|---|
| | | | | 170 | 100 | 40 |
| 2 | 90 | .577 | .1775 | 968 | 1212 | 1786 |
| 19 | 185 | .341 | .2979 | 483 | 686 | 1254 |
| 35 | 213 | .331 | .2986 | 460 | 656 | 1212 |
| 51 | 217 | .37 | .254 | 478 | 668 | 1190 |
| 68 | 217 | .369 | .2493 | 467 | 653 | 1164 |
| 84 | 217 | .376 | .2361 | 459 | 639 | 1131 |
| 100 | 218 | .372 | .2357 | 449 | 626 | 1113 |
| 117 | 218 | .376 | .225 | 437 | 609 | 1078 |
| 133 | 218 | .376 | .2201 | 428 | 595 | 1055 |
| 150 | 218 | .368 | .2238 | 417 | 583 | 1041 |
| 166 | 217 | .365 | .2224 | 408 | 572 | 1023 |
| 182 | 218 | .365 | .2195 | 403 | 565 | 1010 |
| 199 | 218 | .356 | .2255 | 395 | 556 | 1004 |
| 215 | 217 | .355 | .2229 | 389 | 548 | 989 |
| 232 | 218 | .352 | .2235 | 384 | 541 | 980 |
| 248 | 218 | .352 | .2203 | 378 | 534 | 966 |
| 264 | 218 | .341 | .2286 | 371 | 526 | 963 |
| 281 | 218 | .333 | .2343 | 365 | 520 | 958 |
| 297 | 218 | .326 | .2391 | 359 | 514 | 953 |
| 314 | 218 | .347 | .2158 | 361 | 511 | 929 |
| 330 | 218 | .332 | .2283 | 354 | 504 | 930 |
| 346 | 218 | .336 | .2223 | 352 | 500 | 919 |
| 363 | 219 | .34 | .2151 | 347 | 493 | 903 |
| 379 | 218 | .328 | .2261 | 343 | 490 | 908 |
| 396 | 218 | .337 | .215 | 342 | 486 | 892 |
| 412 | 219 | .335 | .2149 | 338 | 481 | 885 |
| 429 | 218 | .33 | .2186 | 335 | 478 | 884 |
| 445 | 218 | .339 | .2082 | 334 | 475 | 870 |
| 461 | 219 | .334 | .2114 | 331 | 471 | 868 |
| 478 | 218 | .343 | .2028 | 332 | 471 | 860 |
| 494 | 218 | .336 | .2068 | 327 | 465 | 855 |
| 511 | 218 | .333 | .2086 | 325 | 463 | 853 |
| 527 | 218 | .327 | .2138 | 323 | 462 | 855 |
| 543 | 218 | .321 | .2171 | 318 | 456 | 849 |
| 560 | 218 | .335 | .2027 | 319 | 454 | 835 |
| 576 | 218 | .329 | .2076 | 317 | 452 | 837 |
| 593 | 218 | .343 | .1942 | 318 | 451 | 824 |
| 609 | 218 | .34 | .1948 | 314 | 446 | 817 |
| 625 | 219 | .324 | .2077 | 309 | 442 | 822 |
| 642 | 218 | .331 | .2012 | 310 | 442 | 817 |
| 658 | 218 | .337 | .1947 | 310 | 440 | 808 |
| 675 | 219 | .335 | .195 | 307 | 437 | 803 |
| 691 | 218 | .341 | .1893 | 307 | 436 | 797 |
| 707 | 218 | .343 | .1869 | 307 | 434 | 793 |
| 724 | 219 | .335 | .1918 | 302 | 430 | 790 |
| 740 | 218 | .325 | .2002 | 299 | 428 | 795 |
| 757 | 218 | .349 | .18 | 304 | 430 | 781 |
| 773 | 218 | .351 | .1772 | 303 | 427 | 774 |
| 789 | 218 | .335 | .1891 | 298 | 424 | 779 |
| 806 | 218 | .348 | .1784 | 300 | 424 | 771 |
| 822 | 218 | .333 | .1893 | 295 | 420 | 774 |
| 839 | 218 | .332 | .1893 | 293 | 418 | 771 |
| 855 | 218 | .351 | .1741 | 297 | 420 | 761 |
| 871 | 218 | .361 | .1659 | 298 | 419 | 752 |
| 888 | 218 | .348 | .1742 | 293 | 414 | 753 |
| 904 | 218 | .364 | .1625 | 297 | 416 | 745 |
| 921 | 218 | .339 | .1805 | 290 | 412 | 755 |
| 937 | 218 | .354 | .1687 | 293 | 412 | 745 |
| 953 | 218 | .347 | .1738 | 291 | 411 | 749 |
| 970 | 218 | .348 | .1725 | 290 | 410 | 745 |
| 986 | 217 | .35 | .1709 | 291 | 410 | 744 |
| 1003 | 217 | .342 | .1764 | 288 | 408 | 746 |
| 1019 | 217 | .335 | .1814 | 286 | 406 | 747 |
| 1035 | 217 | .334 | .182 | 285 | 406 | 747 |
| 1052 | 218 | .338 | .1777 | 284 | 403 | 740 |

Example 17A

Rheological Measurements at 275° F. of Gelled Fluid System Comprising Diesel, Fatty Acid, Aluminum Salt of Carboxylic Acid and Aluminum Second Metal Source Compound A non-phosphate gelled fluid system was formed by combining the following components with "off road" No.2 diesel to achieve a viscous gel: tall oil fatty acid ("SYLFAT FA-1" from Arizona Chemical/"G-20" from BJ Services) at a concentration of 60 gallons per thousand gallons of diesel ("GPT"); aluminum 2-ethylhexanoate (aluminum octoate) powder at a concentration of 100 pounds per thousand gallons of diesel ("PPT"); and aluminum isopropoxide ("PETROSURF XL" from Rhone Poulenc) at a concentration of 4 GPT.

Rheological characteristics of the gel were evaluated at 275° F. using a "FANN 50C" rheometer, and are presented in Table 38. Results of this example show that suitable fracturing rheology is obtained at this temperature.

TABLE 38

Example 17a Fann 50c Readings at 275° F.

| TIME (minutes) | TEMP (° F.) | n' | K | Viscosity (Cp) 170 | 100 | 40 |
|---|---|---|---|---|---|---|
| 2 | 79 | .562 | .2016 | 1018 | 1284 | 1919 |
| 19 | 247 | .503 | .1123 | 419 | 545 | 860 |
| 35 | 268 | .54 | .0815 | 368 | 470 | 716 |
| 52 | 271 | .566 | .0686 | 354 | 445 | 663 |
| 68 | 272 | .554 | .0702 | 340 | 431 | 649 |
| 85 | 272 | .553 | .0692 | 334 | 423 | 638 |
| 101 | 272 | .549 | .0691 | 326 | 415 | 627 |
| 118 | 272 | .543 | .0701 | 321 | 409 | 622 |
| 134 | 272 | .544 | .0681 | 314 | 400 | 607 |
| 151 | 272 | .538 | .0686 | 306 | 392 | 598 |
| 167 | 272 | .535 | .0684 | 301 | 385 | 590 |
| 183 | 272 | .53 | .0686 | 294 | 378 | 581 |
| 200 | 272 | .538 | .0656 | 293 | 374 | 572 |
| 216 | 272 | .529 | .0672 | 287 | 368 | 567 |
| 233 | 272 | .534 | .0652 | 285 | 365 | 560 |
| 239 | 272 | .53 | .066 | 283 | 363 | 559 |

Example 18

Rheological Measurements at 300° F. of Gelled Fluid System Comprising Diesel, Fatty Acid, Aluminum Salt of Carboxylic Acid and Aluminum Second Metal Source Compound A non-phosphate gelled fluid system was formed by combining the following components with "off road" No.2 diesel to achieve a viscous gel: tall oil fatty acid ("SYLFAT FA-1" from Arizona Chemical/"G-20" from BJ Services) at a concentration of 60 gallons per thousand gallons of diesel ("GPT"); aluminum 2-ethylhexanoate (aluminum octoate) powder at a concentration of 100 pounds per thousand gallons of diesel ("PPT"); and aluminum isopropoxide ("PETROSURF XL" from Rhone Poulenc) at a concentration of 4 GPT.

Rheological characteristics of the gel were evaluated at 300° F. using a "FANN 50C" rheometer, and are presented in Table 39.

TABLE 39

Example 18 Fann 50c Readings at 300° F.

| TIME (minutes) | TEMP (° F.) | n' | K | Viscosity (Cp) 170 | 100 | 40 |
|---|---|---|---|---|---|---|
| 2 | 79 | .543 | .1994 | 913 | 1164 | 1769 |
| 19 | 273 | .575 | .0427 | 231 | 289 | 426 |
| 38 | 296 | .843 | .0078 | 167 | 182 | 210 |
| 56 | 300 | 1 | .0033 | 159 | 159 | 159 |
| 75 | 300 | 1.063 | .0022 | 148 | 143 | 135 |
| 93 | 300 | 1.136 | .0015 | 145 | 134 | 119 |
| 109 | 300 | 1.164 | .0012 | 135 | 123 | 106 |
| 121 | 300 | 1.04 | .0019 | 115 | 113 | 109 |
| 138 | 300 | 1.232 | .0007 | 121 | 107 | 87 |
| 156 | 300 | 1.187 | .0008 | 110 | 100 | 84 |
| 173 | 300 | 1.31 | .0004 | 106 | 90 | 68 |
| 189 | 300 | 1.24 | .0005 | 88 | 78 | 62 |

Example 19

Gelled Organic Fluid Including Mixture of Diesel and Aromatic Organic Base Fluids A non-phosphate gelled fluid system was formed by combining the following components with diesel to achieve a viscous gel: xylene at a concentration of 60 GPT of total fluid volume; tall oil fatty acid at a concentration of 60 GPT of total fluid volume; and aluminum hydroxide.

These components were combined allowed to sit overnight. The next morning, the gelled organic fluid had a consistency of jello. When shear was applied to the sample using a Waring Blender, shear was only conveyed to a portion of the sample in the vicinity of the blender impeller, indicating the wide range of fluid rheological properties that may be achieved with the disclosed compositions and methods.

Example 20

Gellation Time for a Various Gelled Hydrocarbon Fluids

In each test of the following example, the indicated components were combined at 75° F. to form a gelled organic fluid. The following proportions were employed for each test: 1000 gpt hydrocarbon base, 20 ppt metal salt, 100 ppt fatty acid salt, 60 gpt fatty acid, and 4 gpt metal alkoxide. In each case, the indicated components were introduced to a Waring blender, and mixed to form a gelled organic fluid as follows. Mixing speed was established and maintained within 50 RPM of 4000 RPM using a Strobotach. For each test, the components were added to the mixer within a 5 second interval, & a stopwatch started. Mixing of the fluid was continued until vortex closure occurred, indicating gellation, and the stopwatch stopped. The elapsed time from addition of components until vortex closure was recorded as the gel time, and is listed for each test in Table 40.

TABLE 40

Non-Phosphate Hydrocarbon Gelling System
Vortex Closure Test at 75° F., (25° C.)

| Test No. | Hydrocarbon Base | Metal Salt | Metal Alkoxide | Fatty Acid Salt | Fatty Acid | Vortex Closure Time (minutes:Sec.) |
|---|---|---|---|---|---|---|
| 1 | Xylene | Aluminum Hydroxide | Petrosurf XL (aluminum isopropoxide) | Aluminum 2-Ethylhexanoate | SYLFAT FA-1 | 2:45 |
| 2 | Xylene | Aluminum Hydroxide | Petrosurf XL | Aluminum stearate | SYLFAT FA-1 | >15:00 |
| 3 | No. 2 Diesel | Aluminum Hydroxide | Petrosurf XL | Aluminum 2-Ethylhexanoate | SYLFAT FA-1 | 9:10 |
| 4 | 70:30 v/v, No. 2 diesel:xylene | Aluminum Hydroxide | Petrosurf XL | Aluminum 2-Ethylhexanoate | SYLFAT FA-1 | 3:25 |
| 5 | 50:50 v/v, No. 2 diesel:xylene | Aluminum Hydroxide | Petrosurf XL | Aluminum 2-Ethylhexanoate | SYLFAT FA-1 | 3:10 |
| 6 | Fracsol S | Aluminum Hydroxide | Petrosurf XL | Aluminum 2-Ethylhexanoate | SYLFAT FA-1 | 1:40 |
| 7 | Xysol | Aluminum Hydroxide | Petrosurf XL | Aluminum 2-Ethylhexanoate | SYLFAT FA-1 | 1:31 |

Example 21

Formulation of Solid Reaction Product and Measurement of Gellation Time Using Same I. EQUIPMENT NEEDED FOR EXAMPLE 21
Top Load Balance
Stopwatch
Waring® Blender-Tachometer Assembly
(Reference API 39)
Small Wide Mouth Waring® Blender
Thermometer
Strobe-Tachometer
Syringes (3 ml, 5 ml, 10 ml, 20 ml)
Weigh Boats II. CHEMICALS NEEDED FOR EXAMPLE 21
Off Road No.2 Diesel
Carboxylic Acid
Carboxylic Acid Salt
Metal Salt
Metal Alkoxide Test Procedure Using Reaction Product System Six (6) grams aluminum 2-ethyl hexanoate, 27.3 grams (15 milliliters) SYLFAT FA-1, 1.3 grams aluminum hydroxide, 1.82 grams Petrosurf XL, and 12.9 grams (15 milliliters) xylene were measure into an 8 ounce wide mouth glass jar. This mixture was blended with a six blade stirrer for 2 minutes at high speed. The sample was then transferred to a preweighed laboratory petri dish, placed in a laboratory hood, and allowed to react under static conditions at room temperature for 24 hours. At the end of this period the weight of the final composition was weighed. Volatile xylene lost via evaporation was calculated. The final gelatinous sample was cut into small pieces. A small wide mouth Waring® Blender jar was tared on a top load balance. Two hundred fourteen grams (214) grams of off-road diesel was measure into this vessel. The jar was placed on the blend assembly and blended a 400 rpm.

The reaction product was delivered to the mixing fluid to deliver the following concentration of reaction product plus excess xylene remaining in the material:

| Component | Concentration per Liter |
|---|---|
| Aluminum 2-ethyl hexanoate | 12.0 grams |
| Petrosurf XL | 4.0 milliliters |
| Aluminum hydroxide | 4.8 grams |
| SYLFAT FA-1 | 7.2 grams |
| Xylene | Excess |

The reaction product was disperse into the off-road diesel while mixing at 4000 rpm. A stop watch was started immediately. The mixing fluid was monitored for vortex closure. The fluid vortex closure was then observed and recorded as 1 minute, 15 seconds. The fluid temperature was also measured as 75° F. (25° C.).

The results of Examples 20 and 21 indicate how the disclosed non-phosphate gelled organic fluids may be tailored to meet suitable gellation time requirements. For example, shorter gellation times may be desirable for use in treating shallow wells and/or where a well treatment fluid will encounter short residence time while being displaced through tubulars. Longer gellation times may be desirable for deeper wells and/or longer tubular residence time.

Example 22

Exemplary Formulations and Potential Uses Therefor

Tables 41–44 give exemplary embodiments of fluids that may be employed in the formulation of the disclosed non-phosphate organic fluids. With benefit of this disclosure, those of skill in the art will understand that these combinations of components, and the applications described, are not exclusive, and are exemplary only. In these tables the following designations are employed:
Hydrocarbon 1=Crude
Hydrocarbon 2=Condensate
Hydrocarbon 3=Off-Road No.2 Diesel
Hydrocarbon 4=Reformate
Hydrocarbon 5=Kerosene
Hydrocarbon 6=Xylene
Hydrocarbon 7=Fracsol®

TABLE 41

Some Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Compound Types/Classes | | | | | | |
| Hydrocarbon 1 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 2 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 3 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 4 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 5 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 6 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process App. |
| Hydrocarbon 7 | Carboxylic acid | Carboxylic acid metal salt | Metal Alkoxide | Metal Salt | Benzene, Xylene, Toluene, Napthalene | Oil & Gas Well Stimulation or Completion(s), Pipeline & Chemical Process A |
| Specific Compounds | | | | | | |
| Hydrocarbon 3 | Palmitic acid | Al 2-ethyl hexanoate | Al ispropoxide | Al Sulfate | Xylene | Oil & Gas Well Stimulation or Completion(s), Pipeline & Chemical Process A |
| Hydrocarbon 3 | Palmitic acid | Al Stearate | Al ispropoxide | Al Sulfate | Xylene | Oil & Gas Well Stimulation or Completion(s), Pipeline & Chemical Process A |
| Hydrocarbon 3 | Palmitic acid | Al Oleiate | Al ispropoxide | Al Sulfate | Xylene | Oil & Gas Well Stimulation or Completion(s), Pipeline & Chemical Process A |
| Hydrocarbon 3 | Palmitic acid | Al Palmate | Al ispropoxide | Al Sulfate | Xylene | Oil & Gas Well Stimulation or Completion(s), Pipeline & Chemical Process A |
| Hydrocarbon 3 | Palmitic acid | Al Mealiate | Al ispropoxide | Al Sulfate | Xylene | Oil & Gas Well Stimulation or Completion(s), Pipeline & Chemical Process A |
| Hydrocarbon 3 | Palmitic acid | Al Benzoate | Al ispropoxide | Al Sulfate | Xylene | Oil & Gas Well Stimulation or Completion(s), Pipeline & Chemical Process A |
| Hydrocarbon 3 | Palmitic acid | Al Coco Fatty | Al ispropoxide | Al Sulfate | Xylene | Oil & Gas Well Stimulation or Completion(s), Pipeline & Chemical Process A |

TABLE 42

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Compound Types/Classes | | | | | | |
| Hydrocarbon 1 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |

TABLE 42-continued

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Hydrocarbon 2 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |
| Hydrocarbon 3 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |
| Hydrocarbon 4 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |
| Hydrocarbon 5 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |
| Hydrocarbon 6 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process App. |
| Hydrocarbon 7 | Tall oil fatty acid | Carboxylic acid metal salt | Metal Alkoxide | Metal Hydroxide | Benzene, Xylene, Toluene, Napthalene | Oil & Gas Well Stimulation or Completion(s), Pipeline & Chemical Process A |
| Specific Compounds | | | | | | |
| Hydrocarbon 3 | SYLFAT FA-1 | Al 2-ethyl hexanoate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Stearate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Oleate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Palmate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Mealiate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Benzoate | Al isopropoxide | Aluminum Hydroxide | Xylene | Oil & Gas Well Stimulation or Completion(s), Pipeline & Chemical Process A |
| Hydrocarbon 3 | SYLFAT FA-1 | Al Coco Fatty | Al isopropoxide | Aluminum Hydroxide | Xylene | Oil & Gas Well Stimulation or Completion(s), Pipeline & Chemical Process A |

TABLE 43

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Compound Types/Classes | | | | | | |
| Hydrocarbon 1 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 2 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 3 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |

TABLE 43-continued

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Hydrocarbon 4 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 5 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 6 | Fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 7 | Fatty acid | Carboxylic acid metal salt | Metal Alkoxide | None | Benzene, Xylene, Toluene, Napthalene | Oil & Gas Well Stimulation or Completion(s), Pipeline & Chemical Process A |
| Specific Compounds | | | | | | |
| Hydrocarbon 3 | Oleic acid | Al 2-ethyl hexanoate | Al isopropoxide | None | Xylene | Oil & Gas Well Stimulation or Completion(s), Pipeline & Chemical Process A |
| Hydrocarbon 3 | Oleic acid | Al Stearate | Al isopropoxide | None | Xylene | Oil & Gas Well Stimulation or Completion(s), Pipeline & Chemical Process A |
| Hydrocarbon 3 | Oleic acid | Al Oleiate | Al isopropoxide | None | Xylene | Oil & Gas Well Stimulation or Completion(s), Pipeline & Chemical Process A |
| Hydrocarbon 3 | Oleic acid | Al Palmate | Al isopropoxide | None | Xylene | Oil & Gas Well Stimulation or Completion(s), Pipeline & Chemical Process A |
| Hydrocarbon 3 | Oleic acid | Al Mealiate | Al isopropoxide | None | Xylene | Oil & Gas Well Stimulation or Completion(s), Pipeline & Chemical Process A |
| Hydrocarbon 3 | Oleic acid | Al Benzoate | Al isopropoxide | None | Xylene | Oil & Gas Well Stimulation or Completion(s), Pipeline & Chemical Process A |
| Hydrocarbon 3 | Oleic acid | Al Coco Fatty | Al isopropoxide | None | Xylene | Oil & Gas Well Stimulation or Completion(s), Pipeline & Chemical Process A |

TABLE 44

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Compound Types/Classes | | | | | | |
| Hydrocarbon 1 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 2 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 3 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 4 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |

TABLE 44-continued

Further Exemplary Embodiments of Gelled Organic Fluids

| Organic Fluid | Carb. Acid | First Metal Source | Second Metal Source | Additional Metal Source | Other Materials | Exemplary Characteristics and/or Applications for this Gelled Fluid |
|---|---|---|---|---|---|---|
| Hydrocarbon 5 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 6 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process App. |
| Hydrocarbon 7 | Tall oil fatty acid | Carboxylic acid metal salt | Metal Alkoxide | None | Benzene, Xylene, Toluene, Napthalene | Oil & Gas Well Stimulation or Completion(s), Pipeline & Chemical Process A |
| Specific Compounds | | | | | | |
| Off-Road No. 2 Diesel | SYLFAT FA-1 | Al 2-ethyl hexanoate | Al ispropoxide | None | Xylene | Oil & Gas Well Stimulation or Completion(s), Pipeline & Chemical Process A |
| Off-Road No. 2 Diesel | SYLFAT FA-1 | Al Stearate | Al ispropoxide | None | Xylene | Oil & Gas Well Stimulation or Completion(s), Pipeline & Chemical Process A |
| Off-Road No. 2 Diesel | SYLFAT FA-1 | Al Oleiate | Al ispropoxide | None | Xylene | Oil & Gas Well Stimulation or Completion(s), Pipeline & Chemical Process A |
| Off-Road No. 2 Diesel | SYLFAT FA-1 | Al Palmate | Al ispropoxide | None | Xylene | Oil & Gas Well Stimulation or Completion(s), Pipeline & Chemical Process A |
| Hydrocarbon 3 | SYLFAT FA-1 | Al Mealiate | Al ispropoxide | None | Xylene | Oil & Gas Well Stimulation or Completion(s), Pipeline & Chemical Process A |
| Hydrocarbon 3 | SYLFAT FA-1 | Al Benzoate | Al ispropoxide | None | Xylene | Oil & Gas Well Stimulation or Completion(s), Pipeline & Chemical Process A |
| Hydrocarbon 3 | SYLFAT FA-1 | Al Coco Fatty | Al ispropoxide | None | Xylene | Oil & Gas Well Stimulation or Completion(s), Pipeline & Chemical Process A |

Examples 23–37

In the following examples, viscosity measurements were made on gelled organic fluids containing the indicated fluids, and at the indicated temperatures, using the same procedure as employed in Examples 16–18.

Example 23

TABLE 45

Temperature 200° F.
Additives - Off Road Diesel, 60 gpt Oleic Acid-Veg., 10 ppt Aluminum Oxide, 100 ppt Aluminum Octoate, 4 gpt Petrosurf XL
Comments: R1B5HC/Fann #1SC (HC BS)

| TIME | TEMP | | | Viscosity (Cp) | | |
|---|---|---|---|---|---|---|
| (minutes) | (° F.) | n' | K | 40 | 100 | 170 |
| 2.10 | 84 | 0.2976 | 0.43502 | 1561 | 820 | 565 |
| 36.10 | 190 | 0.3797 | 0.14633 | 711 | 403 | 290 |
| 70.10 | 194 | 0.3712 | 0.13231 | 623 | 350 | 251 |
| 104.10 | 194 | 0.3603 | 0.13229 | 598 | 333 | 237 |
| 138.10 | 194 | 0.3519 | 0.13347 | 585 | 323 | 229 |
| 172.10 | 194 | 0.3456 | 0.13485 | 578 | 317 | 224 |
| 206.10 | 194 | 0.3417 | 0.13560 | 573 | 313 | 221 |
| 240.10 | 194 | 0.3378 | 0.13742 | 572 | 312 | 219 |
| 274.10 | 194 | 0.3395 | 0.13587 | 569 | 311 | 219 |

Example 24

TABLE 46

Temperature 150° F.
Additives - Off Road Diesel, 10 ppt Aluminum Oxide, 60 gpt Oleic Acid-Veg., 100 ppt Aluminum Oxide, 4 gpt Petrosurf XL
Comments: R1B5HC/Fann #1 (HC BS)

| TIME | TEMP | | | Viscosity (Cp) | | |
|---|---|---|---|---|---|---|
| (minutes) | (° F.) | n' | K | 40 | 100 | 170 |
| 2.10 | 87 | 0.4006 | 0.27556 | 1446 | 835 | 607 |
| 36.10 | 144 | 0.5912 | 0.08747 | 927 | 637 | 513 |
| 70.10 | 146 | 0.5456 | 0.09378 | 840 | 554 | 435 |
| 104.10 | 146 | 0.5105 | 0.09929 | 781 | 499 | 385 |
| 138.10 | 145 | 0.4862 | 0.10118 | 728 | 455 | 346 |
| 172.10 | 145 | 0.4716 | 0.10086 | 688 | 424 | 320 |
| 206.10 | 146 | 0.4684 | 0.09707 | 654 | 402 | 303 |
| 240.10 | 146 | 0.4512 | 0.10031 | 634 | 384 | 287 |
| 274.10 | 146 | 0.4415 | 0.10094 | 616 | 369 | 274 |

Example 25

TABLE 47

Temperature 200° F.
Additives - Off Road Diesel, 500 ppt, 95% Palmitic Acid-Veg.,
10 ppt Aluminum Oxide, 100 ppt Aluminum Octoate,
4 gpt Petrosurf XL
Comments: R1B5HC/Fann #1SC (HC BS)

| TIME (minutes) | TEMP (° F.) | n' | K | Viscosity (Cp) 40 | 100 | 170 |
|---|---|---|---|---|---|---|
| 2.10 | 85 | 0.3939 | 0.14086 | 721 | 414 | 300 |
| 36.10 | 190 | 0.3227 | 0.21201 | 835 | 449 | 313 |
| 70.10 | 194 | 0.3318 | 0.19210 | 782 | 424 | 297 |
| 104.10 | 194 | 0.3282 | 0.19200 | 771 | 417 | 292 |
| 138.10 | 194 | 0.3534 | 0.17168 | 757 | 418 | 297 |
| 172.10 | 194 | 0.3729 | 0.15239 | 722 | 406 | 291 |
| 206.10 | 194 | 0.3689 | 0.15136 | 706 | 396 | 283 |
| 240.10 | 194 | 0.3734 | 0.14394 | 683 | 385 | 276 |
| 274.10 | 194 | 0.3709 | 0.14257 | 670 | 377 | 270 |
| 308.10 | 194 | 0.3665 | 0.14249 | 659 | 369 | 264 |
| 342.10 | 194 | 0.3645 | 0.14135 | 649 | 363 | 259 |
| 376.10 | 194 | 0.3635 | 0.13990 | 640 | 357 | 255 |
| 410.10 | 194 | 0.3617 | 0.13924 | 633 | 353 | 251 |
| 444.10 | 194 | 0.3595 | 0.13892 | 626 | 348 | 248 |
| 478.10 | 194 | 0.3846 | 0.11714 | 579 | 330 | 238 |
| 512.10 | 194 | 0.3873 | 0.11348 | 567 | 323 | 234 |
| 546.10 | 194 | 0.3854 | 0.11343 | 563 | 320 | 231 |
| 580.10 | 194 | 0.3855 | 0.11220 | 557 | 317 | 229 |
| 614.10 | 194 | 0.3859 | 0.11129 | 553 | 315 | 227 |
| 648.10 | 194 | 0.3814 | 0.11234 | 549 | 312 | 224 |
| 682.10 | 194 | 0.3823 | 0.11112 | 545 | 309 | 223 |
| 716.10 | 194 | 0.3815 | 0.11088 | 542 | 308 | 222 |
| 750.10 | 194 | 0.3791 | 0.11129 | 539 | 305 | 220 |
| 784.10 | 194 | 0.3790 | 0.11086 | 537 | 304 | 219 |
| 818.10 | 194 | 0.3790 | 0.11007 | 533 | 302 | 217 |
| 852.10 | 194 | 0.3775 | 0.11058 | 533 | 301 | 216 |
| 886.10 | 194 | 0.3770 | 0.11027 | 530 | 300 | 215 |
| 920.10 | 194 | 0.3739 | 0.11131 | 529 | 298 | 214 |
| 954.10 | 194 | 0.3719 | 0.11215 | 529 | 298 | 213 |
| 988.10 | 194 | 0.3726 | 0.11144 | 527 | 297 | 213 |
| 1022.10 | 194 | 0.3707 | 0.11202 | 526 | 296 | 212 |
| 1056.10 | 194 | 0.3717 | 0.11115 | 524 | 295 | 211 |
| 1090.10 | 194 | 0.3685 | 0.11248 | 524 | 294 | 210 |
| 1124.10 | 194 | 0.3682 | 0.11239 | 523 | 293 | 210 |
| 1158.10 | 193 | 0.3682 | 0.11229 | 523 | 293 | 210 |
| 1192.10 | 194 | 0.3660 | 0.11245 | 519 | 290 | 207 |
| 1226.10 | 194 | 0.3661 | 0.11267 | 520 | 291 | 208 |
| 1260.10 | 194 | 0.3638 | 0.11376 | 521 | 291 | 208 |

Example 26

TABLE 48

Temperature 150° F.
Additives - Off Road Diesel, 10 ppt Aluminum Oxide
95% Palmitic Acid-Veg., 100 ppt Aluminum Oxide, 4 gpt Petrosurf XL
Comments: R1B5HC/Fann #1 (HC BS)

| TIME (minutes) | TEMP (° F.) | n' | K | Viscosity (Cp) 40 | 100 | 170 |
|---|---|---|---|---|---|---|
| 2.10 | 88 | 0.4587 | 0.10127 | 658 | 401 | 301 |
| 36.10 | 145 | 0.3384 | 0.21751 | 907 | 495 | 348 |
| 70.30 | 146 | 0.3370 | 0.20984 | 871 | 474 | 334 |
| 104.10 | 146 | 0.3336 | 0.20497 | 840 | 456 | 320 |
| 138.10 | 145 | 0.3291 | 0.20228 | 815 | 441 | 309 |
| 172.10 | 146 | 0.3249 | 0.19992 | 793 | 427 | 299 |
| 206.10 | 145 | 0.3214 | 0.19833 | 777 | 417 | 291 |
| 240.10 | 145 | 0.3138 | 0.20053 | 764 | 407 | 283 |
| 274.10 | 145 | 0.3120 | 0.19835 | 751 | 400 | 277 |
| 308.10 | 146 | 0.3144 | 0.19303 | 737 | 393 | 273 |
| 342.10 | 145 | 0.3138 | 0.19063 | 726 | 387 | 269 |
| 376.10 | 146 | 0.3072 | 0.19277 | 717 | 380 | 263 |
| 410.10 | 146 | 0.3083 | 0.18941 | 707 | 375 | 260 |

TABLE 48-continued

Temperature 150° F.
Additives - Off Road Diesel, 10 ppt Aluminum Oxide
95% Palmitic Acid-Veg., 100 ppt Aluminum Oxide, 4 gpt Petrosurf XL
Comments: R1B5HC/Fann #1 (HC BS)

| TIME (minutes) | TEMP (° F.) | n' | K | Viscosity (Cp) 40 | 100 | 170 |
|---|---|---|---|---|---|---|
| 444.10 | 145 | 0.3068 | 0.18910 | 702 | 372 | 257 |
| 478.10 | 145 | 0.3092 | 0.18535 | 694 | 369 | 225 |
| 512.10 | 146 | 0.3074 | 0.18433 | 686 | 364 | 252 |
| 546.10 | 145 | 0.3068 | 0.18348 | 681 | 361 | 250 |
| 580.10 | 146 | 0.3066 | 0.18186 | 675 | 357 | 247 |
| 614.10 | 146 | 0.3064 | 0.18121 | 672 | 356 | 246 |
| 648.10 | 146 | 0.3041 | 0.18131 | 666 | 352 | 243 |
| 682.10 | 146 | 0.3086 | 0.17694 | 661 | 351 | 243 |
| 716.10 | 145 | 0.3007 | 0.18222 | 661 | 348 | 240 |
| 750.10 | 146 | 0.3076 | 0.17562 | 654 | 347 | 240 |
| 784.10 | 146 | 0.3045 | 0.17705 | 652 | 345 | 238 |
| 818.10 | 145 | 0.3052 | 0.17593 | 649 | 343 | 238 |
| 852.10 | 146 | 0.3035 | 0.17636 | 647 | 342 | 236 |
| 886.10 | 145 | 0.3029 | 0.17599 | 644 | 340 | 235 |
| 920.10 | 146 | 0.3001 | 0.17718 | 642 | 338 | 233 |
| 954.10 | 145 | 0.3066 | 0.17229 | 639 | 339 | 234 |
| 988.10 | 146 | 0.3008 | 0.17555 | 637 | 336 | 232 |
| 1022.10 | 145 | 0.2992 | 0.17635 | 637 | 335 | 231 |
| 1056.10 | 146 | 0.3037 | 0.17248 | 633 | 334 | 231 |
| 1090.10 | 145 | 0.3009 | 0.17401 | 632 | 333 | 230 |
| 1124.10 | 145 | 0.3042 | 0.17083 | 628 | 332 | 229 |
| 1158.10 | 145 | 0.3026 | 0.17163 | 627 | 331 | 229 |
| 1192.10 | 146 | 0.3065 | 0.16819 | 624 | 330 | 229 |
| 1226.10 | 146 | 0.3046 | 0.16912 | 623 | 329 | 228 |
| 1260.10 | 146 | 0.3073 | 0.16690 | 621 | 329 | 228 |

Example 27

TABLE 49

Temperature 200° F.
Additives - Off Road Diesel, 500 ppt, Stearic Acid-Veg.,
10 ppt Aluminum Oxide, 100 ppt Aluminum Octoate, 4 gpt Petrosurf XL
Comments: R1B5HC/Fann #1SC (HC BS)

| TIME (minutes) | TEMP (° F.) | n' | K | Viscosity (Cp) 40 | 100 | 170 |
|---|---|---|---|---|---|---|
| 2.10 | 85 | 0.3911 | 0.10591 | 537 | 307 | 222 |
| 36.10 | 195 | 0.3158 | 0.16654 | 639 | 341 | 237 |
| 70.10 | 199 | 0.3364 | 0.16168 | 669 | 364 | 256 |
| 104.10 | 199 | 0.3435 | 0.16151 | 686 | 376 | 265 |
| 138.10 | 199 | 0.3418 | 0.16521 | 698 | 382 | 269 |
| 172.10 | 199 | 0.3417 | 0.16674 | 704 | 385 | 272 |
| 206.10 | 199 | 0.3403 | 0.16770 | 704 | 385 | 271 |
| 240.10 | 199 | 0.3436 | 0.16456 | 700 | 383 | 271 |
| 274.10 | 199 | 0.3418 | 0.16469 | 696 | 381 | 268 |
| 308.10 | 199 | 0.3408 | 0.16420 | 691 | 378 | 266 |
| 342.10 | 199 | 0.3418 | 0.16233 | 686 | 375 | 265 |
| 376.10 | 199 | 0.3406 | 0.16213 | 682 | 373 | 263 |
| 410.10 | 199 | 0.3382 | 0.16294 | 679 | 370 | 261 |
| 444.10 | 199 | 0.3402 | 0.16041 | 674 | 368 | 259 |
| 478.10 | 199 | 0.3405 | 0.15955 | 671 | 366 | 258 |
| 512.10 | 199 | 0.3405 | 0.15882 | 668 | 365 | 257 |
| 546.10 | 199 | 0.3418 | 0.15713 | 664 | 363 | 256 |
| 580.10 | 199 | 0.3396 | 0.15789 | 661 | 361 | 254 |
| 614.10 | 199 | 0.3410 | 0.15629 | 658 | 360 | 254 |
| 648.10 | 199 | 0.3414 | 0.15538 | 655 | 358 | 253 |
| 682.10 | 199 | 0.3409 | 0.15509 | 653 | 357 | 252 |
| 716.10 | 199 | 0.3411 | 0.15416 | 649 | 355 | 250 |
| 750.10 | 199 | 0.3398 | 0.15427 | 647 | 353 | 249 |

TABLE 49-continued

Temperature 200° F.
Additives - Off Road Diesel, 500 ppt, Stearic Acid-Veg.,
10 ppt Aluminum Oxide, 100 ppt Aluminum Octoate, 4 gpt Petrosurf XL
Comments: R1B5HC/Fann #1SC (HC BS)

| TIME (minutes) | TEMP (° F.) | n' | K | Viscosity (Cp) 40 | 100 | 170 |
|---|---|---|---|---|---|---|
| 784.10 | 199 | 0.3418 | 0.15249 | 644 | 352 | 248 |
| 818.10 | 199 | 0.3414 | 0.15218 | 642 | 351 | 247 |
| 852.10 | 199 | 0.3387 | 0.15312 | 639 | 349 | 246 |
| 886.10 | 199 | 0.3399 | 0.15182 | 637 | 348 | 245 |
| 920.10 | 199 | 0.3416 | 0.14993 | 633 | 346 | 244 |
| 954.10 | 199 | 0.3400 | 0.15042 | 631 | 345 | 243 |
| 988.10 | 199 | 0.3430 | 0.14782 | 627 | 343 | 242 |
| 1022.10 | 199 | 0.3415 | 0.14800 | 624 | 342 | 241 |
| 1056.10 | 199 | 0.3396 | 0.14849 | 622 | 340 | 239 |

Example 28

TABLE 50

Temperature 150° F.
Additives - Off Road Diesel, 10 ppt Aluminum Oxide, Stearic
Acid-Veg., 10 ppt Aluminum Oxide, 4 gpt Petrosurf XL
Comments: R1B5HC/Fann #1 (HC BS)

| TIME (minutes) | TEMP (° F.) | n' | K | Viscosity (Cp) 40 | 100 | 170 |
|---|---|---|---|---|---|---|
| 2.10 | 88 | 0.4451 | 0.07523 | 465 | 280 | 208 |
| 36.10 | 150 | 0.3172 | 0.15075 | 581 | 311 | 217 |
| 70.10 | 151 | 0.3005 | 0.16801 | 609 | 321 | 221 |
| 104.10 | 151 | 0.3024 | 0.17080 | 624 | 329 | 227 |
| 138.10 | 151 | 0.3091 | 0.16884 | 632 | 336 | 233 |
| 172.10 | 151 | 0.3091 | 0.17029 | 637 | 338 | 235 |
| 206.10 | 151 | 0.3103 | 0.17064 | 642 | 341 | 237 |
| 240.10 | 151 | 0.3086 | 0.17273 | 645 | 343 | 237 |
| 274.10 | 151 | 0.3095 | 0.17241 | 646 | 343 | 238 |
| 308.10 | 151 | 0.3106 | 0.17217 | 648 | 345 | 239 |
| 342.10 | 151 | 0.3095 | 0.17352 | 651 | 346 | 240 |
| 376.10 | 151 | 0.3156 | 0.16940 | 650 | 347 | 241 |
| 410.10 | 151 | 0.3124 | 0.17164 | 650 | 346 | 241 |
| 444.10 | 151 | 0.3137 | 0.17066 | 650 | 346 | 241 |
| 478.10 | 151 | 0.3143 | 0.16972 | 648 | 346 | 240 |
| 512.10 | 151 | 0.3160 | 0.16847 | 647 | 346 | 240 |
| 546.10 | 151 | 0.3134 | 0.17054 | 649 | 346 | 240 |
| 580.10 | 151 | 0.3138 | 0.17030 | 649 | 346 | 240 |
| 614.10 | 151 | 0.3219 | 0.16466 | 646 | 347 | 242 |
| 648.10 | 151 | 0.3177 | 0.16747 | 647 | 346 | 241 |
| 682.10 | 151 | 0.3144 | 0.16972 | 648 | 346 | 240 |
| 716.10 | 151 | 0.3163 | 0.16840 | 647 | 346 | 241 |
| 750.10 | 151 | 0.3186 | 0.16666 | 646 | 346 | 241 |
| 784.10 | 151 | 0.3183 | 0.166511 | 645 | 345 | 240 |
| 818.10 | 151 | 0.3151 | 0.16877 | 646 | 345 | 240 |
| 852.10 | 151 | 0.3158 | 0.16809 | 645 | 345 | 240 |
| 886.10 | 151 | 0.3140 | 0.16952 | 646 | 345 | 239 |
| 920.10 | 151 | 0.3165 | 0.16725 | 643 | 344 | 239 |
| 954.10 | 151 | 0.3127 | 0.17026 | 646 | 344 | 239 |
| 988.10 | 151 | 0.3136 | 0.16917 | 644 | 343 | 239 |
| 1022.10 | 151 | 0.3163 | 0.16718 | 643 | 344 | 239 |
| 1056.10 | 151 | 0.3114 | 0.17062 | 644 | 343 | 238 |

Example 29

TABLE 51

Temperature 200° F.
Additives - Xylene, 10 ppt Aluminum Oxide,
100 ppt Aluminum 2-Ethylhexoate, 60 gpt "SYLFAT FA-1 Sp"

| TIME (minutes) | TEMP (° F.) | n' | K | Viscosity (Cp) 40 | 100 | 170 |
|---|---|---|---|---|---|---|
| 2.10 | 80 | 0.1958 | 0.24115 | 594 | 284 | 186 |
| 36.10 | 176 | 0.3178 | 0.24717 | 955 | 511 | 365 |
| 70.10 | 192 | 0.2591 | 0.28117 | 875 | 444 | 300 |
| 104.10 | 194 | 0.2557 | 0.28448 | 875 | 442 | 298 |
| 138.10 | 194 | 0.2521 | 0.28373 | 861 | 434 | 292 |
| 172.10 | 194 | 0.2501 | 0.28331 | 853 | 429 | 288 |
| 206.10 | 194 | 0.2492 | 0.28464 | 854 | 429 | 288 |
| 240.10 | 194 | 0.2498 | 0.28534 | 858 | 432 | 290 |
| 274.10 | 194 | 0.2511 | 0.28519 | 862 | 434 | 292 |
| 308.10 | 194 | 0.2497 | 0.28846 | 867 | 436 | 293 |
| 342.10 | 194 | 0.2479 | 0.29214 | 873 | 438 | 294 |
| 376.10 | 194 | 0.2483 | 0.29349 | 878 | 441 | 296 |
| 410.10 | 194 | 0.2481 | 0.29597 | 885 | 444 | 298 |
| 444.10 | 194 | 0.2481 | 0.29724 | 889 | 446 | 299 |
| 478.10 | 194 | 0.2482 | 0.29922 | 895 | 449 | 302 |
| 512.10 | 194 | 0.2511 | 0.29684 | 897 | 452 | 304 |
| 546.10 | 194 | 0.2530 | 0.29602 | 901 | 454 | 306 |
| 580.10 | 194 | 0.2537 | 0.29600 | 903 | 456 | 307 |
| 614.10 | 194 | 0.2559 | 0.29434 | 906 | 458 | 309 |
| 648.10 | 194 | 0.2572 | 0.29317 | 906 | 459 | 309 |
| 682.10 | 194 | 0.2592 | 0.29128 | 907 | 460 | 311 |
| 716.10 | 194 | 0.2600 | 0.29079 | 908 | 461 | 311 |
| 750.10 | 194 | 0.2566 | 0.29478 | 909 | 460 | 310 |
| 784.10 | 194 | 0.2373 | 0.32290 | 928 | 461 | 308 |
| 818.10 | 194 | 0.2597 | 0.29804 | 930 | 472 | 319 |
| 852.10 | 194 | 0.2606 | 0.29636 | 928 | 471 | 318 |
| 886.10 | 194 | 0.2602 | 0.29465 | 921 | 468 | 316 |

Example 30

TABLE 52

Temperature 150° F.
Additives - Xylene, 10 ppt Aluminum Oxide,
100 ppt 2-Ethylhexoate, 60 gpt SYLFAT FA-1 Sp, 4 gpt Petrosurf XL

| TIME (minutes) | TEMP (° F.) | n' | K | Viscosity (Cp) 40 | 100 | 170 |
|---|---|---|---|---|---|---|
| 2.10 | 83 | 0.2675 | 0.13145 | 422 | 216 | 146 |
| 36.10 | 131 | 0.4678 | 0.15060 | 1012 | 622 | 469 |
| 70.10 | 143 | 0.4451 | 0.15348 | 949 | 571 | 425 |
| 104.10 | 145 | 0.4170 | 0.17057 | 951 | 557 | 409 |
| 138.10 | 145 | 0.4035 | 0.18060 | 958 | 554 | 404 |
| 172.10 | 145 | 0.4158 | 0.17407 | 966 | 566 | 415 |
| 206.10 | 145 | 0.4246 | 0.16893 | 968 | 572 | 421 |
| 240.10 | 145 | 0.4270 | 0.16769 | 970 | 574 | 423 |
| 274.10 | 145 | 0.4050 | 0.18235 | 972 | 564 | 411 |
| 308.10 | 145 | 0.4178 | 0.17472 | 977 | 573 | 421 |
| 342.10 | 145 | 0.4249 | 0.16960 | 973 | 575 | 423 |
| 376.10 | 145 | 0.4182 | 0.17341 | 971 | 570 | 418 |
| 410.10 | 145 | 0.4154 | 0.17638 | 977 | 572 | 419 |
| 444.10 | 145 | 0.4197 | 0.17418 | 981 | 576 | 423 |
| 478.10 | 145 | 0.4161 | 0.17805 | 989 | 579 | 425 |
| 512.10 | 145 | 0.4213 | 0.17532 | 993 | 584 | 430 |
| 546.10 | 145 | 0.4191 | 0.17799 | 1000 | 587 | 431 |
| 580.10 | 145 | 0.4131 | 0.18396 | 1011 | 590 | 432 |
| 614.10 | 145 | 0.4184 | 0.18185 | 1019 | 598 | 439 |
| 648.10 | 145 | 0.4227 | 0.17991 | 1024 | 603 | 444 |
| 682.10 | 145 | 0.4253 | 0.17927 | 1030 | 609 | 449 |
| 716.10 | 145 | 0.4235 | 0.18118 | 1034 | 610 | 449 |
| 750.10 | 145 | 0.4178 | 0.18693 | 1045 | 613 | 450 |
| 784.10 | 145 | 0.4231 | 0.18420 | 1050 | 619 | 456 |
| 818.10 | 145 | 0.4129 | 0.19316 | 1060 | 619 | 453 |
| 852.10 | 145 | 0.4168 | 0.19114 | 1065 | 624 | 458 |

Example 31

TABLE 53

Temperature 200° F.
Additives - Kerosene, 60 gpt Tall Oil SYLFAT FA-1,
100 ppt Aluminum Octoate, 10 ppt Aluminum Hydroxide,
4 gpt Petrosurf XL
Comments: R1B5HC/Fann #1

| TIME (minutes) | TEMP (° F.) | n' | K | Viscosity (Cp) 40 | 100 | 170 |
|---|---|---|---|---|---|---|
| 2.10 | 89 | 0.3213 | 0.08951 | 351 | 188 | 131 |
| 36.10 | 197 | 0.4792 | 0.07746 | 543 | 337 | 256 |
| 70.10 | 198 | 0.4849 | 0.06580 | 471 | 294 | 224 |
| 104.10 | 198 | 0.4847 | 0.06215 | 445 | 277 | 211 |
| 138.10 | 199 | 0.4900 | 0.05830 | 425 | 267 | 203 |
| 172.10 | 199 | 0.4850 | 0.05758 | 412 | 257 | 196 |
| 206.10 | 199 | 0.4868 | 0.05557 | 401 | 250 | 191 |
| 240.10 | 199 | 0.4920 | 0.05326 | 391 | 246 | 188 |
| 274.10 | 199 | 0.4281 | 0.07672 | 445 | 264 | 195 |
| 308.10 | 200 | 0.4310 | 0.07430 | 436 | 259 | 191 |
| 342.10 | 200 | 0.4338 | 0.07218 | 428 | 255 | 189 |
| 376.10 | 200 | 0.4316 | 0.07175 | 422 | 251 | 185 |
| 410.10 | 199 | 0.4350 | 0.07025 | 418 | 249 | 185 |
| 444.10 | 199 | 0.4373 | 0.06914 | 415 | 248 | 184 |
| 478.10 | 198 | 0.4376 | 0.06912 | 416 | 248 | 184 |
| 512.10 | 198 | 0.4392 | 0.06873 | 416 | 249 | 185 |
| 546.10 | 198 | 0.4387 | 0.06878 | 415 | 248 | 184 |
| 580.10 | 197 | 0.4419 | 0.06769 | 414 | 248 | 184 |
| 614.10 | 197 | 0.4434 | 0.06678 | 410 | 246 | 183 |
| 648.10 | 198 | 0.4441 | 0.06636 | 409 | 246 | 183 |
| 682.10 | 198 | 0.4476 | 0.06515 | 407 | 245 | 183 |
| 716.10 | 198 | 0.4443 | 0.06581 | 406 | 244 | 182 |
| 750.10 | 198 | 0.4521 | 0.06361 | 404 | 244 | 183 |
| 784.10 | 198 | 0.4538 | 0.06286 | 401 | 243 | 182 |
| 818.10 | 198 | 0.4548 | 0.06237 | 400 | 243 | 182 |
| 852.10 | 198 | 0.4599 | 0.06084 | 397 | 242 | 182 |
| 886.10 | 198 | 0.4648 | 0.05910 | 393 | 241 | 181 |
| 920.10 | 198 | 0.4606 | 0.05990 | 392 | 239 | 180 |
| 954.10 | 198 | 0.4623 | 0.05932 | 391 | 239 | 179 |
| 988.10 | 198 | 0.4659 | 0.05807 | 388 | 238 | 179 |
| 1022.10 | 198 | 0.4716 | 0.05659 | 386 | 238 | 180 |
| 1056.10 | 198 | 0.4770 | 0.05507 | 383 | 237 | 180 |
| 1090.10 | 198 | 0.4752 | 0.05528 | 382 | 236 | 179 |
| 1124.10 | 198 | 0.4743 | 0.05518 | 380 | 235 | 178 |
| 1158.10 | 198 | 0.4731 | 0.05522 | 379 | 234 | 177 |
| 1192.10 | 198 | 0.4801 | 0.05333 | 375 | 233 | 177 |
| 1226.10 | 199 | 0.4843 | 0.05238 | 374 | 233 | 177 |
| 1260.10 | 198 | 0.4855 | 0.05194 | 373 | 233 | 177 |
| 1294.10 | 198 | 0.4882 | 0.05136 | 372 | 233 | 178 |

Example 32

TABLE 54

Temperature 150° F. with Surfactant
Additives - Off Road Diesel, 100 ppt Aluminum Octoate,
10 ppt AL2O3, 20 gpt Xylene, 60 gpt SYLFAT FA-1 Sp,
4 gpt Petrosurf 4XL

| TIME (minutes) | TEMP (° F.) | n' | K | Viscosity (Cp) 40 | 100 | 170 |
|---|---|---|---|---|---|---|
| 2.10 | 129 | 0.4419 | 0.14576 | 891 | 534 | 397 |

Example 33

TABLE 55

Temperature 200° F. with Surfactant (ETHOX)
Additives - Off Road Diesel, 100 ppt Aluminum Octoate,
10 ppt AL(OH)$_3$, 60 gpt SYLFAT FA-1, 10 ppt
Polyglycerol Stearate, 4 gpt Petrosurf XL

| TIME (minutes) | TEMP (° F.) | n' | K | Viscosity (Cp) 40 | 100 | 170 |
|---|---|---|---|---|---|---|
| 2.10 | 74 | 0.5442 | 0.04060 | 362 | 238 | 187 |
| 36.10 | 194 | 1.2120 | 0.00069 | 72 | 88 | 98 |
| 70.10 | 197 | 1.3821 | 0.00025 | 49 | 70 | 85 |
| 104.10 | 197 | 1.4403 | 0.00018 | 44 | 65 | 83 |
| 138.10 | 197 | 1.4689 | 0.00015 | 40 | 62 | 80 |
| 172.10 | 196 | 1.5750 | 0.00009 | 36 | 61 | 83 |
| 206.10 | 196 | 1.6035 | 0.00008 | 35 | 62 | 85 |
| 240.10 | 197 | 1.4734 | 0.00014 | 38 | 59 | 76 |
| 274.10 | 196 | 1.3645 | 0.00023 | 42 | 59 | 72 |
| 308.10 | 197 | 1.3557 | 0.00024 | 43 | 59 | 71 |
| 342.10 | 197 | 1.2545 | 0.00039 | 48 | 60 | 69 |
| 376.10 | 197 | 1.3126 | 0.00030 | 46 | 61 | 72 |
| 410.10 | 197 | 1.3293 | 0.00027 | 44 | 59 | 70 |
| 444.10 | 197 | 2.0167 | 0.00001 | 20 | 52 | 89 |
| 478.10 | 197 | 1.4738 | 0.00013 | 36 | 55 | 71 |
| 512.10 | 197 | 2.1058 | 0.00001 | 28 | 78 | 140 |
| 546.10 | 197 | 1.9656 | 0.00001 | 17 | 41 | 68 |
| 580.10 | 197 | 2.3640 | 0.00000 | 0 | 0 | 0 |
| 614.10 | 197 | 2.2271 | 0.00000 | 0 | 0 | 0 |
| 648.10 | 197 | 2.0052 | 0.00001 | 20 | 49 | 84 |
| 682.10 | 197 | 2.7048 | 0.00000 | 0 | 0 | 0 |
| 716.10 | 197 | 4.0607 | 0.00000 | 0 | 0 | 0 |
| 750.10 | 197 | 5.1050 | 0.00000 | 0 | 0 | 0 |
| 784.10 | 197 | NaN | NaN | NaN | NaN | NaN |
| 818.10 | 197 | NaN | NaN | NaN | NaN | NaN |
| 852.10 | 196 | NaN | NaN | NaN | NaN | NaN |
| 886.10 | 197 | NaN | NaN | NaN | NaN | NaN |
| 920.10 | 197 | NaN | NaN | NaN | NaN | NaN |
| 954.10 | 197 | NaN | NaN | NaN | NaN | NaN |
| 988.10 | 196 | NaN | NaN | NaN | NaN | NaN |

Example 34

TABLE 56

Temperature 200° F.
Additives - Off Road Diesel, 32.4 g of reaction product of
Example 21 per 250 ml, 45 Sec. Gelation at 3000–4000 RPM

| TIME (minutes) | TEMP (° F.) | n' | K | Viscosity (Cp) 40 | 100 | 170 |
|---|---|---|---|---|---|---|
| 2.10 | 82 | 0.7077 | 0.14811 | 2412 | 1846 | 1580 |
| 36.10 | 194 | 0.3786 | 0.28141 | 1361 | 770 | 554 |
| 70.10 | 197 | 0.3891 | 0.24406 | 1227 | 701 | 507 |
| 104.10 | 197 | 0.3908 | 0.23228 | 1175 | 673 | 487 |
| 138.10 | 197 | 0.3897 | 0.22727 | 1145 | 655 | 474 |
| 172.10 | 197 | 0.3945 | 0.21741 | 1115 | 640 | 464 |
| 206.10 | 197 | 0.3908 | 0.21628 | 1094 | 626 | 453 |
| 240.10 | 197 | 0.4029 | 0.20189 | 1068 | 618 | 450 |
| 274.10 | 197 | 0.4125 | 0.19078 | 1046 | 611 | 447 |
| 308.10 | 197 | 0.4123 | 0.18842 | 1032 | 602 | 441 |
| 342.10 | 197 | 0.4116 | 0.18674 | 1020 | 595 | 436 |
| 376.10 | 197 | 0.4243 | 0.17525 | 1003 | 592 | 436 |
| 410.10 | 197 | 0.4230 | 0.17511 | 998 | 588 | 433 |
| 444.10 | 197 | 0.4191 | 0.17703 | 994 | 584 | 429 |
| 478.10 | 197 | 0.4250 | 0.17173 | 986 | 582 | 429 |
| 512.10 | 197 | 0.4194 | 0.17497 | 984 | 578 | 425 |
| 546.10 | 197 | 0.4219 | 0.17317 | 983 | 579 | 426 |
| 580.10 | 197 | 0.4164 | 0.17771 | 988 | 579 | 425 |
| 614.10 | 197 | 0.4124 | 0.18088 | 991 | 579 | 424 |
| 648.10 | 197 | 0.4138 | 0.18034 | 993 | 581 | 425 |
| 682.10 | 197 | 0.4084 | 0.18475 | 998 | 580 | 424 |
| 716.10 | 197 | 0.4125 | 0.18232 | 999 | 583 | 427 |
| 750.10 | 197 | 0.4104 | 0.18465 | 1004 | 585 | 428 |

TABLE 56-continued

Temperature 200° F.
Additives - Off Road Diesel, 32.4 g of reaction product of
Example 21 per 250 ml, 45 Sec. Gelation at 3000–4000 RPM

| TIME | TEMP | | | Viscosity (Cp) | | |
|---|---|---|---|---|---|---|
| (minutes) | (° F.) | n' | K | 40 | 100 | 170 |
| 784.10 | 197 | 0.3999 | 0.19407 | 1016 | 586 | 426 |
| 818.10 | 197 | 0.3946 | 0.19939 | 1023 | 588 | 426 |
| 852.10 | 197 | 0.3986 | 0.19661 | 1024 | 590 | 429 |
| 886.10 | 197 | 0.4005 | 0.19583 | 1027 | 593 | 431 |
| 920.10 | 197 | 0.3582 | 0.23620 | 1060 | 589 | 419 |
| 954.10 | 197 | 0.4091 | 0.20239 | 1096 | 638 | 466 |
| 988.10 | 197 | 0.4081 | 0.20206 | 1090 | 634 | 463 |
| 1022.10 | 197 | 0.4089 | 0.20045 | 1084 | 631 | 461 |

Example 35

TABLE 57

Temperature 200° F.
Additives - Off Road Diesel, 32.4 g of reaction product of
Example 21 per 250 ml

| TIME | TEMP | | | Viscosity (Cp) | | |
|---|---|---|---|---|---|---|
| (minutes) | (° F.) | n' | K | 40 | 100 | 170 |
| 2.10 | 83 | 0.9036 | 0.10181 | 3416 | 3127 | 2971 |
| 36.10 | 193 | 0.5079 | 0.19393 | 1512 | 963 | 742 |
| 70.10 | 197 | 0.5819 | 0.13535 | 1396 | 945 | 757 |
| 104.10 | 197 | 0.5807 | 0.13180 | 1344 | 915 | 733 |
| 138.10 | 197 | 0.5746 | 0.13293 | 1325 | 897 | 716 |
| 172.10 | 197 | 0.5729 | 0.13227 | 1310 | 886 | 706 |
| 206.10 | 197 | 0.5584 | 0.13914 | 1307 | 872 | 690 |
| 240.10 | 197 | 0.5506 | 0.14293 | 1304 | 864 | 681 |
| 274.10 | 197 | 0.5422 | 0.14661 | 1297 | 853 | 669 |
| 308.10 | 197 | 0.5415 | 0.13542 | 1195 | 785 | 615 |
| 342.10 | 197 | 0.3764 | 0.24289 | 1166 | 658 | 473 |
| 376.10 | 197 | 0.3340 | 0.31048 | 1274 | 692 | 486 |
| 410.10 | 197 | 0.5262 | 0.15718 | 1311 | 849 | 660 |
| 444.10 | 197 | 0.4874 | 0.19614 | 1417 | 886 | 675 |
| 478.10 | 197 | 0.4726 | 0.19603 | 1341 | 827 | 625 |
| 512.10 | 197 | 0.3240 | 0.33572 | 1328 | 715 | 499 |
| 546.10 | 197 | 0.5172 | 0.16431 | 1325 | 852 | 659 |
| 580.10 | 197 | 0.4668 | 0.21378 | 1432 | 878 | 662 |
| 614.10 | 197 | 0.4620 | 0.21656 | 1425 | 870 | 654 |
| 648.10 | 197 | 0.3202 | 0.33555 | 1309 | 702 | 489 |
| 682.10 | 197 | 0.3209 | 0.33367 | 1305 | 700 | 488 |
| 716.10 | 197 | 0.3242 | 0.32778 | 1297 | 698 | 488 |
| 750.10 | 197 | 0.5140 | 0.16142 | 1287 | 824 | 637 |
| 784.10 | 197 | 0.4553 | 0.22006 | 1413 | 858 | 642 |
| 818.10 | 197 | 0.4381 | 0.23677 | 1427 | 852 | 633 |
| 852.10 | 197 | 0.4317 | 0.24349 | 1433 | 851 | 630 |
| 886.10 | 197 | 0.4470 | 0.22133 | 1378 | 830 | 619 |
| 920.10 | 197 | 0.4367 | 0.23643 | 1417 | 846 | 627 |
| 954.10 | 197 | 0.4233 | 0.25075 | 1430 | 843 | 621 |
| 988.10 | 197 | 0.3203 | 0.32598 | 1272 | 682 | 476 |
| 1022.10 | 197 | 0.3232 | 0.32201 | 1270 | 683 | 477 |

Example 36

TABLE 58

Temperature 200° F.
Fluid System - Xylene/Al Stearate, Acme-Hardesty Lot 12356-B
Additives - Xylene, 100 ppt Al Stearate III, 60 gpt SYLFAT FA-1 Sp

| TIME | TEMP | | | Viscosity (Cp) | | |
|---|---|---|---|---|---|---|
| (minutes) | (° F.) | n' | K | 40 | 100 | 170 |
| 2.10 | 202 | 0.4724 | 0.06012 | 411 | 253 | 192 |
| 36.10 | 202 | 0.4761 | 0.05843 | 405 | 251 | 190 |
| 70.10 | 202 | 0.4517 | 0.06318 | 400 | 242 | 181 |
| 104.10 | 202 | 0.4434 | 0.06395 | 393 | 236 | 176 |
| 138.10 | 202 | 0.4493 | 0.06088 | 382 | 231 | 172 |
| 172.10 | 202 | 0.4649 | 0.05545 | 369 | 226 | 170 |
| 206.10 | 202 | 0.4362 | 0.06170 | 369 | 220 | 163 |
| 240.10 | 202 | 0.4634 | 0.05384 | 356 | 218 | 164 |
| 274.10 | 202 | 0.4522 | 0.05544 | 352 | 213 | 159 |
| 308.10 | 202 | 0.4451 | 0.05628 | 348 | 209 | 156 |
| 342.10 | 202 | 0.4505 | 0.05410 | 341 | 206 | 154 |
| 376.10 | 202 | 0.4520 | 0.05303 | 336 | 204 | 152 |
| 410.10 | 202 | 0.4492 | 0.05294 | 332 | 201 | 150 |
| 444.10 | 202 | 0.4570 | 0.05058 | 327 | 199 | 149 |
| 478.10 | 202 | 0.4484 | 0.05164 | 323 | 195 | 145 |
| 512.10 | 202 | 0.4634 | 0.04779 | 316 | 193 | 145 |
| 546.10 | 202 | 0.4616 | 0.04766 | 313 | 191 | 144 |
| 580.10 | 202 | 0.4562 | 0.04840 | 312 | 189 | 142 |
| 614.10 | 202 | 0.4768 | 0.04372 | 304 | 188 | 143 |
| 648.10 | 202 | 0.4675 | 0.04521 | 304 | 186 | 140 |
| 682.10 | 202 | 0.4695 | 0.04426 | 299 | 184 | 139 |
| 716.10 | 202 | 0.4620 | 0.04557 | 300 | 183 | 138 |
| 750.10 | 202 | 0.4591 | 0.04568 | 297 | 181 | 136 |
| 784.10 | 202 | 0.4665 | 0.04385 | 293 | 180 | 136 |

Example 37

TABLE 59

Temperature 200° F.
Fluid System - 50% Off Road Diesel:50% Xylene V/V
Additives - 50% Off Road Diesel V/V, 50% Xylene V/V,
100 ppt Al 2-Ethylehexanoate,
60 gpt SYLFAT FA-1, 4 gpt Petrosurf XL

| TIME | TEMP | | | Viscosity (Cp) | | |
|---|---|---|---|---|---|---|
| (minutes) | (° F.) | n' | K | 40 | 100 | 170 |
| 2.10 | 77 | 0.3066 | 0.13265 | 492 | 261 | 180 |
| 36.10 | 194 | 0.3301 | 0.12813 | 518 | 281 | 197 |
| 70.10 | 197 | 0.3812 | 0.08449 | 413 | 234 | 169 |
| 104.10 | 197 | 0.3829 | 0.08133 | 400 | 227 | 164 |
| 138.10 | 197 | 0.3792 | 0.07963 | 386 | 219 | 157 |
| 172.10 | 196 | 0.3694 | 0.08180 | 383 | 215 | 154 |
| 206.10 | 197 | 0.3794 | 0.07711 | 374 | 212 | 152 |
| 240.10 | 197 | 0.3795 | 0.07493 | 364 | 206 | 148 |
| 274.10 | 196 | 0.3763 | 0.07493 | 359 | 203 | 146 |
| 308.10 | 197 | 0.3868 | 0.07011 | 350 | 199 | 144 |
| 342.10 | 197 | 0.3840 | 0.06977 | 344 | 196 | 141 |
| 376.10 | 197 | 0.3904 | 0.06699 | 338 | 194 | 140 |
| 410.10 | 197 | 0.3894 | 0.06566 | 331 | 189 | 137 |
| 444.10 | 197 | 0.3938 | 0.06409 | 328 | 188 | 136 |
| 478.10 | 197 | 0.3983 | 0.06191 | 322 | 186 | 135 |
| 512.10 | 197 | 0.3963 | 0.06193 | 320 | 184 | 134 |
| 546.10 | 197 | 0.4054 | 0.05847 | 312 | 181 | 132 |
| 580.10 | 197 | 0.3966 | 0.06052 | 313 | 180 | 131 |
| 614.10 | 197 | 0.4044 | 0.05715 | 304 | 176 | 128 |
| 648.10 | 197 | 0.3966 | 0.05942 | 307 | 177 | 128 |
| 682.10 | 197 | 0.4081 | 0.05558 | 300 | 174 | 127 |
| 716.10 | 197 | 0.4096 | 0.05519 | 299 | 174 | 127 |
| 750.10 | 197 | 0.4101 | 0.05453 | 296 | 173 | 126 |
| 784.10 | 197 | 0.4149 | 0.05308 | 294 | 172 | 126 |
| 818.10 | 197 | 0.4179 | 0.05205 | 291 | 171 | 125 |

Example 38

MSMA-Containing Gelled Organic Fluid

Fluid loss data was obtained on a MSMA-containing gelled organic fluid based on "JET062455". In this case, the MSMA used was "SMA 3840" available from Elf Atochem. JET062455 was formulated as shown in Table 60A below and as described in Example 45.

TABLE 60A

JET062455 Formulation

| COMPONENT | FORM | WT. (GMS) | WT. % | *LBS. COMP./ GAL | SP. GR. |
|---|---|---|---|---|---|
| SYLFAT F-1 | LIQUID | 156.2 | 0.2466 | 1.9112 | 0.92 |
| 2-ETHYL HEXAN-OIC ACID | LIQUID | 156.2 | 0.2466 | 1.9112 | 0.95 |
| AL ISOPROPOXIDE | SOLID | 104 | 0.1642 | 1.2725 | 1.035 |
| IPA | LIQUID | 50 | 0.0789 | 0.6118 | 0.781 |
| SMA 3840 | SOLID | 46.8 | 0.0739 | 0.5726 | 1.09 |
| TOLUENE | LIQUID | 100 | 0.1579 | 1.2236 | 0.87 |
| AL ISOPROPOXIDE | SOLID | 5.2 | 0.0082 | 0.0636 | 1.035 |
| IPA | LIQUID | 15 | 0.0237 | 0.1835 | 0.781 |
| TOTALS | | 633.4 | 1.0000 | 7.5420 | |

Gelled diesel was formulated with JET062455 as follows:

| Component | Concentration per 1000 gallons |
|---|---|
| Off-Road diesel | 1000 Gallons |
| Petrosurf XL | 5 Gallons |
| Water | 1 Gallon |
| JET 062455 | 30 Gallons |
| –325 Mesh Calcined Magnesium Oxide ("Magchem 10" available from Martin-Marietta) | 10 pounds per thousand ("ppt") |

Fluid loss was determined using Recommend Practice for Evaluation of Fracturing Fluids, API RP-39 (March, 1983). Test temperature was 200° F. and test pressure was 1000 psi. Results are shown in FIG. 1.

Example 39

Crude Oil Analysis

Crude oil analysis was as indicated in Table 60B below.

TABLE 60B

Crude Oil Analysis

| Parameter | Crude Oil Sample 1 (Also denoted herein as TTC #10) | Crude Oil Sample 2 |
|---|---|---|
| Paraffins (% by wt.) | 15.1 | 14.8 |
| Asphaltenes (% by wt.) | 1.0 | 0.8 |
| Polar Aromatics (% by wt.) | 23.7 | 23.7 |
| Maltenes (% by wt.) | 8.4 | 6.5 |
| API Gravity @ 60 F. | 28.4 | 30.5 |

Example 40

Synthesis Procedure for Gellant Formulation Known as "JET061334A-E"

280 grams (28.91% by weight of the total composition weight)of 2-ethyl hexanoic acid (liquid)was transferred to a 2000 ml reaction flask. 280 grams (28.91%) of tall oil fatty acid ("SLYFAT FA-1" available from Arizona Chemicals, also available as "G20" from BJ Services) was delivered into a clean, dry 250 milliliter beaker. SYLFAT FA-1 contains 92.7% fatty acids, 2.8% unsaponifiables and 4.5% rosin acids, with less than 0.1% moisture and less than 0.01% ash. The fatty acid content of SYLFAT FA-1 includes 34% non-conjugated linoleic, 9% conjugated linoleic, 44% oleic, and 5% saturated. SYLFAT FA-1 has an acid number of 194, a saponification number of 197, and an iodine number of 131. SYLFAT FA-l Sp has a saponification number of 198. 50 grams (5.16%)of Isopropyl alcohol was added and this mixture was then blended at moderated speed. 188.6 grams(19.47%) of aluminum isopropoxide was delivered while blending continued. An exothermic reaction follows the delivery of aluminum isopropoxide. The mixture typically heats to about 50° C. The reaction was allowed to proceed at 50° C. for one (1) hour. The temperature was maintained at 50° C. using laboratory heating mantle. After that period, 70 grams (7.23%) of a reaction product of a partial monoester of styrene maleic anhydride and a fatty alcohol polymer (SMA® Fatty-Alcohol Ester X.31890) was added. 100 grams (10.32%) toluene was added and the temperature was increased to 90° C. while blended continued at the speed for 2 hours. During that period the isopropyl component of the mixture was extracted via laboratory distillation techniques while the composition was condensed to the desired density.(0.93–0.96 gms/ml).

Example 41

Gellation of Diesel from Gellant Formulation JET061334A-E (from Example 40) and Aluminum Second Metal Source Compound A 197 gram of "off road" No.2 diesel was delivered into a clean, dry, small wide-mouth Waring® Blender jar. Solution blended at about 2000 rpm (+/−) 50 (variac voltage controller setting of 30). A proportional concentration equaling 1 L/M3 of tap water was delivered to the mixing fluid. Immediately following that addition a proportional concentration equaling 30 L/M3 of Gellant Formlaton JET061334A-E, 5 L\M3 of Petrosurf XL (aluminum alkoxide), and 2 L/M3 of a high rosin TOFA solution ("UNITOL S" from International Paper Company in 50:50 w/w in toluene) was then added to the diesel solution at the same time. A proportional concentration equaling 30 L/M3 and mixing continued at the same speed Solution mixing continued until a viscous gel developed. A similar procedure was repeated for other gelled formulations from JET061334A-E that are described or referred to elsewhere herein.

Example 42

Synthesis Procedure for Gellant Formulation Known as "JET062455A-E"

280 grams (28.91% by weight of the total composition weight)of 2-ethyl hexanoic acid (liquid)was transferred to a 2000 ml reaction flask. 280 grams (28.91%) of tall oil fatty acid ("SLYFAT FA-1" available from Arizona Chemicals, also available as "G20" from BJ Services) was delivered into a clean, dry 250 milliliter beaker. (SYLFAT FA-1 contains 92.7% fatty acids, 2.8% unsaponifiables and 4.5% rosin acids, with less than 0.1% moisture and less than 0.01% ash. The fatty acid content of SYLFAT FA-1 includes 34% non-conjugated linoleic, 9% conjugated linoleic, 44% oleic, and 5% saturated. SYLFAT FA-1 has an acid number of 194, a saponification number of 197, and an iodine number of 131. SYLFAT FA-1 Sp has a saponification number of 198).

50 grams (5.16%)of Isopropyl alcohol was added and this mixture was then blended at moderated speed. 188.6 grams (19.47%) of aluminum isopropoxide was delivered while blending continued. An exothermic reaction follows the delivery of aluminum isopropoxide. The mixture typically heats to about 50° C. The reaction was allowed to proceed at 50° C. for one (1) hour. The temperature was maintained at 50° C. using laboratory heating mantle. After that period, 70 grams (7.23%) of a reaction product of a partial monoester of styrene maleic anhydride and a fatty alcohol polymer (SMA® Fatty-Alcohol Ester SMA 3840) was added. 100 grams (10.32%) toluene was added and the temperature was increased to 90° C. while blended continued at the speed for 2 hours. During that period the isopropyl component of the mixture was extracted via laboratory distillation techniques while the composition was condensed to the desired density.(0.93–0.96 gms/ml).

JET062455A-E is a synthesized material at 6.7/1 by weight ratio of fatty acids to SMA monoester (x.31890).

Example 43

Gellation of Diesel from Gellant Formulation JET062455A-E (from Example 42) and Aluminum Second Metal Source Compound A 197 gram of "off road" No.2 diesel was delivered into a clean, dry, small wide-mouth Waring® Blender jar. Solution sample blended at about 2000 rpm (+/−) 50 (variac voltage controller setting of 30). A proportional concentration equaling 1 L/M3 of tap water was delivered to the mixing fluid. Immediately following that addition a proportional concentration equaling 30 L/M3 of Gellant Formlation JET062455A-E, 5 L\M3 of Petrosurf XL (aluminum alkoxide), and 2 L/M3 of a high rosin TOFA ("UNITOL S" from International Paper Company, 50:50 w/w in toluene) solution was then added to the diesel solution at the same time A proportional concentration equaling 30 L/M3 and mixing continued at the same speed Solution mixing continued until a viscous gel developed.

Example 44

Alternate "Back Adding" Synthesis Procedure for Gellant Formulation Known as "JET061334A-E"

In the following example, a portion of the amount of the total reactant employed was withheld during the initial combination of ingredients, and added later (after initiation of reaction). This method is defined herein as "back adding". In this regard, any amount of one or more of the chosen reactants may be withheld. In one embodiment, the withheld amount may be from about 7% to about 15% by weight of the total weight of the reactants withheld.

In this example, 156.2 grams (24.66%) of tall oil fatty acid ("SLYFAT FA-1" available from Arizona Chemicals, also available as "G20" from BJ Services) was delivered into a clean, dry 2000 milliliter reaction flask. SYLFAT FA-1 contains 92.7% fatty acids, 2.8% unsaponifiables and 4.5% rosin acids, with less than 0.1% moisture and less than 0.01% ash. The fatty acid content of SYLFAT FA-1 includes 34% non-conjugated linoleic, 9% conjugated linoleic, 44% oleic, and 5% saturated. SYLFAT FA-1 has an acid number of 194, a saponification number of 197, and an iodine number of 131. SYLFAT FA-1 Sp has a saponification number of 198. 156.2 grams (24.66%) by weight of the total composition weight)of 2-ethyl hexanoic acid (liquid)was transferred to the reaction flask. 50 grams (7.89%)of Isopropyl alcohol was added and this mixture was then blended at moderated speed. 104 grams(16.42%) of aluminum isopropoxide was delivered while blending continued. An exothermic reaction follows the delivery of aluminum isopropoxide. The mixture typically heats to about 50° C. The reaction was allowed to proceed at 50° C. for one (1) hour. The temperature was maintained at 50° C. using laboratory heating mantle. After that period, 46.8 grams (7.39%) of a reaction product of a partial monoester of styrene maleic anhydride and a fatty alcohol polymer (SMA® Fatty-Alcohol Ester "X.31890") was added. 100 grams (15.79%) toluene was added and the temperature was increased to 90° C. while blended continued at the speed for 2 hours. After that period and using the process called "back adding", 5.2 grams (0.82%) additional aluminum isopropoxide and 15 grams (2.37%) isopropyl alcohol was added to the mixture. Isopropyl component of the mixture was then extracted via laboratory distillation techniques while the composition was condensed to the desired density.(0.93–0.96 gms/ml).

Gellation of an organic fluid, such as diesel, may be accomplished using the above "back added" product, for example, using the same procedure as given in Example 41.

Example 45

Alternate "Back Adding" Synthesis Procedure for Gellant Formulation Known as "JET062455A-E"

156.2 grams (24.66%) of tall oil fatty acid ("SLYFAT FA-1" available from Arizona Chemicals, also available as "G20" from BJ Services) was delivered into a clean, dry 2000 milliliter reaction flask. SYLFAT FA-1 contains 92.7% fatty acids, 2.8% unsaponifiables and 4.5% rosin acids, with less than 0.1% moisture and less than 0.01% ash. The fatty acid content of SYLFAT FA-1 includes 34% non-conjugated linoleic, 9% conjugated linoleic, 44% oleic, and 5% saturated. SYLFAT FA-1 has an acid number of 194, a saponification number of 197, and an iodine number of 131. SYLFAT FA-1 Sp has a saponification number of 198. 156.2 grams (24.66%) by weight of the total composition weight) of 2-ethyl hexanoic acid (liquid)was transferred to the reaction flask. 50 grams (7.89%)of Isopropyl alcohol was added and this mixture was then blended at moderated speed. 104 grams (16.42%) of aluminum isopropoxide was delivered while blending continued. An exothermic reaction follows the delivery of aluminum isopropoxide. The mixture typically heats to about 50° C. The reaction was allowed to proceed at 50° C. for one (1) hour. The temperature was maintained at 50° C. using laboratory heating mantle. After that period, 46.8 grams (7.39%) of a reaction product of a partial monoester of styrene maleic anhydride and a fatty alcohol polymer (SMA® Fatty-Alcohol Ester "SMA 3840") was added. 100 grams (15.79%) toluene was added and the temperature was increased to 90° C. while blended continued at the speed for 2 hours. After that period and using the process called "back adding", 5.2 grams (0.82%) additional aluminum isopropoxide and 15 grams (2.37%) isopropyl alcohol was added to the mixture. Isopropyl component of the mixture was then extracted via laboratory distillation techniques while the composition was condensed to the desired density.(0.93–0.96 gms/ml).

Gellation of an organic fluid, such as diesel, may be accomplished using the above "back added" product, for example, using the same procedure as given in Example 43.

Example 46

Gellation Using Back-Added Formulation of JET061334A-E with Optional Citric Acid Activator The following example shows the use of an optional activator in the formulation of gellant materials.

A 197 gram of "off road" No.2 diesel was delivered into a clean, dry, small wide-mouth Waring® Blender jar. Solution sample blended at about 2000 rpm (+/−) 50 (variac voltage controller setting of 30). Immediately following that addition a proportional concentration equaling 30 L/M3 of "back added" Gellant Formlation JET061334A-E (of Example 44), 5 L\M3 of Petrosurf XL (aluminum alkoxide), and 2 L/M3 of a citric acid (50:50 w/w in water) solution was then added to the diesel solution at the same time A proportional concentration equaling 30 L/M3 and mixing continued at the same speed Solution mixing continued until a viscous gel developed.

Example 47

Example Synthesis of Gelling Agent

One exemplary embodiment of manufacturing a gelling agent according to the disclosed method is given in this example. In this example, manufacture of gelling agent may occur offsite (e.g., at a manufacturing plant or other facility) and the gelling agent stored in drums or other suitable container, for transportation and later user onsite (e.g., at a well site or pipeline site).

In this exemplary embodiment, one or more carboxylic acids having from about 16 to about 20 carbon atoms (e.g., tall oil fatty acid carboxylic acids, etc.) may be combined with one or more MSMA-based compounds (as defined elsewhere herein), one or more solvents (e.g., aromatic compounds, alcohols, etc.), and one or more metal source compounds (e.g., as defined elsewhere herein). Isopropyl alcohol and toluene are just two examples of organic solvents that may be employed in this embodiment. Such a combination of solvents may be chosen, for example, to reduce overall solvent cost, facilitate distillation or solvent removal, to be non-reactant with other reaction components, and/or to be the same as a by-product of the reaction (to reduce number of components in the reaction product, etc. Examples of other organic solvents that may be employed in this exemplary embodiment include, but are not limited to, other aromatic compounds (such as benzene, xylene, benzyl alcohol, and other aromatic solvents described elsewhere herein) and linear or branched chain alcohols having from about 3 to about 12, alternatively from about 3 to about 10 carbon atoms. As described elsewhere herein, any solvent or mixture of solvents suitable, for example, to facilitate ease of reactant mixture handling, intermixing of reactants, etc. may be employed. Furthermore, organic solvents may be selected to have desirable separation or distillation characteristics.

A mixture of carboxylic acids may be employed, for example, to reduce overall cost by combining a more expensive carboxylic acid with a less expensive carboxylic acid, it being understood that a single type of carboxylic acid may also be employed alone. In this example, "SYLFAT FA-1" (ie., mixture of oleic and linoleic acids) and liquid 2-ethylhexanoic acid may be combined with a MSMA-based compound (such as solid "SMA X31890" from Elf Atochem and/or "LUBRIZOL 2002" from Lubrizol Corporation), isopropyl alcohol, toluene, and aluminum isopropoxide (metal source compound). The foregoing ingredients may be combined in a reactor or reaction vessel, for example, in the order mentioned in the preceding sentence. In this regard, it may be desirable to add the metal source compound (e.g., aluminum isopropoxide) last, as its addition initiates an exothermic reaction within the reactor or reaction vessel. Otherwise, if desired, liquid components may be added first, followed by solid components, to facilitate intermixing.

The reactor or reaction vessel may be sealed immediately following addition of the first metal source compound (e.g., aluminum isopropoxide) and the reaction allowed to proceed exothermically to a temperature of, for example, about 60° C., while maintaining a pressure (e.g., from about 150 psi to about 200 psi) on the vessel to keep the contents from boiling. The reaction components may be allowed to sit for a length of time sufficient to allow the components to go into solution, e.g., about 30 minutes. At this point additional heat may be added to bring the temperature within the reactor or reaction vessel to from about 90° C. to about 100° C., alternatively about 95° C. and the pressure maintained within the reactor or reaction vessel at from about 150 psi to about 200 psi. The reaction may then be allowed to proceed in the closed reactor or reaction vessel and under these temperature and pressure conditions for a desired reaction time period (e.g., from about 2 to 4 hours, alternatively for a period of about 2 to 3 hours, alternatively for a period of about 2 hours). If desired at this point, additional metal source compound/s (e.g., about 15% by weight of total metal source compound may be reserved for later addition at this time) may optionally be "back added" to the reactor or reaction vessel, along with additional optional organic solvent/s, and allowed to react, for example, an additional time period of about 1 hour. In either case, after passage of the desired reaction time, pressure may be bled off the reactor or reaction vessel.

The resulting reaction product may be distilled to remove organic solvent/s and obtain a gelling agent product having desired characteristics, e.g., viscosity and/or density. This may be accomplished using any distillation method known in the art, for example, through a condenser connected to the reactor or reaction vessel, using a separate distillation vessel and system, etc. For example, a reaction product obtained using the procedure and components described above may be distilled at a temperature of about 90° C. and at atmospheric pressure to achieve a reaction product having a specific gravity of from about 0.94 to about 0.99, alternatively from about 0.95 to about 0.97. During distillation, lighter components, such as toluene and/or isopropyl alcohol, may be removed from the reaction product to form a more viscous and/or dense liquid, or a majority to all of the liquid components removed to form a solid or paste. In this regard, it will be understood with benefit of this disclosure by those of skill in the art that distillation conditions and/or time may be varied as necessary for a particular reaction product to achieve the desired gelling agent product characteristics, e.g., solid, paste, or liquid of desired viscosity and/or specific gravity. In one example, a liquid reaction product using the above described procedure and components may be allowed to cool and then poured into drums for transportation and later use.

Tables 61–69 list information for exemplary types and amounts of individual components that may be combined using the procedure described in this example. In addition to the specific formulation described below, the last column in Table 61 gives exemplary ranges of each component that may be employed. It will be understood that the procedures, component types, and amounts described in this example are exemplary only, and may be varied as desired by those of skill in the art with the benefit of this disclosure.

TABLE 61

Exemplary Component Information

| General Type | Specific Example | Form | Weight (Grams) | Weight of Total Solution (%) | Lbs per Gallon ("PPG") | Specific Gravity | Weight of Total Solution (Exemplary % Range) |
|---|---|---|---|---|---|---|---|
| Carboxylic Acid | "SYLFAT F-1" Tall Oil Fatty Acid | Liquid | 231.8 | 23.18 | 1.7963 | 0.92 | *About 20% to about 30% |
| Carboxylic Acid | 2-ethyl hexanoic acid | Liquid | 231.8 | 23.18 | 1.7963 | 0.92 | *About 20% to about 30% |
| Metal Source | Aluminum Iso-propoxide | Solid | 172.2 | 17.22 | 1.3344 | 1.035 | Stochiometrically determined relative to carboxylic acid as described elsewhere herein |
| Solvent | Isoproyl Alcohol ("IPA") | Liquid | 165.6 | 16.56 | 1.2832 | 0.781 | *** |
| MSMA-based Compound | "SMA X31890" | Solid | 115.9 | 11.59 | 0.8981 | 1.09 | ** |
| Solvent | Toluene | Liquid | 82.8 | 8.28 | 0.6417 | 0.87 | *** |
| Totals | — | — | 1000 | 100.00 | 8.1351 | — | — |

*Ranges given are for each of the two given separate carboxylic acids present in this embodiment. Alternatively, total carboxylic acid exemplary weight percent range in one embodiment may be from about 5% to about 60% by total weight, alternatively from about 40% to about 60% by total weight, further alternatively from about 40% to about 50% by total weight.

** In this embodiment, weight of MSMA-based compound may be present in amount relative to total carboxylic acid weight as follows: MSMA-based compound weight to carboxylic acid of from about 4:1 to about 10:1, alternatively about 4:1 to about 8:1, further alternatively from about 4:1 to about 6:1). However these values are exemplary only, and values greater or less than these ranges may also be employed.

*** In this embodiment, total amount of solvent may be from about 5% to about 30% by weight, alternatively from about 8% to about 25% by weight. Ratio of toluene to IPA may be about 1:2, alternatively from about 1:2 to about 6:1 or as otherwise desired. However the given values are exemplary only, and values greater or less than these may be employed.

TABLE 62

4:1 SMA ADDITION

| COMPONENT | WT. | WT % | REACTOR 1 |
|---|---|---|---|
| SYLFAT F-1 | 156.2 | 0.238 | 21.4 |
| 2-ETHYL HEXANOIC ACID | 156.2 | 0.238 | 21.4 |
| IPA | 100 | 0.152 | 13.7 |
| SMA X.31890 | 78.1 | 0.119 | 10.7 |
| AL ISOPROPOXIDE | 116 | 0.177 | 15.9 |
| TOLUENE | 50 | 0.076 | 6.9 |
| TOTALS | 656.5 | 1.00 | 90 |

TABLE 63

4:1 SMA ADDITION

| COMPONENT | WT. | WT % | REACTOR 1 |
|---|---|---|---|
| SYLFAT F-1 | 156.2 | 0.238 | 21.4 |
| 2-ETHYL HEXANOIC ACID | 156.2 | 0.238 | 21.4 |
| IPA | 100 | 0.152 | 13.7 |
| SMA 3840 | 78.1 | 0.119 | 10.7 |
| AL ISOPROPOXIDE | 116 | 0.177 | 15.9 |
| TOLUENE | 50 | 0.076 | 6.9 |
| TOTALS | 656.5 | 1.00 | 90 |

TABLE 64

5:1 SMA ADDITION

| COMPONENT | WT. | Wt % | REACTOR 1 |
|---|---|---|---|
| SYLFAT F-1 | 156.2 | 0.244 | 21.9 |
| 2-ETHYL HEXANOIC ACID | 156.2 | 0.244 | 21.9 |
| IPA | 100 | 0.156 | 14.0 |
| SMA X.31890 | 62.5 | 0.098 | 8.8 |
| AL ISOPROPOXIDE | 116 | 0.181 | 16.3 |
| TOLUENE | 50 | 0.078 | 7.0 |
| TOTALS | 640.9 | 1.00 | 90 |

TABLE 65

5:1 SMA ADDITION

| COMPONENT | WT. | WT % | REACTOR 1 |
|---|---|---|---|
| SYLFAT F-1 | 156.2 | 0.244 | 21.9 |
| 2-ETHYL HEXANOIC ACID | 156.2 | 0.244 | 21.9 |
| IPA | 100 | 0.156 | 14.0 |
| SMA 3840 | 62.5 | 0.098 | 8.8 |
| AL ISOPROPOXIDE | 116 | 0.181 | 16.3 |
| TOLUENE | 50 | 0.078 | 7.0 |
| TOTALS | 640.9 | 1.00 | 90 |

TABLE 66

6.67:1 SMA ADDITION

| COMPONENT | WT. | WT % | REACTOR 1 |
|---|---|---|---|
| SYLFAT F-1 | 156.2 | 0.250 | 22.5 |
| 2-ETHYL HEXANOIC ACID | 156.2 | 0.250 | 22.5 |
| IPA | 100 | 0.160 | 14.4 |
| SMA X.31890 | 46.8 | 0.075 | 6.7 |
| AL ISOPROPOXIDE | 116 | 0.186 | 16.7 |
| TOLUENE | 50 | 0.080 | 7.2 |
| TOTALS | 625.2 | 1.00 | 90 |

TABLE 67

6.67:1 SMA ADDITION

| COMPONENT | WT. | WT % | REACTOR 1 |
|---|---|---|---|
| SYLFAT F-1 | 156.2 | 0.250 | 22.5 |
| 2-ETHYL HEXANOIC ACID | 156.2 | 0.250 | 22.5 |
| IPA | 100 | 0.160 | 14.4 |
| SMA 3840 | 46.8 | 0.075 | 6.7 |
| AL ISOPROPOXIDE | 116 | 0.186 | 16.7 |
| TOLUENE | 50 | 0.080 | 7.2 |
| TOTALS | 625.2 | 1.00 | 90 |

TABLE 68

| COMPONENT | FORM | WT. (GMS) | WT. % | *LBS. COMP./ GAL | SP. GR. |
|---|---|---|---|---|---|
| SYLFAT F-1 | LIQUID | 280 | 0.2891 | 2.2403 | 0.92 |
| 2-ETHYL HEXAN-OIC ACID | LIQUID | 280 | 0.2891 | 2.2403 | 0.95 |
| AL ISOPROPOXIDE | SOLID | 188.6 | 0.1947 | 1.5090 | 1.035 |
| IPA | LIQUID | 50 | 0.0516 | 0.4001 | 0.781 |
| SMA X.31890 OR SMA 3840 | SOLID | 70 | 0.0723 | 0.5601 | 1.09 |
| TOLUENE | LIQUID | 100 | 0.1032 | 0.8001 | 0.87 |
| TOTALS | | 968.6 | 0.9277 | 7.5900 | |
| MEASURED FLUID DENSITY | 0.929 | | | | |

TABLE 69

| COMPONENT | FORM | WT. (GMS) | WT. % | *LBS. COMP./ GAL | SP. GR. |
|---|---|---|---|---|---|
| SYLFAT F-1 | LIQUID | 156.2 | 0.2466 | 1.9112 | 0.92 |
| 2-ETHYL HEXAN-OIC ACID | LIQUID | 156.2 | 0.2466 | 1.9112 | 0.95 |
| AL ISOPROPOXIDE | SOLID | 104 | 0.1642 | 1.2725 | 1.035 |
| IPA | LIQUID | 50 | 0.0789 | 0.6118 | 0.781 |
| SMA 3840 | SOLID | 46.8 | 0.0739 | 0.5726 | 1.09 |
| TOLUENE | LIQUID | 100 | 0.1579 | 1.2236 | 0.87 |
| AL ISOPROPOXIDE | SOLID | 5.2 | 0.0082 | 0.0636 | 1.035 |
| IPA | LIQUID | 15 | 0.0237 | 0.1835 | 0.781 |
| TOTALS | | 633.4 | 1.0000 | 7.5420 | |
| MEASURED FLUID DENSITY | 0.929 | | | | |

*CALCULATION IS BASED MEASURE DENSITY OF FINAL PRODUCT

Example 48

Formulation of Well Treatment Fluid from Gelling Agent

Using the procedure of Example 47, a liquid gelling agent may be formulated, for example, using the components of Table 61. As previously mentioned, such a gelling agent may be stored in drums or other suitable container, and transported to a well or pipeline facility site for formulation of gelled treatment fluid. One exemplary method of performing a well treatment using such a gelling agent is described below.

At a well site, an organic (e.g., hydrocarbon base fluid) may be combined with a gelling agent and other components to form a well treatment fluid in the following manner. In one embodiment, an organic base fluid may be combined in a downhole blender with a metal source, gelling agent, water and other optional components to form a gelled well treatment fluid, for example, to be used as part of a hydraulic fracturing treatment or as part of any other type of gelled well treatment fluid known in the art. Depending on components employed, gellation may occur almost immediately, or may occur over time as a treatment fluid is pumped downhole and/or exposed to downhole temperatures.

In one example, a diesel base fluid (e.g., no. 2 diesel) may be combined at ambient temperature, or at a temperature of from about 4° C. to about 24° C. in a blender with the following components and subjected to shear prior to being introduced into a wellbore: (1) metal source compound in the form of "PETROSURF XL" (aluminum isopropoxide solution containing 10% by weight of aluminum in a naptha/tri secondary butyl alcohol base) in an amount of from about 0.1% to about 1.0% by volume of total volume of well treatment fluid (alternatively about 0.5% by volume of total volume of well treatment fluid); (2) liquid gelling agent of Example 46 in an amount of from about 5 gallons to about 50 gallons per thousand gallons, alternatively about 20 gallons per thousand gallons of base fluid (or alternatively from about 0.5% to about 4% by volume, alternatively from about 1% to about 4% by volume, alternatively about 2% by volume of total volume of total volume of well treatment fluid); and (3) water in an amount of from about 0.05% to about 0.5% alternatively about 0.1% by volume of total volume of well treatment fluid. Other optional components that may be combined in the blender include, but are not limited to, non-emulsifiers or hydrotopes, and other optional well treatment components described elsewhere herein or known to those of skill in the well treating art. Order of addition of the components to the blender may be as desired.

Following formation of a gelled treatment fluid as described above additional components desired for well treatment (such as proppant, gel breaker material, etc.), may be combined with the gelled treatment fluid before introduction in the wellbore.

In another optional embodiment, where acceleration of crosslinking and gellation may be desirable, from about 2% to about 4% of the gelling agent of Example 46 may be added to organic base fluid (e.g., diesel) in a blender in a manner as described above. Also added may be from about 0.1% to about 0.5% of a hydrotrope-type surfactant (e.g., NE-42 or NE-118 from BJ Services Company), from about 0.1% to about 0.5% water, and from about 0.1% to about 0.5% of a high-resin content tall oil fatty acid (e.g., Unitol AR40 from Arizona Chemical). Using this method gellation may occur in, for example, about 90 seconds.

Further reduction in gellation time may be achieved by the addition of phase transfer catalyst materials ("PTCs").

Examples of suitable PTC materials include, but are not limited to, benzoic acid, napthenic acid, other aromatic organic or carboxylic acids, etc. Use of such materials may be desirable, for example, for treating wells of shallow depths or which have relatively low bottom hole static temperatures. For example, an aluminum isopropoxide metal source compound, available from Chattem Chemical of Chatanooga, Tenn. (as product code "RNB-1-19[XCP-1053]") that has been modified with an organic acid PTC (Benzoic acid) at a ratio of about 0.5 mole or greater of PTC per mole of metal source compound, may be employed as a metal source compound/PTC reactant additive using methods described elsewhere herein. Further information on PTC's may be found in "Catalysis, Phase Transfer," Encyclopedia of Chemical Technology, 3rd Ed., Volume 5, John Wiley & Sons (1979), pp.62–69, which is incorporated herein by reference.

Example 49

Formulation of Well Treatment Fluid from Individual Components at the Wellsite

As an alternative to formulation of a treatment fluid using a pre-formulated gelling agent, a gelled treatment fluid may be synthesized on location from individual ingredients, such as organic base fluid, metal source compound/s, carboxylic acid/s and MSMA-based compound/s. In one embodiment, at a well site an organic (e.g. hydrocarbon base fluid such as diesel) may be combined in a blender with metal source compound/s, MSMA-based compound/s and other optional components to form a well treatment fluid, for example, to be used as part of a hydraulic fracturing treatment or as part of any other type of gelled well treatment fluid known in the art. In one example, the metal source compound may be aluminum octoate and the MSMA-based compound delivered to a blender in a solvent as described elsewhere herein. Once a gelled treatment fluid is formed, it may be employed for a desired application using, for example, any of the methods described elsewhere herein.

Example 50

Breaker Materials for Use with Gelled Treatment Fluids

Breaker materials that may be employed with gelled treatment fluids include, for example, gelled treatment fluids formulated according to the preceding Examples 48 and 49.

In one embodiment, breaker material may include sodium metasilicate and/or sodium metaborate that may be employed in any amount suitable for partially or completely breaking a gelled treatment fluid. In one exemplary embodiment, such materials may be combined with an organic base fluid or a gelled treatment fluid in an amount sufficient to result in from about 1 to about 5 pound of breaker material per thousand gallons of gelled treatment fluid. Suitable materials include, for example, sodium metasilicate or sodium metaborate materials having a minimum particle size of about 20/40 mesh and which have relatively low solubility in water, or that are substantially insoluble in water. Such materials are available from suppliers such as "BASF" and "US BORAX." It will be understood that these materials are exemplary only, and that similar materials having other particle sizes may also be employed. It will also be understood that such materials may be encapsulated, for example, in a manner and using materials as described elsewhere herein.

It will also be understood that other solid particulate materials suitable for performing the breaker function described herein (including, but not limited to, solid amines such as melamine, etc.) may be encapsulated, for example with paraffin or other suitable encapsulant).

In another embodiment, breaker materials may be formed by impregnating porous particulate carrier material with breaker materials such as those breaker materials described elsewhere herein (e.g., solutions of salts such as sodium metasilicate or sodium metaborate, amines such as TEPA, hexamethylene tetramine, etc.). Impregnations may be accomplished, for example, by submersion of porous material in a liquid breaker material or breaker solution which is exposed to a suitable breaker material-impregnating vacuum (e.g., 30 mm HG, etc.), washed with solvent, and allowed to dry. Impregnated breaker materials may be optionally encapsulated, such as in a manner and using materials described elsewhere herein for breaker encapsulation. Examples of suitable porous materials include any porous particulate material including, but not limited to, particulate material such as ground or crushed nut shells, ground or crushed seed shells, ground or crushed fruit pits, processed wood, porous ceramics, agglomerated particulates of resin and other materials manufactured by, for example, BORDEN CHEMICAL (such as agglomerates of phenolic and/or urethane resins with particles of Silica and/or Feldspar). Additional information on such particles may be found in copending U.S. patent application Ser. No. 09/085,416, filed May 27, 1998, and in co-pending U.S. patent application Ser. No. 09/519,238, filed Mar. 6, 2000, entitled "Formation Treatment Method Using Deformable Particles" by Allan R. Rickards, Harold D. Brannon, Philip J. Rae, Gino A. DiLullo and Christopher J. Stephenson, each of which are incorporated herein.

It will be understood that any suitable combination of breaker materials, encapsulants and/or carrier materials may be employed, whether or not the particular combination is specifically described herein.

Some components utilized in the formulations described herein have been denoted with various codes and/or product names. The following legend provides definitions for codes and/or product names, or for products which otherwise may be useful in the practice of the disclosed methods and compositions:

"ENCA 80715" is shorthand notation for "En Cap 80715", which is a styrenated acrylic paint encapsulated potassium carbonate available from Fritz Industries of Dallas, Tex.

"ECA-2" is used shorthand notation for a citric acid solution (50% w/w citric acid in water, with "w/w" used herein to denote percentage on a weight basis of the solution)

"GBL-5L" is sometimes used to denote "GBO-5L"

"Viscomaster 2100" is an Aluminum Octoate solution available from Chattem Chemicals.

"FE-300L" is used to denote a 50% w/w citric acid solution

"HEXA" is used to denote hexamethylenetetramine

"JET0707-1" denotes "JET062455A-E" (having a specific gravity of 0.948).

"JET0707-2" denotes "JET062455A-E" (having a specific gravity of 0.938)

"JET -617-7" is sometimes used to denote "Unitol S" High Rosin Tall Oil Fatty Acid "EC-1" is also used to denote Citric acid solution (50% w/w in water)

"ENCAP 90706 [21% COATING]" denotes an encapsulated tetraethylenepentamine in which the tetraethylenepentamine is absorbed in diatomaceous earth. This diatomaceous earth/tetraethylenepentamine material is then coated with a styrenated acrylic paint. The 21% designates the weight percent acrylic paint present on the diatomaceous earth/tetraethylenepentamine material. This product is available from Fritz Industries of Dallas, Tex.

"TOL:HRTOFA" denotes a toluene/"Unitol S" high rosin tall oil solution (mixed at 50% w/w).

"ENCAP MGO" denotes encapsulated magnesium oxide dispersed in aliphatic hydrocarbon insoluble resin known as "VINSOL RESIN" (oil soluble resin available from Hercules, Incorporated). Same type material could be made with another oil soluble resin, such as described in U.S. Pat. No. 5,497,830, incorporated herein by reference. Vinsol resin has the property that it is more soluble in oil containing aromatics than only containing aliphatics.

"OB-1" is an imidazoline-based emulsifier available from BJ Services.

"AC12" and "ACM16AM" are examples of reactive calcined alumina (available from Alchem) that may be employed as first or second metal source in the practice of the disclosed method and compositions.

A composite reaction sample suitable for use in the disclosed methods and compositions may be formulated using 100 ppt aluminum octoate and 60 gpt oleic acid from vegetable oil (available from Acme-Hardesty).

It will be understood with benefit of this disclosure that the procedures of the examples given herein may be employed by those of skill in the art to select appropriate components, for example from those components disclosed elsewhere herein, so as to vary characteristics (e.g., gel time, rheology, temperature stability, etc.) of the disclosed non-phosphate gelled organic fluids. In this regard, fluid characteristics may be tailored to achieve gelled fluids meeting requirements or conditions for individual or specific applications. It will also be understood that, with benefit of this disclosure, other rheological and fluid testing methods known in the art may also be employed for this purpose.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations. Further, although exemplary embodiments are described herein, it will be understood with benefit of this disclosure that the disclosed compositions and method may be beneficially employed in any other application where gelation of liquid organics and resulting compositions may be suitably employed (such as for gelled fuels, etc.).

REFERENCES

The following references, to the extent that they provide exemplary procedural or other details supplementary to those set forth herein, are specifically incorporated herein by reference.

U.S. Patent Application Serial No. 60/148,274 filed on Aug. 11, 1999, entitled "Gelled Hydrocarbon Compositions and Methods for Use Thereof";

U.S. Patent Application Serial No. 60/129,770 filed on Apr. 15, 1999, entitled "Gelled Hydrocarbon Compositions and Methods for Use Thereof";

U.S. Patent Application Serial No. 60/127,298 filed on Mar. 30, 1999, entitled "Gelled Hydrocarbon Compositions and Methods for Use Thereof";

U.S. patent application Ser. No. 09/151,169, filed Sep. 10, 1998, entitled "Surfactant Compositions and Uses Therefor."

U.S. Pat. No. 2,793,966
U.S. Pat. No. 2,965,566
U.S. Pat. No. 3,505,374
U.S. Pat. No. 3,511,820
U.S. Pat. No. 3,528,939
U.S. Pat. No. 3,625,286
U.S. Pat. No. 3,650,970
U.S. Pat. No. 3,654,990
U.S. Pat. No. 3,654,991
U.S. Pat. No. 3,654,992
U.S. Pat. No. 3,657,123
U.S. Pat. No. 3,719,711
U.S. Pat. No. 3,725,547
U.S. Pat. No. 3,741,943
U.S. Pat. No. 3,755,189
U.S. Pat. No. 3,757,864
U.S. Pat. No. 3,764,571
U.S. Pat. No. 3,819,386
U.S. Pat. No. 3,821,109
U.S. Pat. No. 3,839,300
U.S. Pat. No. 3,852,441
U.S. Pat. No. 3,883,404
U.S. Pat. No. 3,887,508
U.S. Pat. No. 3,900,070
U.S. Pat. No. 3,904,541
U.S. Pat. No. 3,905,909
U.S. Pat. No. 3,960,514
U.S. Pat. No. 3,969,087
U.S. Pat. No. 3,969,233
U.S. Pat. No. 4,008,264
U.S. Pat. No. 4,003,393
U.S. Pat. No. 4,049,858
U.S. Pat. No. 4,053,428
U.S. Pat. No. 4,084,089
U.S. Pat. No. 4,096,071
U.S. Pat. No. 4,142,978
U.S. Pat. No. 4,147,643
U.S. Pat. No. 4,152,289
U.S. Pat. No. 4,153,649
U.S. Pat. No. 4,156,678
U.S. Pat. No. 4,171,268
U.S. Pat. No. 4,174,283
U.S. Pat. No. 4,186,802
U.S. Pat. No. 4,200,540
U.S. Pat. No. 4,248,529
U.S. Pat. No. 4,242,377
U.S. Pat. No. 4,259,428
U.S. Pat. No. 4,273,891
U.S. Pat. No. 4,284,414
U.S. Pat. No. 4,301,868
U.S. Pat. No. 4,312,765

U.S. Pat. No. 4,316,807
U.S. Pat. No. 4,316,810
U.S. Pat. No. 4,316,852
U.S. Pat. No. 4,404,112
U.S. Pat. No. 4,440,674
U.S. Pat. No. 4,450,261
U.S. Pat. No. 4,446,039
U.S. Pat. No. 4,517,115
U.S. Pat. No. 4,517,115
U.S. Pat. No. 4,557,842
U.S. Pat. No. 4,566,977
U.S. Pat. No. 4,576,819
U.S. Pat. No. 4,579,671
U.S. Pat. No. 4,615,393
U.S. Pat. No. 4,622,155
U.S. Pat. No. 4,647,603
U.S. Pat. No. 4,658,036
U.S. Pat. No. 4,665,982
U.S. Pat. No. 4,668,439
U.S. Pat. No. 4,720,576
U.S. Pat. No. 4,751,011
U.S. Pat. No. 4,780,221
U.S. Pat. No. 4,781,845
U.S. Pat. No. 4,787,994
U.S. Pat. No. 4,877,894
U.S. Pat. No. 4,909,923
U.S. Pat. No. 4,962,271
U.S. Pat. No. 5,015,793
U.S. Pat. No. 5,021,170
U.S. Pat. No. 5,045,220
U.S. Pat. No. 5,057,233
U.S. Pat. No. 5,076,852
U.S. Pat. No. 5,082,059
U.S. Pat. No. 5,132,271
U.S. Pat. No. 5,190,675
U.S. Pat. No. 5,256,320
U.S. Pat. No. 5,276,231
U.S. Pat. No. 5,271,464
U.S. Pat. No. 5,278,203
U.S. Pat. No. 5,283,235
U.S. Pat. No. 5,296,164
U.S. Pat. No. 5,300,715
U.S. Pat. No. 5,330,588
U.S. Pat. No. 5,330,662
U.S. Pat. No. 5,346,943
U.S. Pat. No. 5,362,409
U.S. Pat. No. 5,381,864
U.S. Pat. No. 5,382,411
U.S. Pat. No. 5,384,421
U.S. Pat. No. 5,403,501
U.S. Pat. No. 5,411,091
U.S. Pat. No. 5,417,287
U.S. Pat. No. 5,426,137
U.S. Pat. No. 5,449,470
U.S. Pat. No. 5,486,300
U.S. Pat. No. 5,487,838
U.S. Pat. No. 5,492,178
U.S. Pat. No. 5,497,830
U.S. Pat. No. 5,514,645
U.S. Pat. No. 5,519,063
U.S. Pat. No. 5,529,722
U.S. Pat. No. 5,534,609
U.S. Pat. No. 5,552,377
U.S. Pat. No. 5,609,207
U.S. Pat. No. 5,620,946
U.S. Pat. No. 5,637,557
U.S. Pat. No. 5,641,890
U.S. Pat. No. 5,674,936
U.S. Pat. No. 5,679,280
U.S. Pat. No. 5,700,767
U.S. Pat. No. 5,773,706
U.S. Pat. No. 5,826,669
U.S. Pat. No. 5,843,873
U.S. Pat. No. 5,858,929
Japanese Patent No. 03097781A
Japanese Patent No. 06087968
Japanese Patent No. 08048965A
Japanese Patent No. 08183249
Japanese Patent No. 56022739A
Japanese Patent No. 58154758A
Japanese Patent No. 8484933
European Patent No. 0004353A2
European Patent No. 0202940A2
European Patent No. 0207787A2
European Patent No. 0225661A2
European Patent No. 0271362B1
European Patent No. 0295877A3
European Patent No. 0326155A2
European Patent No. 0338738A1
European Patent No. 0390280A1
European Patent No. 0449257A2
European Patent No. 0551021A1
European Patent No. 0580246A1
European Patent No. 0582928A2
European Patent No. 0604988A2
European Patent No. 0682940A1
European Patent No. 0691454A1
European Patent No. 0739619A1
European Patent No. 0785225A2
European Patent No. 0835647A1
European Patent No. 0848029A2
German Patent No. 1800712
German Patent No. DE 3214572
U.S. Pat. No. 1,482,171
Ralson, "Fatty acids and their derivatives," John Wiley & Sons, Inc., New York, N.Y., 887–903, 1948.
Encyclopedia of Chemical Technology, Edited by Raymond E. Kirk and Donald F. Othmer, The Interscience Encyclopedia, Inc., Distributed by Interscience Publishers, Inc., 250 Fifth Avenue, New York, N.Y., 6:147–299, 1951.
Elliott, "The alkaline earth and heavy metal soaps, "McGraw-Hill Encyclopedia of Science and Technology, Reinhold Publishing Co., New York, N.Y., 12:393, 1960.

Chevassus, "The stabilization of polyvinyl chloride," *Mod. Chem., April–May pp.* 1, 4, 6, 12 and 13, 1967.

Chevassus, "The stabilization of polyvinyl chloride," St. Martin's Press, Inc., New York, 137:108–117, 1968.

Pattison, "Fatty acids and their industrial applications," Marcel Dekker, Inc., New York, N.Y., 209–220, 1968.

German Offen., (Patent No. 1800712) May 22, 1969.

Encyclopedia of Chemical Technology, Edited by Raymond E. Kirk and Donald F. Othmer, Third Edition, John Wiley & Sons, 4:812–871, 1978.

Encyclopedia of Chemical Technology, Edited by Raymond E. Kirk and Donald F. Othmer, Third Edition, John Wiley & Sons, 5:62–69, 1979.

Encyclopedia of Chemical Technology, Edited by Raymond E. Kirk and Donald F. Othmer, Third Edition, John Wiley & Sons, 9:795–831, 1980.

American Chemical Society Symp. Ser., Vol. 229, *Iss. Eff. Hostile Environ. Coat. Plast.* pp.49–64, 1983.

Japanese Kokai Tokyo Koho, (Patent No. 84 84933, Patent Application Number 83-184060), May 16, 1984.

Scharf et al., "The Enhancement of Grease Structure Through The Use of Functionalized Polymer Systems", Nat'l Lubricating Grease Institute, 9511.

Kernizan, et al., "FP Additized Greases—Part 1: Bearing and Analytical Performance, The Lubrizol Corporation, 9911.

George et al., "Low Temperature Rheology of Greases: Functionalized Polymer Systems" Nat'l Lubricating Grease Institute, 9808.

Hole et al., "The Enhancement of Grease Structure through the use of Functionalised Polymer Systems" The Lubrizol Corporation.

What is claimed is:

1. A method of forming a gelled organic-based fluid, comprising combining the following components to form said gelled organic-based fluid:

at least one organic base fluid, at least one carboxylic acid, at least one MSMA-based compound, and at least one first metal source compound, wherein said first metal source compound comprises a salt of carboxylic acid.

2. A method of forming a gelled organic-based fluid, comprising combining the following components to form said gelled organic-based fluid:

at least one organic base fluid, at least one carboxylic acid, at least one MSMA-based compound, and at least one first metal source compound, wherein said combining comprises combining said organic base fluid and said MSMA-based compound with a solid reaction product of said carboxylic acid and said first metal source compound to form said gelled organic-based fluid.

3. A method of forming a gelled organic-based fluid, comprising combining the following components to form said gelled organic-based fluid:

at least one organic base fluid, at least one carboxylic acid, at least one MSMA-based compound, and at least one first metal source compound, wherein said carboxylic acid comprises at least one multi-functional carboxylic acid.

4. The method of claim 3, wherein said multi-functional carboxylic acid comprises a dicarboxylic acid.

5. The method of claim 3, wherein said multi-functional carboxylic acid comprises a tricarboxylic acid.

6. The method of claim 2, wherein said metal of said first metal source has a valence of +3.

7. The method of claim 6, wherein said first metal source compound comprises at least one of carboxylic acid salt, metal oxide, metal halide, metal hydroxide, metal alkoxide, metal sulfate, and wherein said metal of said first metal source compound is aluminum, iron, or a mixture thereof.

8. A method of forming a gelled organic-based fluid, comprising combining the following components to form said gelled organic-based fluid:

at least one organic base fluid, at least one carboxylic acid, and at least one first metal source compound;

wherein said carboxylic acid comprises at least one multi-functional carboxylic acid;

wherein said combining comprises combining said organic base fluid with a solid reaction product of said carboxylic acid and said first metal source compound to form said gelled organic-based fluid;

wherein said combining further comprises combining a second metal source compound with said organic base fluid and said solid reaction product; and wherein said metal of said first metal source has a valence of +3; and wherein said metal of said second metal source has a valence of +3.

9. The method of claim 8, wherein said first metal source compound comprises salt of carboxylic acid; wherein said second metal source compound comprises at least one of metal oxide, metal halide, metal hydroxide, metal alkoxide, metal sulfate or a mixture thereof; and wherein said metal of said first and second metal source compounds is aluminum, iron, or a mixture thereof.

10. A method of forming and using a gelled organic-based fluid, comprising:

combining at least one organic base fluid, at least one carboxylic acid, at least one first metal source compound, and at least one second metal source compound to form said gelled organic-based fluid; and introducing said gelled organic-based fluid into a wellbore, pipeline interior or fluid processing facility;

wherein said first and second metal source compounds are different compounds; and wherein said metal of said first metal source has a valence of +3; and wherein said metal of said second metal source has a valence of +3;

wherein said combining further comprises combining at least one MSMA-based compound with said organic base fluid, said first metal source and said second metal source compound to form said gelled organic-based fluid.

11. A method of forming and using a gelled organic-based fluid, comprising:

combining at least one organic base fluid, at least one, carboxylic acid, at least one first metal source compound, and at least one second metal source compound to form said gelled organic-based fluid; and introducing said gelled organic-based fluid into a wellbore, pipeline interior or fluid processing facility;

wherein said first and second metal source compounds are different compounds;

wherein said metal of said first metal source has a valence of +3; and wherein said metal of said second metal source has a valence of +3; and wherein said first metal source compound comprises salt of carboxylic acid; wherein said second metal source compound comprises at least one of metal oxide, metal hydroxide, metal halide, metal alkoxide, metal sulfate or a mixture thereof; and wherein said metal of said first and second metal source compounds is aluminum, iron, or a mixture thereof.

12. The method of claim 11, wherein said carboxylic acid comprises at least one fatty acid having from about 6 to about 24 carbon atoms; wherein said carboxylic acid salt comprises aluminum octoate, aluminum stearate, iron octoate, or a mixture thereof; and wherein said second metal source compound comprises at least one of aluminum oxide, iron hydroxide, aluminum hydroxide, aluminum isopropoxide, aluminum chloride, ferric ammonium sulfate, or a mixture thereof.

13. The method of claim 12, further comprising combining with said organic base fluid a breaker material.

14. The method of claim 13, wherein said gelled organic-based fluid is introduced into a subterranean formation at a pressure above a fracturing pressure of said subterranean formation.

15. A method of forming a gelled organic-based fluid, comprising combining the following components to form said gelled organic-based fluid:
at least one organic base fluid;
at least one MSMA-based compound; and
at least one first metal source compound, wherein said first metal source compound comprises salt of carboxylic acid; and wherein said metal of said first metal source compound is aluminum, iron, or a mixture thereof.

16. A method of forming a gelled organic-based fluid, comprising combining the following components to form said gelled organic-based fluid:
at least one organic base fluid;
at least one MSMA-based compound;
at least one first metal source compound; and
a carboxylic acid;
wherein said carboxylic acid comprises at least one multi-functional carboxylic acid.

17. The method of claim 16, wherein said carboxylic acid comprises citric acid.

18. A method of forming a gelled organic-based fluid, comprising combining the following components to form said gelled organic-based fluid:
at least one organic base fluid;
at least one MSMA-based compound;
at least one first metal source compound; and
a carboxylic acid;
wherein said carboxylic acid comprises benzoic acid.

19. A method of forming a gelled organic-based fluid, comprising combining the followings components to form said gelled or organic-based fluid:
at least one organic base fluid;
at least one MSMA-based compound; and
at least one first metal source compound;
wherein said combining comprises first combining said MSMA-based compound and said first metal source compound to form a reaction product; and then combining said reaction product with said organic base fluid to form said gelled organic-based fluid.

20. The method of claim 19, wherein said metal of said first metal source compound has a valence of +3.

21. The method of claim 20, wherein said reaction product comprises the reaction product of at least one carboxylic acid, said at least one MSMA-based compound, and said at least one first metal source compound.

22. The method of claim 21, wherein said MSMA-based compound has at least one of the following structures, or a mixture thereof:

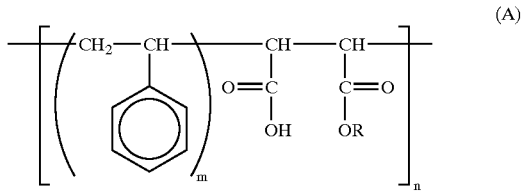

(A)

wherein m=from about 1 to about 3; n=from about 6 to about 8; and R is a branched or straight carbon chain that may be saturated or unsaturated, and which has from about 8 to about 20 carbon atoms; or

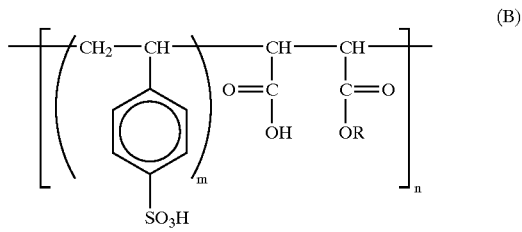

(B)

wherein m=from about 1 to about 3; n=from about 6 to about 8; and R is a branched or straight carbon chain that may be saturated or unsaturated, and which has from about 8 to about 20 carbon atoms.

23. The method of claim 22, wherein said first metal source compound comprises at least one of carboxylic acid salt, metal oxide, metal halide, metal hydroxide, metal alkoxide, metal sulfate, or mixture thereof; and wherein said metal of said first metal source compound is aluminum, iron, or a mixture thereof.

24. The method of claim 22, wherein said combining further comprises combining a second metal source compound with said organic base fluid, said at least one MSMA-based compound, and said at least one first metal source compound.

25. The method of claim 24, wherein said first metal source compound comprises salt of carboxylic acid; and wherein said second metal source compound comprises at least one of metal oxide, metal halide, metal hydroxide, metal alkoxide, metal sulfate or a mixture thereof; and wherein said metal of said first and second metal source compounds is aluminum, iron, or a mixture thereof.

26. The method of claim 21, wherein said carboxylic acid comprises at least one fatty acid having from about 6 to about 24 carbon atoms; and wherein said first metal source compound comprises aluminum octoate, aluminum stearate, iron octoate, aluminum 2,4-pentadione, iron 2,4-pentadione, aluminum oxide, iron hydroxide, aluminum hydroxide, aluminum isopropoxide, aluminum chloride, sodium hydroxide, ferric ammonium sulfate, or a mixture thereof.

27. The method of claim 25, wherein said carboxylic acid comprises at least one fatty acid having from about 6 to about 24 carbon atoms; wherein said carboxylic acid salt comprises aluminum octoate, aluminum stearate, iron octoate, or a mixture thereof; and wherein said second metal source compound comprises at least one of aluminum oxide, iron hydroxide, aluminum hydroxide, aluminum isopropoxide, aluminum chloride, ferric ammonium sulfate, or a mixture thereof.

28. The method of claim 15, wherein said combining further comprises combining at least one phosphate ester with said other components to form said gelled organic-based fluid.

29. The method of claim 15, further comprising combining with said organic base fluid a breaker material.

30. The method of claim 15, further comprising introducing said gelled organic-based fluid into a wellbore, a pipeline interior, or a fluid processing facility.

31. The method of claim 15, wherein said gelled organic-based fluid is introduced into a subterranean formation at a pressure above a fracturing pressure of said subterranean formation.

32. A gelled organic fluid formed by combining an organic base fluid with a reaction product of at least one carboxylic acid, at least one metal source compound, and at least one MSMA-based compound, wherein said carboxylic acid comprises at least one fatty acid having from about 6 to about 24 carbon atoms; wherein said at least one metal source compound comprises aluminum octoate, aluminum stearate, iron octoate, aluminum 2,4-pentadione, iron 2,4-pentadione, aluminum oxide, iron hydroxide, aluminum hydroxide, aluminum isopropoxide, aluminum chloride, ferric ammonium sulfate, or a mixture thereof; and wherein said MSMA-based compound has at least one of the following structures, or a mixture thereof:

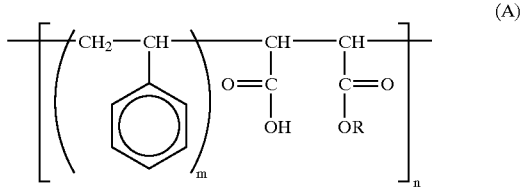

(A)

wherein m=from about 1 to about 3; n=from about 6 to about 8; and R is a branched or straight carbon chain that may be saturated or unsaturated, and which has from about 8 to about 20 carbon atoms; or

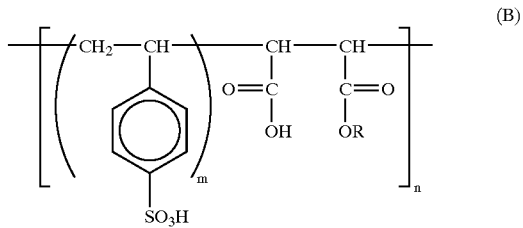

(B)

wherein m=from about 1 to about 3; n=from about 6 to about 8; and R is a branched or straight carbon chain that may be saturated or unsaturated, and which has from about 8 to about 20 carbon atoms.

33. The gelled organic fluid of claim 32, wherein said reaction product comprises a solid reaction product having a particle size of from about 100 mesh to about 325 mesh.

34. A gelled organic fluid formed by combining an organic base fluid with a reaction product of at least one carboxylic acid, at least one metal source compound, and at least one MSMA-based compound; wherein said at least one metal source compound comprises a first and a second metal source compound, said first and second metal source compounds being different compounds; and wherein said carboxylic acid comprises at least one fatty acid having from about 6 to about 24 carbon atoms; wherein said first metal source compound comprises a carboxylic acid salt that is at least one of aluminum octoate, aluminum stearate, iron octoate, or a mixture thereof; and wherein said second metal source compound comprises at least one of aluminum oxide, iron hydroxide, aluminum hydroxide, aluminum isopropoxide, aluminum chloride, ferric ammonium sulfate, or a mixture thereof.

35. The gelled organic fluid of claim 34, wherein said reaction product comprises a solid reaction product having a particle size of from about 100 mesh to about 325 mesh.

36. A method of forming a gelled organic-based fluid, comprising combining the following components to form said gelled organic-based fluid:

at least one organic base fluid, at least one carboxylic acid, at least one MSMA-based compound, and at least one first metal source compound; and introducing said gelled organic-based fluid into a subterranean formation at a pressure above a fracturing pressure of said subterranean formation.

37. A method of forming and using a gelled organic-based fluid, comprising:

first combining an organic base fluid with a solid reaction product of a carboxylic acid and a first metal source compound;

then combining a second metal source compound with said combination of said organic base fluid and said solid reaction product to form said gelled organic-based fluid; and introducing said gelled organic-based fluid into a wellbore, pipeline interior or fluid processing facility;

wherein said carboxylic acid comprises at least one multi-functional carboxylic acid.

38. A method of forming and using a gelled organic-based fluid, comprising:

first combining an organic base fluid with a solid reaction product of a carboxylic acid and a first metal source compound;

then combining a second metal source compound with said combination of said organic base fluid and said solid reaction product to form said gelled organic-based fluid; and introducing said gelled organic-based fluid into a subterranean formation at a pressure above a fracturing pressure of said subterranean formation;

wherein said carboxylic acid comprises at least one multi-functional carboxylic acid.

39. The method of claim 8, further comprising introducing said gelled organic-based fluid into a wellbore, pipeline interior or fluid processing facility.

40. The method of claim 8, further comprising introducing said gelled organic-based fluid into a subterranean formation at a pressure above a fracturing pressure of said subterranean formation.

41. A method of forming and using a gelled organic-based fluid, comprising:

combining an organic base fluid with a solid reaction product to form said gelled organic-based fluid; and introducing said gelled organic-based fluid into a wellbore, pipeline interior or fluid processing facility;

wherein said solid reaction product comprises a reaction product of at least one carboxylic acid, a first metal source compound, and a second metal source compound.

42. A method of forming a gelled organic-based fluid, comprising:

combining an organic base fluid with a solid reaction product to form said gelled organic-based fluid; and introducing said gelled organic-based fluid into a subterranean formation at a pressure above a fracturing pressure of said subterranean formation;

wherein said solid reaction product comprises a reaction product of at least one carboxylic acid, a first metal source compound, and a second metal source compound.

43. The method of claim 10, wherein said gelled organic-based fluid is introduced into a subterranean formation at a pressure above a fracturing pressure of said subterranean formation.

* * * * *